(12) United States Patent
Gass et al.

(10) Patent No.: US 7,278,511 B1
(45) Date of Patent: Oct. 9, 2007

(54) CONTROLLER FOR STEERING A VEHICLE

(75) Inventors: Brett Gass, Forest Lake, MN (US); Jeff Bennett, Roseau, MN (US); Roger Hapka, Columbus, IN (US); Gary Gustafson, Salol, MN (US)

(73) Assignee: Polaris Industries Inc., Medina, MN (US)

( * ) Notice: Subject to any disclaimer, the term of this patent is extended or adjusted under 35 U.S.C. 154(b) by 413 days.

(21) Appl. No.: 10/639,401

(22) Filed: Aug. 12, 2003

Related U.S. Application Data

(60) Provisional application No. 60/483,685, filed on Jun. 30, 2003, provisional application No. 60/459,665, filed on Apr. 2, 2003, provisional application No. 60/442,697, filed on Jan. 27, 2003.

(51) Int. Cl.
*B62D 5/00* (2006.01)
*B62D 7/00* (2006.01)

(52) U.S. Cl. .................. 180/409; 180/411; 180/415

(58) Field of Classification Search ......... 180/411–416
See application file for complete search history.

(56) References Cited

U.S. PATENT DOCUMENTS

| | | | |
|---|---|---|---|
| 2,824,749 A | 2/1958 | Yasuda | |
| 3,282,366 A | 11/1966 | Sprague | |
| 3,596,730 A | 8/1971 | Cecce | |
| 3,888,328 A | 6/1975 | Leiber | |
| 3,897,846 A | 8/1975 | Inoue | |
| 3,912,031 A | 10/1975 | Goulet | |
| 3,933,215 A | 1/1976 | Scheuerle | |
| 4,024,968 A | 5/1977 | Shaffer et al. | |
| 4,105,086 A | 8/1978 | Ishii et al. | |
| 4,175,638 A | 11/1979 | Christensen | |
| 4,263,979 A * | 4/1981 | Sturgill ................. | 180/411 |
| 4,284,159 A | 8/1981 | Voelz | |
| 4,315,555 A | 2/1982 | Schritt | |
| 4,335,800 A | 6/1982 | Arato | |
| 4,367,803 A | 1/1983 | Wittren | |
| 4,373,603 A | 2/1983 | Nelson | |
| 4,412,594 A | 11/1983 | Furukawa et al. | |
| 4,418,780 A | 12/1983 | Ito et al. | |
| 4,446,941 A | 5/1984 | Laurich-Trost | |
| 4,586,722 A | 5/1986 | Watanabe et al. | |
| 4,600,074 A | 7/1986 | Watanabe et al. | |
| 4,655,311 A | 4/1987 | Matsuda et al. | |
| 4,671,523 A | 6/1987 | Naumann | |
| 4,679,809 A | 7/1987 | Ito et al. | |

(Continued)

FOREIGN PATENT DOCUMENTS

EP      0 300 774      1/1989

*Primary Examiner*—Lesley D. Morris
*Assistant Examiner*—Marc A. Scharich
(74) *Attorney, Agent, or Firm*—Baker & Daniels LLP

(57) ABSTRACT

Methods and apparatus for steering a vehicle are disclosed. A vehicle in accordance with an exemplary embodiment of the present invention is capable of operating in a first steering mode and a second steering mode. The vehicle may comprise an input device capable of providing an input signal indicating that operation in the second steering mode is desired. The vehicle may comprise an electronic control unit (ECU) capable of providing an enabling signal when the ECU determines that operation in the second steering mode is appropriate for the present riding conditions.

48 Claims, 23 Drawing Sheets

U.S. PATENT DOCUMENTS

| | | |
|---|---|---|
| 4,687,214 A | 8/1987 | Uno |
| 4,687,216 A | 8/1987 | Kawamoto et al. |
| 4,700,960 A | 10/1987 | Miki et al. |
| 4,705,135 A | 11/1987 | Kawamoto et al. |
| 4,706,771 A | 11/1987 | Kawabe et al. |
| 4,715,466 A | 12/1987 | Ishii et al. |
| 4,721,318 A | 1/1988 | Hase et al. |
| 4,730,839 A | 3/1988 | Miyoshi |
| 4,733,742 A | 3/1988 | Frye |
| 4,750,628 A | 6/1988 | Laurich-Trost |
| 4,770,264 A | 9/1988 | Wright et al. |
| 4,770,265 A | 9/1988 | Allen |
| 4,798,393 A | 1/1989 | Miura et al. |
| 4,823,899 A | 4/1989 | Ron |
| 4,828,061 A | 5/1989 | Kimbrough et al. |
| 4,840,243 A | 6/1989 | Hirabayashi et al. |
| 4,842,089 A | 6/1989 | Kimbrough et al. |
| 4,874,054 A | 10/1989 | Watanabe |
| 4,884,647 A | 12/1989 | Mimuro et al. |
| 4,893,689 A | 1/1990 | Laurich-Trost |
| 4,926,955 A | 5/1990 | Ohmura et al. |
| 4,933,855 A * | 6/1990 | Leiber et al. ................. 701/82 |
| 4,941,095 A | 7/1990 | Imaseki et al. |
| 4,967,859 A | 11/1990 | Tomlinson |
| 4,967,865 A | 11/1990 | Schindler |
| 4,999,003 A | 3/1991 | Koishi et al. |
| 5,035,295 A | 7/1991 | Leiber et al. |
| 5,036,933 A | 8/1991 | Heinrich |
| 5,048,853 A | 9/1991 | Trefz et al. |
| 5,054,568 A | 10/1991 | Shiraishi et al. |
| 5,076,382 A | 12/1991 | Vaughn et al. |
| 5,086,863 A | 2/1992 | Tischer |
| 5,088,573 A | 2/1992 | Moll |
| 5,137,292 A | 8/1992 | Eisen |
| 5,144,857 A | 9/1992 | Kemper |
| 5,154,437 A * | 10/1992 | Inagaki et al. ............... 180/411 |
| 5,186,273 A | 2/1993 | Mori |
| 5,194,851 A | 3/1993 | Kraning et al. |
| 5,208,751 A | 5/1993 | Berkefeld |
| 5,212,642 A | 5/1993 | Tanaka et al. |
| 5,213,143 A | 5/1993 | Policky et al. |
| 5,230,399 A | 7/1993 | Plate |
| 5,238,077 A | 8/1993 | Vaughn et al. |
| 5,249,639 A | 10/1993 | Marr et al. |
| 5,322,308 A | 6/1994 | Bishop |
| 5,325,935 A | 7/1994 | Hirooka et al. |
| 5,337,850 A | 8/1994 | Mouri et al. |
| 5,348,111 A | 9/1994 | Williams et al. |
| 5,365,439 A | 11/1994 | Momose et al. |
| 5,379,220 A * | 1/1995 | Allen et al. ................... 701/41 |
| 5,386,365 A | 1/1995 | Nagaoka |
| 5,402,344 A | 3/1995 | Reister et al. |
| 5,417,299 A | 5/1995 | Pillar et al. |
| 5,482,130 A | 1/1996 | Shimizu |
| 5,482,133 A | 1/1996 | Iwata et al. |
| 5,485,893 A | 1/1996 | Summers |
| 5,488,555 A * | 1/1996 | Asgari et al. ................. 701/41 |
| 5,508,921 A | 4/1996 | Chikuma et al. |
| 5,533,584 A | 7/1996 | Johnson |
| 5,548,536 A | 8/1996 | Ammon |
| 5,570,754 A | 11/1996 | Stimson |
| 5,576,959 A | 11/1996 | Hrovat et al. |
| 5,607,028 A | 3/1997 | Braun et al. |
| 5,636,121 A * | 6/1997 | Tsuyama et al. ............... 701/82 |
| 5,642,281 A | 6/1997 | Ishida et al. |
| 5,694,319 A | 12/1997 | Suissa et al. |
| 5,718,304 A | 2/1998 | Lee |
| 5,732,371 A | 3/1998 | Fujita |
| 5,734,570 A | 3/1998 | Arlandis |
| 5,742,507 A | 4/1998 | Eckert |
| 5,755,382 A | 5/1998 | Bennett et al. |
| 5,758,740 A | 6/1998 | Park |
| 5,790,966 A | 8/1998 | Madau et al. |
| 5,790,970 A | 8/1998 | Brachert et al. |
| 5,799,259 A | 8/1998 | Rief et al. |
| 5,809,444 A | 9/1998 | Hadeler et al. |
| 5,816,669 A | 10/1998 | Hiwatashi et al. |
| 5,832,402 A | 11/1998 | Brachert et al. |
| 5,954,349 A | 9/1999 | Rutzel |
| 5,964,814 A | 10/1999 | Muller et al. |
| 5,996,722 A * | 12/1999 | Price .......................... 180/403 |
| 6,073,067 A | 6/2000 | Fujiwara et al. |
| 6,085,860 A | 7/2000 | Hackl et al. |
| 6,119,882 A | 9/2000 | Crook et al. |
| 6,164,406 A | 12/2000 | Diekhans et al. |
| 6,186,267 B1 | 2/2001 | Hackl et al. |
| 6,192,304 B1 | 2/2001 | Goetz |
| 6,206,127 B1 | 3/2001 | Zakula, Sr. et al. |
| 6,226,579 B1 | 5/2001 | Hackl et al. |
| 6,308,134 B1 * | 10/2001 | Croyle et al. ................ 701/220 |
| 6,345,682 B1 | 2/2002 | Schoffler et al. |
| 6,371,243 B1 * | 4/2002 | Donaldson et al. ......... 182/69.4 |
| 6,374,171 B2 * | 4/2002 | Weiberle et al. ............... 701/71 |
| 6,374,940 B1 | 4/2002 | Pickert |
| 6,424,054 B1 | 7/2002 | Onnen et al. |
| 6,454,294 B1 | 9/2002 | Bittner et al. |
| 6,481,524 B1 | 11/2002 | Ishida et al. |
| 6,488,504 B1 | 12/2002 | Patterson |
| 6,546,323 B2 * | 4/2003 | Deguchi et al. ................ 701/41 |
| 6,557,658 B1 | 5/2003 | Enmeiji et al. |
| 6,615,944 B1 * | 9/2003 | Horwath et al. ............. 180/204 |
| 6,625,529 B2 * | 9/2003 | Obata et al. ................... 701/41 |
| 6,662,898 B1 * | 12/2003 | Mattson et al. ................ 701/41 |
| 6,703,717 B2 * | 3/2004 | Kawamoto et al. ....... 290/38 R |
| 6,816,764 B2 * | 11/2004 | Coelingh et al. .............. 701/37 |
| 6,827,176 B2 * | 12/2004 | Bean et al. .................. 180/411 |
| 6,862,506 B2 * | 3/2005 | Boswell et al. ................ 701/41 |
| 6,871,125 B2 * | 3/2005 | Oshima et al. ................ 701/41 |

\* cited by examiner

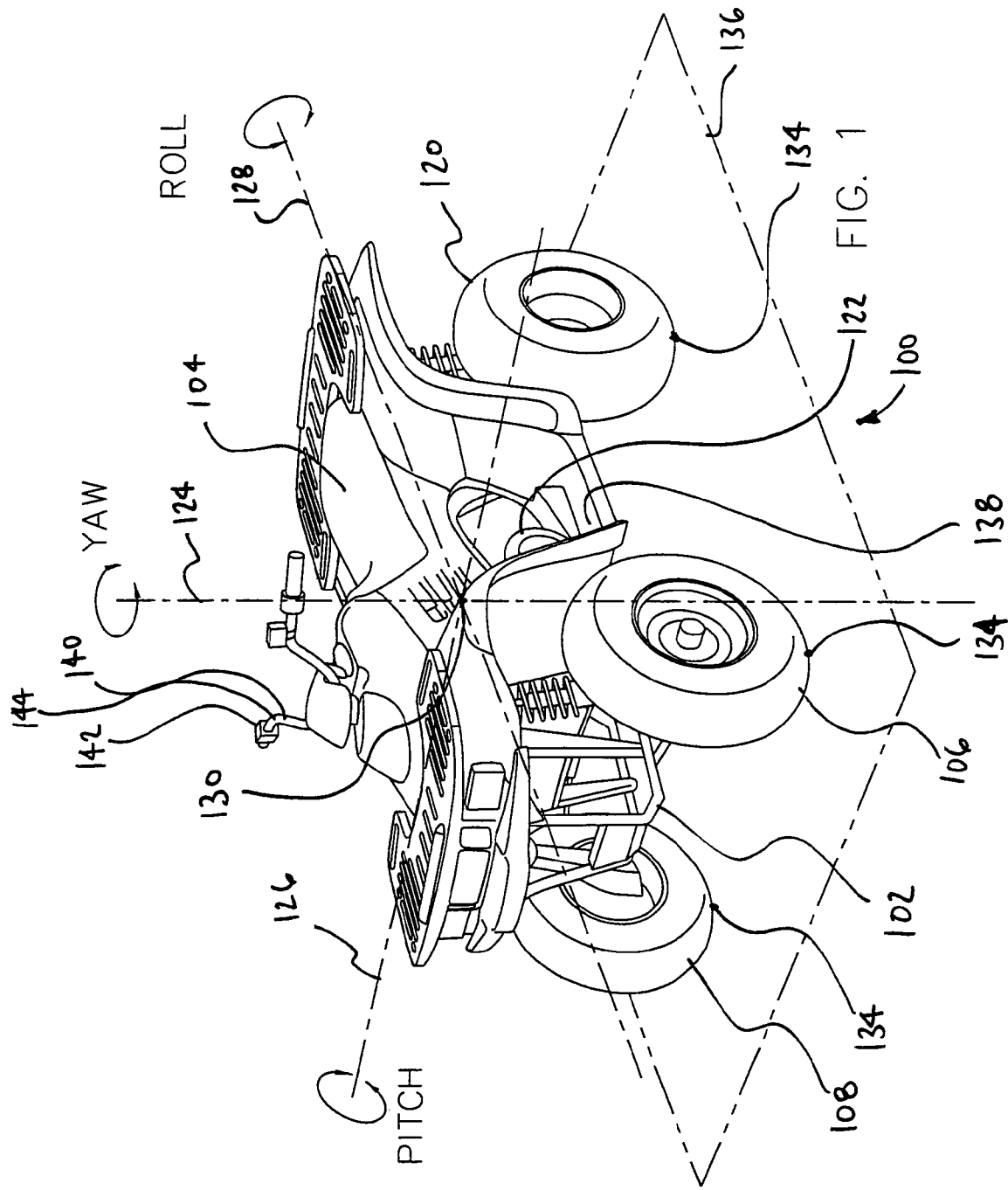

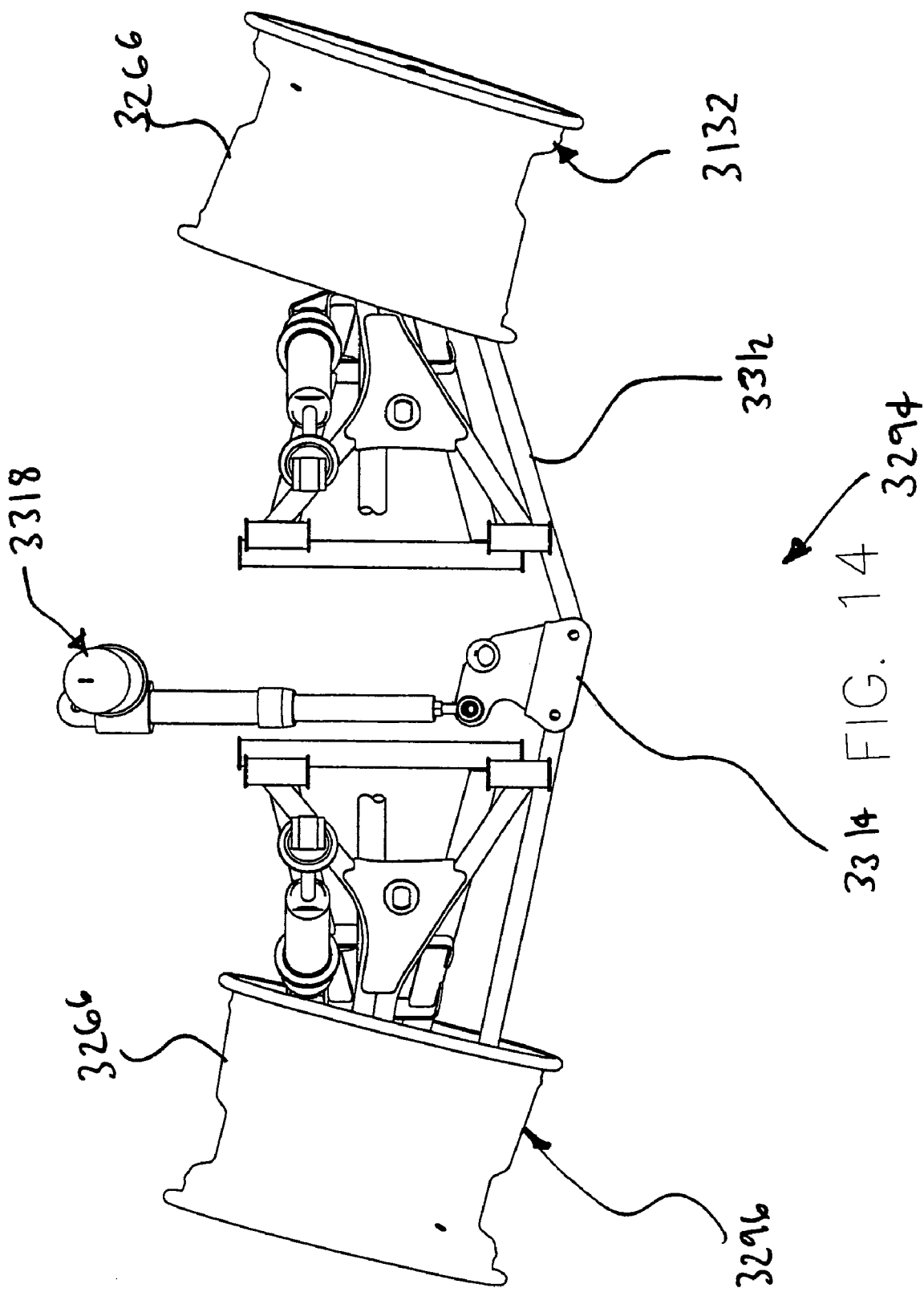

CONTROLLER FOR STEERING A VEHICLE

RELATED APPLICATIONS

The present Application claims the benefit of U.S. Provisional Patent Application No. 60/442,697, filed Jan. 27, 2003.

The present Application claims the benefit of U.S. Provisional Patent Application No. 60/459,665, filed Apr. 2, 2003.

The present Application claims the benefit of a U.S. Provisional Patent Application No. 60/483,685 entitled ATV with Multiple Steering Modes and filed Jun. 30, 2003.

The present application is also related to a U.S. patent application entitled "All Terrain Vehicle with Multiple Steering Modes" by the same inventors and filed on an even date herewith.

The entire disclosure all above-mentioned patent applications is hereby incorporated by reference herein.

FIELD OF THE INVENTION

The present invention relates generally to data processing for vehicles. More particularly, the present invention relates to data processing methods and apparatus for steering control.

BACKGROUND OF THE INVENTION

In recent years, recreational vehicles have gained widespread popularity. Perhaps the most common recreational vehicle application is trail riding. Trail riding on a recreational vehicle allows the rider to travel through areas that are not accessible by ordinary automobiles. Modern recreational vehicles, can cover ground very rapidly and can cover great distances. Frequently, recreational vehicle enthusiasts ride their recreational vehicle for many hours straight and cover many miles. During such long rides, a recreational vehicle may be used to carry a rider through a wide variety of terrain. Terrain that may be encountered includes snow, sand, mud and swampland.

Part of the thrill of riding a recreational vehicle is encountering challenging terrain and, through the performance of the recreational vehicle and the skill of the rider, passing through the terrain. It is not uncommon for recreational vehicle riders to seek out large mud holes and attempt to traverse these obstacles with a recreational vehicle. The depth of some of these mud holes is actually greater than the height of the recreational vehicle. When passing through an obstacle such as mud hole, the recreational vehicle may become immersed in water, mud, or a mixture thereof.

SUMMARY OF THE INVENTION

The present invention relates generally to recreational vehicles. More particularly, the present invention relates to all terrain vehicles having a straddle-seat for accommodating a rider and a handlebar for receiving the hands of the rider. Methods and apparatus in accordance with the present invention permit the vehicle rider to select a steering mode that is determined appropriate for the present riding conditions. In some embodiments, three steering modes are provided: a tight turning radius steering mode, a front wheel only steering mode, and a crab steering mode.

In certain advantageous embodiments of the present invention, one or more actuators are provided for selectively steering one or more rear wheels of the vehicle. In these advantageous embodiments, an electronic control unit (ECU) may be coupled to the one or more actuators. The ECU may calculate a desired steering angle for each rear wheel. The ECU may also provide a control signal to the one or more actuators so that the one or more rear wheels are rotated about their respective steering axes by the steering angle (s).

When the vehicle is operating in the tight turning radius steering mode, the rear wheels and the front wheels rotate about their corresponding steering axes in an opposite phase relationship (i.e., each rear wheel rotates about its steering axis in a clockwise direction when each front wheel is rotating about its steering axis in a counter clockwise direction). This arrangement allows the vehicle to perform turns having a relatively small radius. This arrangement may allow the vehicle, for example, to pass between tightly spaced obstacles.

When the vehicle is operating in the crab steering mode, each rear wheel rotates about a steering axis in a same-phase relationship with a front wheel (i.e., each rear wheel rotates about its steering axis in a clockwise direction when each front wheel is rotating about its steering axis in a clockwise direction). In some riding conditions, operation in the crab mode may allow the vehicle to move somewhat laterally in search of better traction. By turning the handlebar to the right and/or to the left, the operator rider may seek to move the vehicle somewhat laterally (left or right) in search of better traction to aid in traversing the terrain. In some advantageous implementations, the rear wheels can be positioned so that they do not track the front wheels while the vehicle is in the crab mode. When this is the case, traction may be enhanced when the rear wheels encounter terrain that the front wheels have not yet passed over.

When the vehicle rider determines that a particular steering mode is appropriate for the present riding conditions, an input device may be used to produce an input signal. A vehicle in accordance with the present invention, may also comprise an electronic control unit (ECU) coupled to a plurality of sensors. The ECU may compare a first riding parameter to a second riding parameter in order to determine whether operation in a second steering mode is appropriate, in light of present riding conditions. The ECU may produce an enabling signal when the ECU determines that operation in the second steering mode is appropriate for the present riding conditions.

In some exemplary embodiments of the present invention, the first signal represents the velocity of the vehicle and the second signal is representative of a velocity of a ground contacting portion of an instrument wheel of the vehicle. Also in some exemplary embodiments of the present invention, the first signal is representative of a linear acceleration of the vehicle, and the second signal is representative of a linear acceleration of a ground contacting portion of a wheel of the vehicle. When a detected inconsistency between the first signal and the second signal is greater than a certain threshold, the ECU, including a comparators will not provide an enabling signal.

DETAILED DESCRIPTION

The following detailed description should be read with reference to the drawings, in which like elements in different drawings are numbered identically. The drawings, which are not necessarily to scale, depict selected embodiments and are not intended to limit the scope of the invention. Examples of constructions, materials, dimensions, and manufacturing processes are provided for selected elements. All other elements employ that which is known to those of skill in the field of the invention. Those skilled in the art will recognize that many of the examples provided have suitable alternatives that can be utilized.

Figure 1:
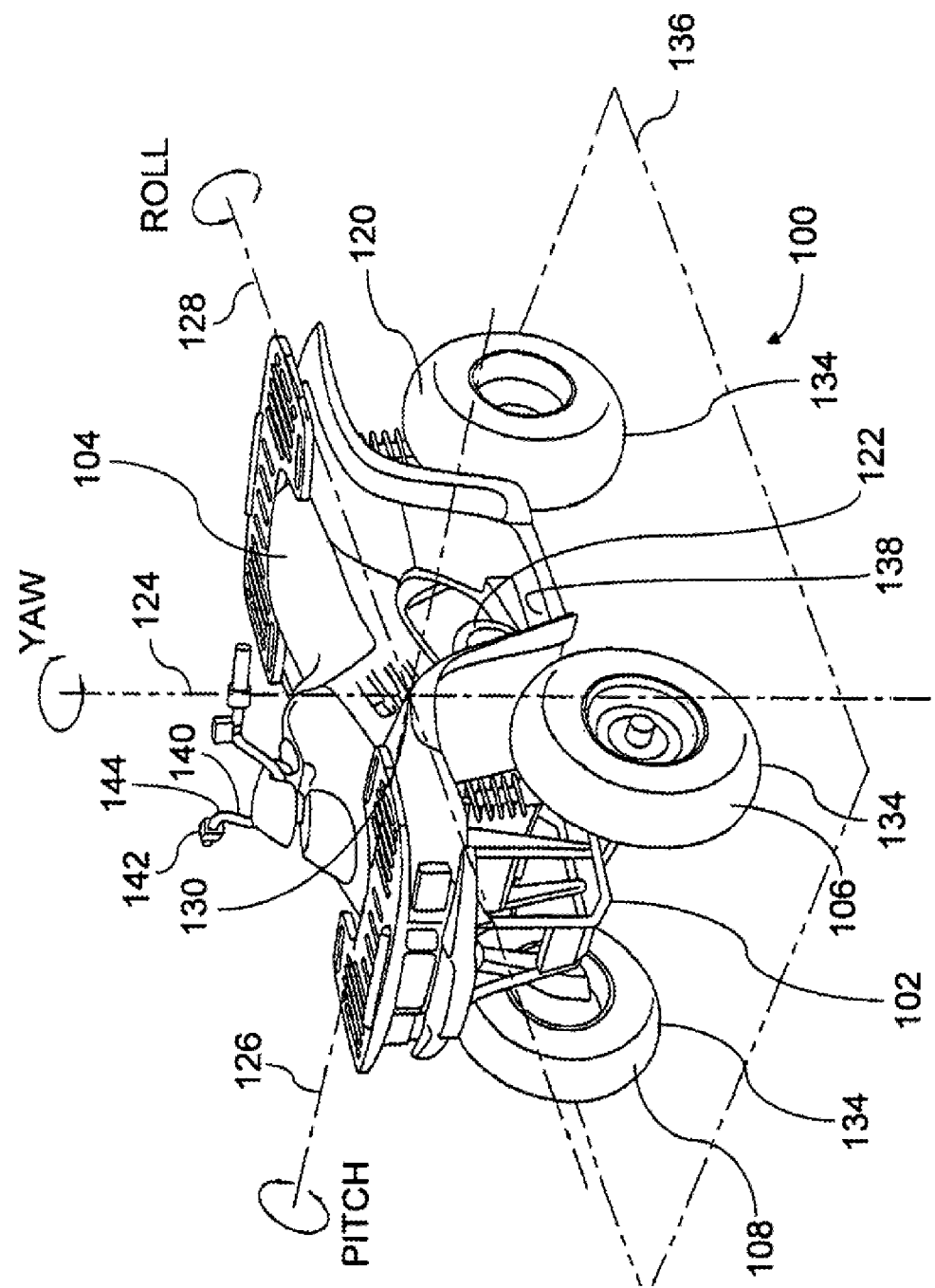
FIG. 1 is a perspective view of a vehicle in accordance with an exemplary embodiment of the present invention.
Figure 2:
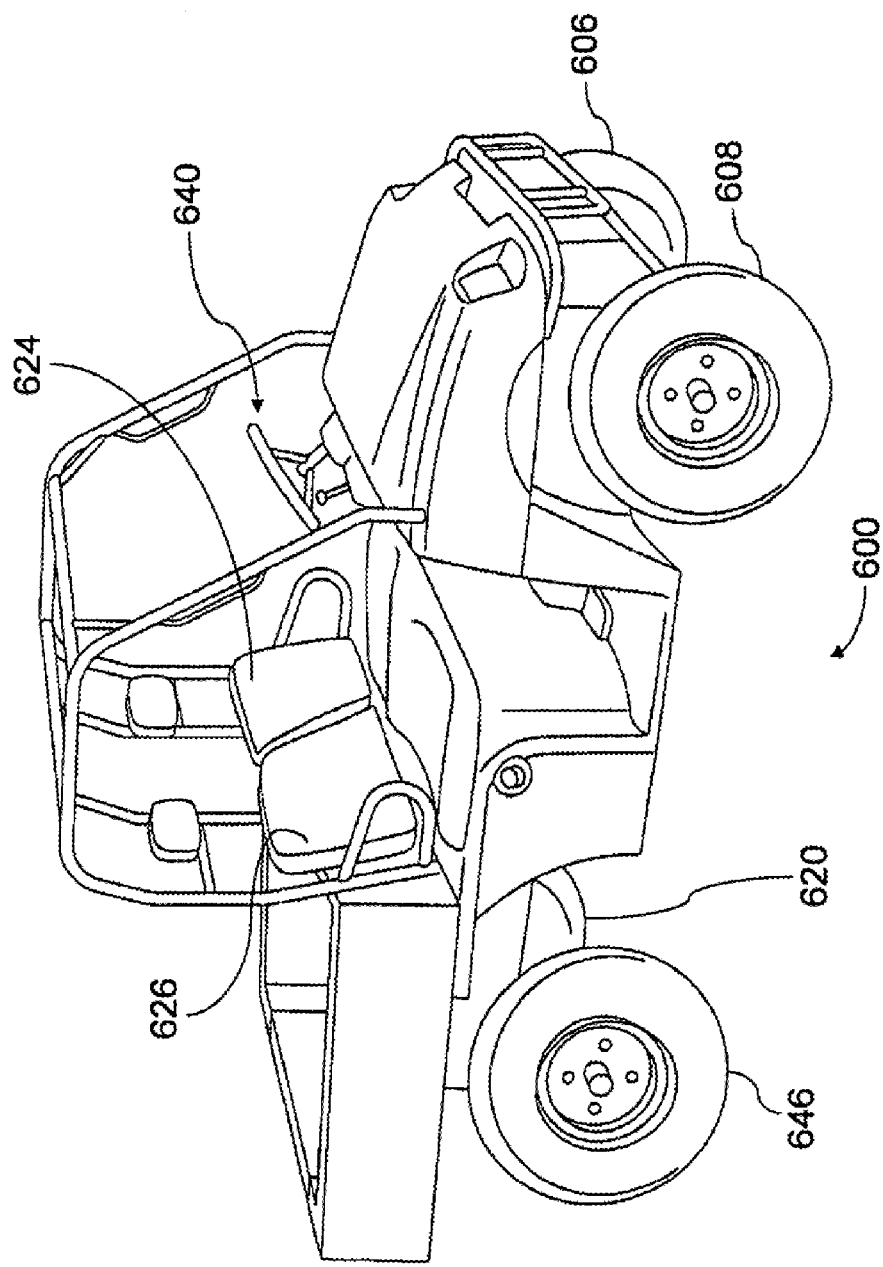
Figure 3:
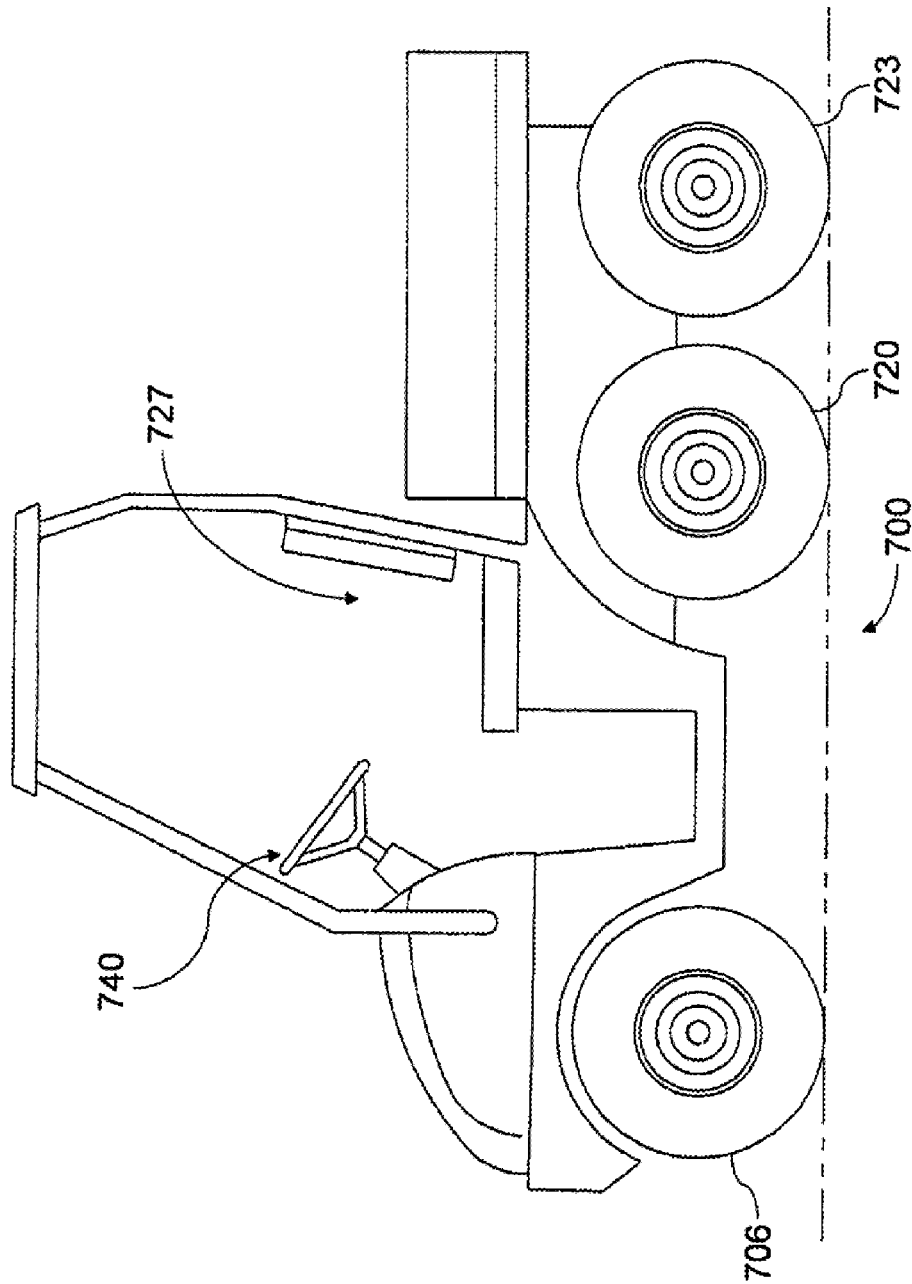
Figure 4:
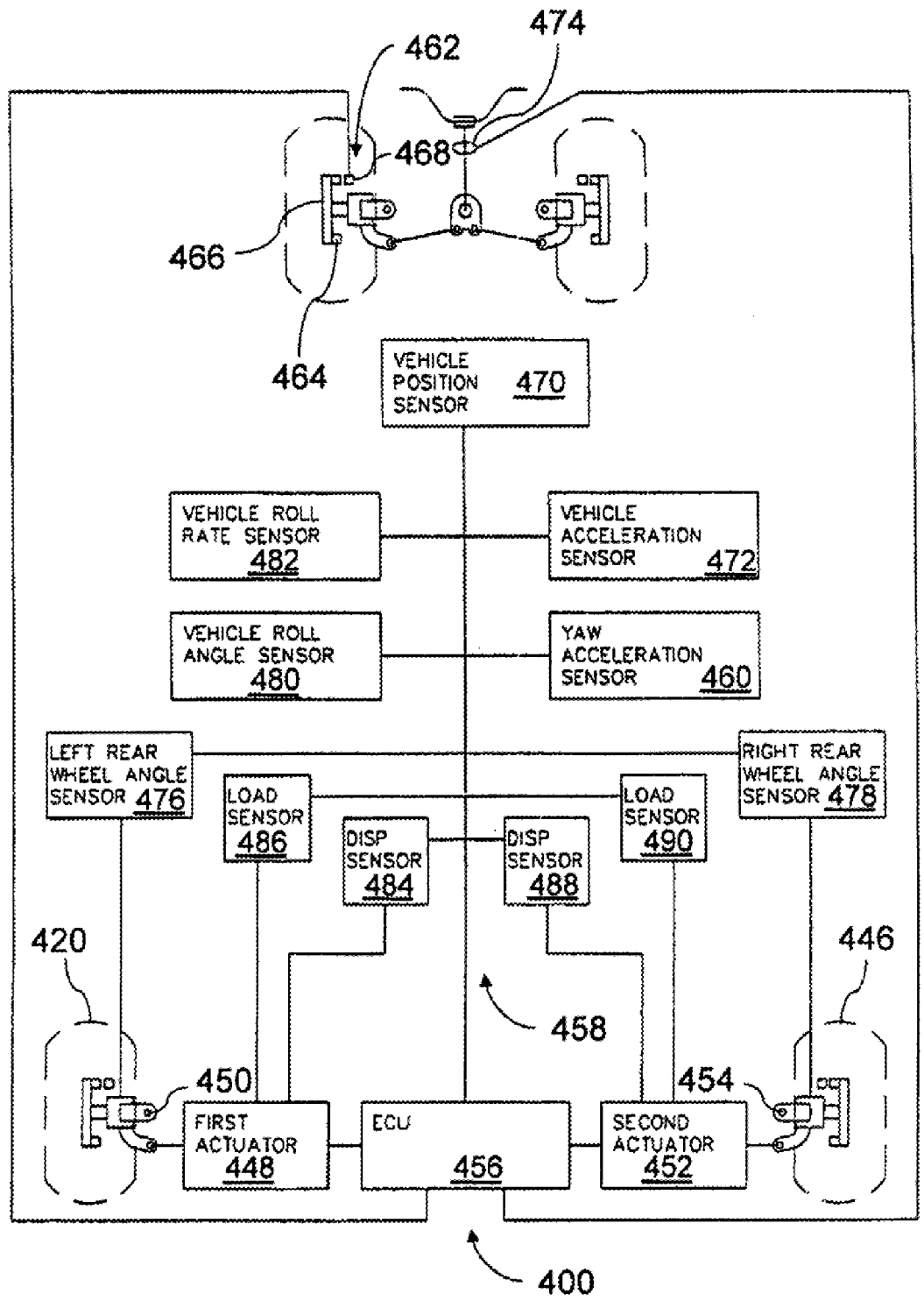
Figure 5:
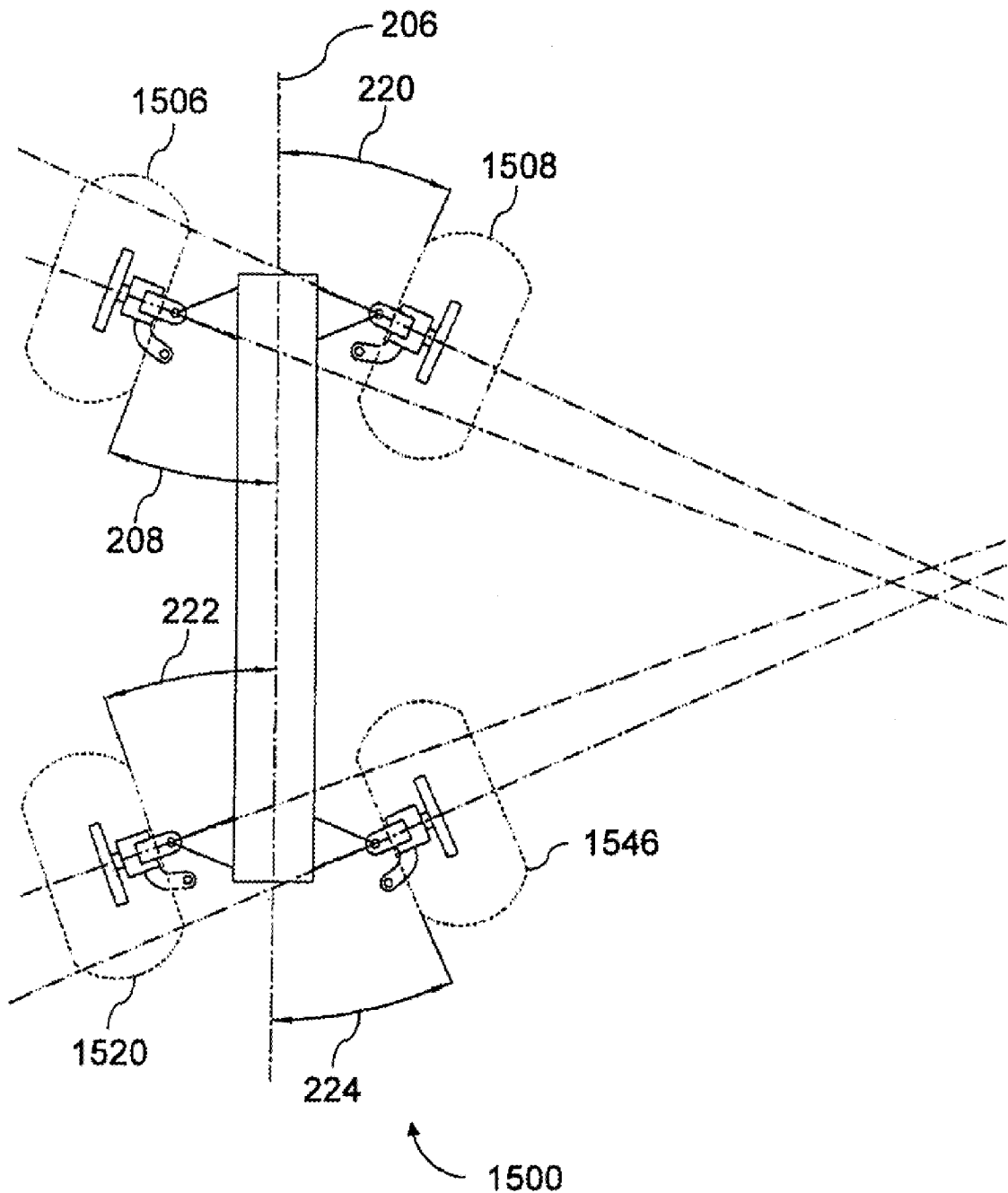
Figure 6:
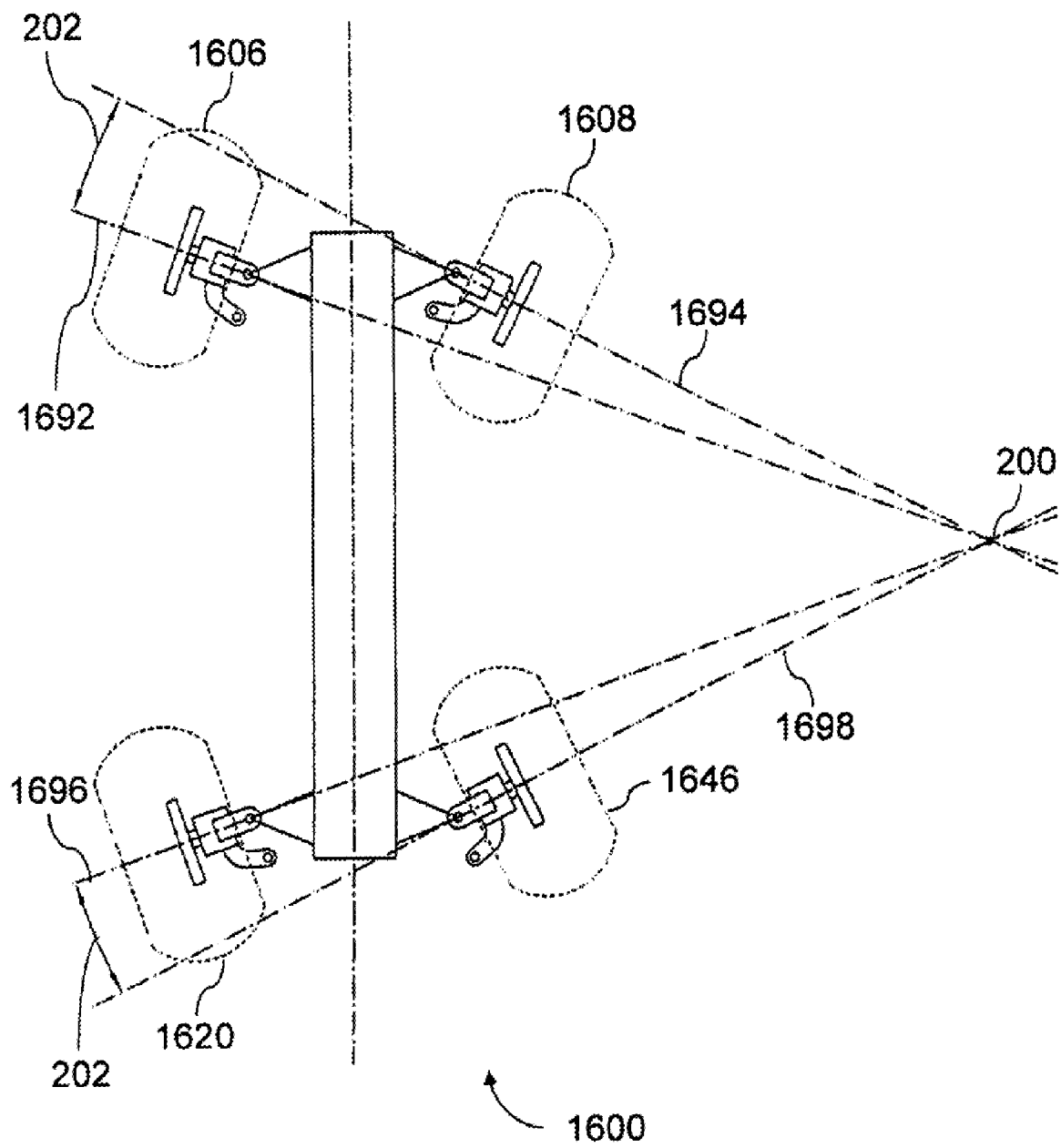
Figure 7:
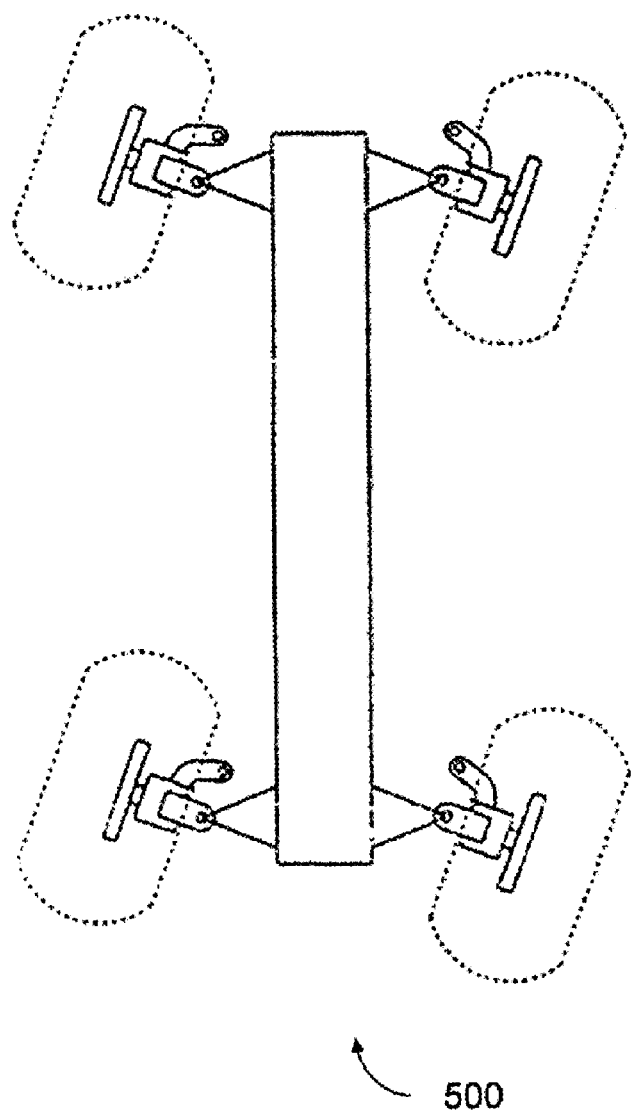
Figure 8:
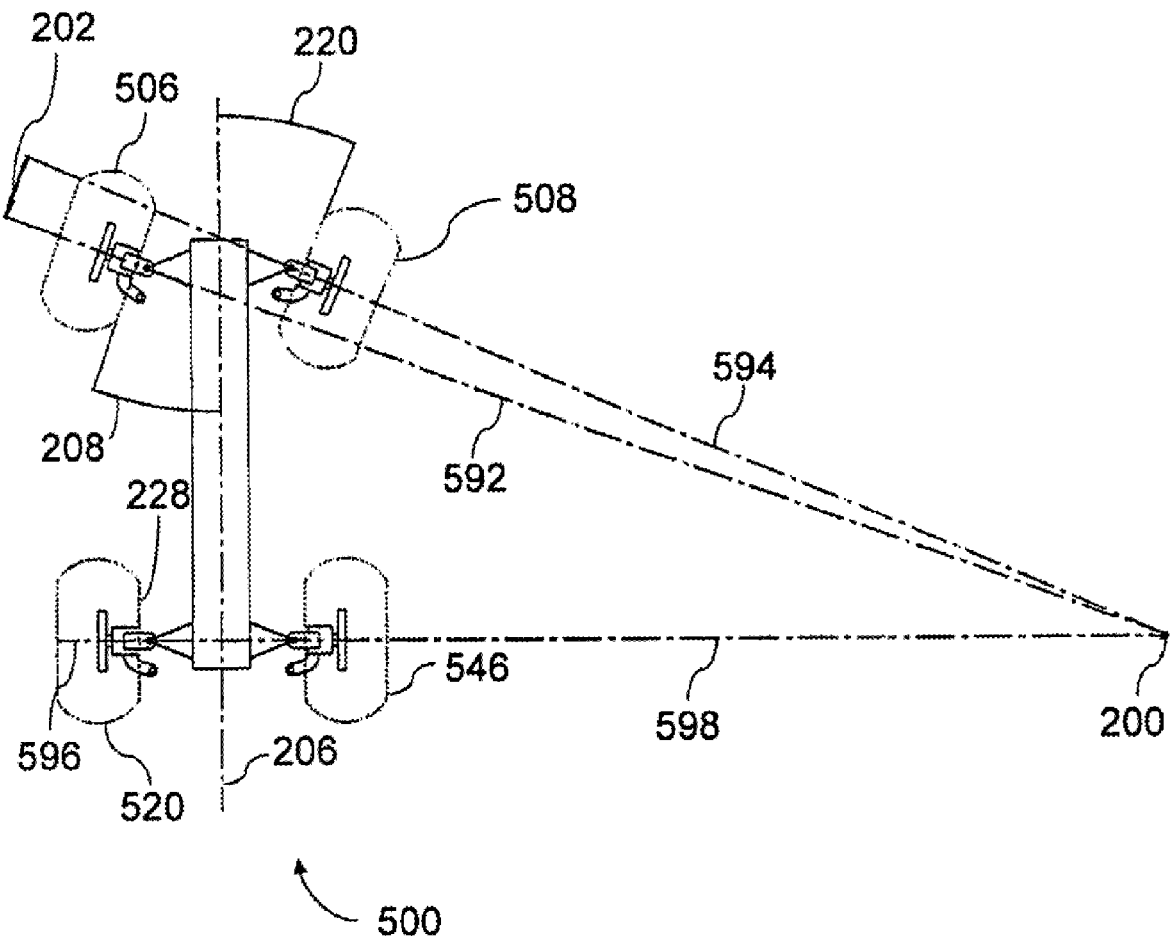
Figure 9:
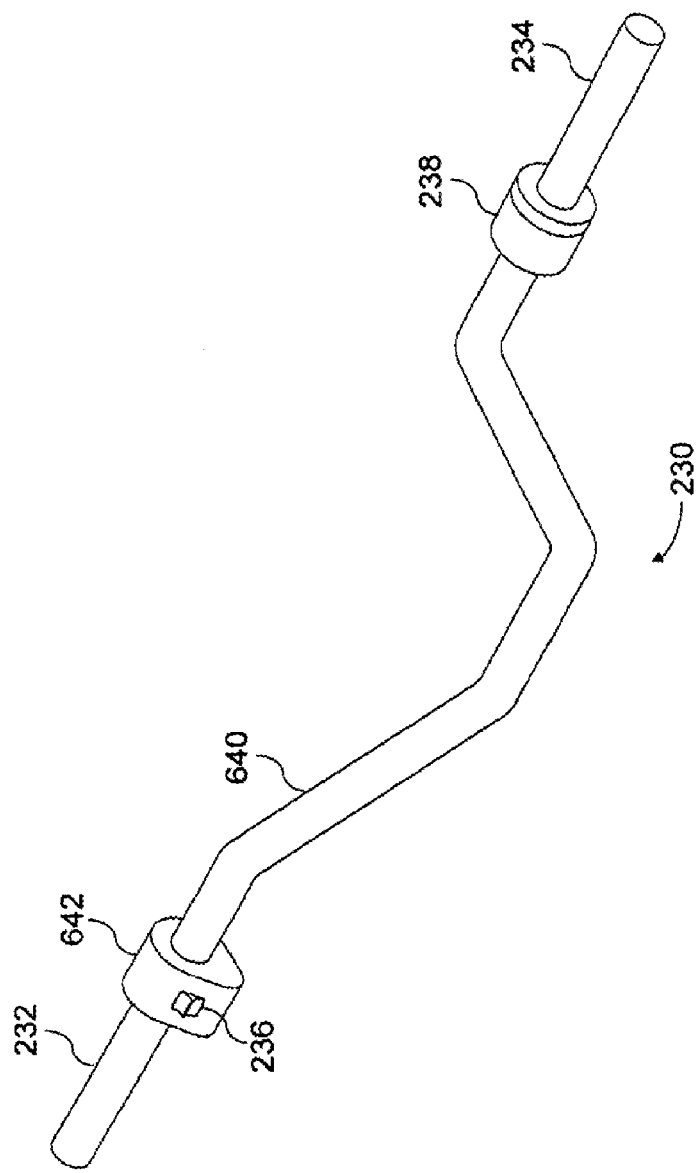
Figure 10:
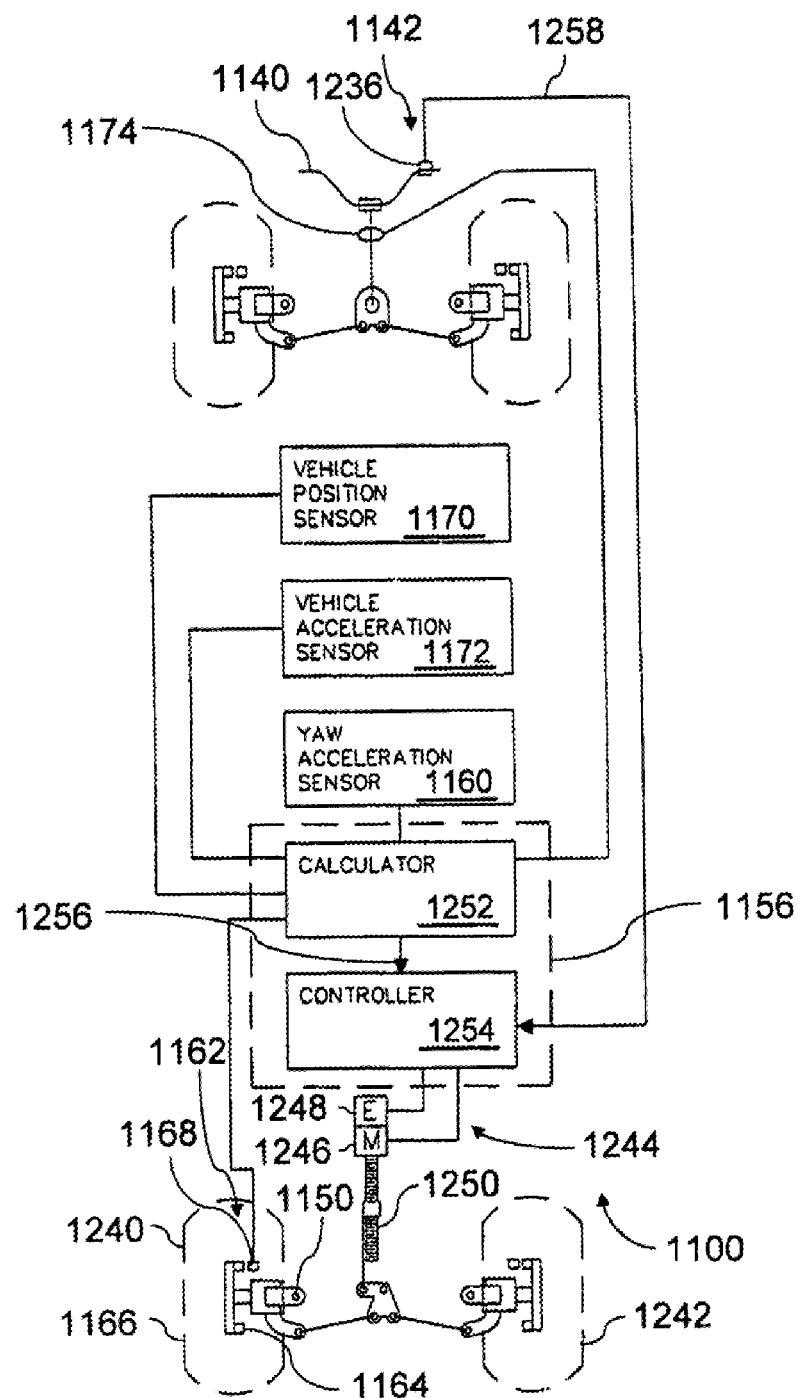
Figure 11:
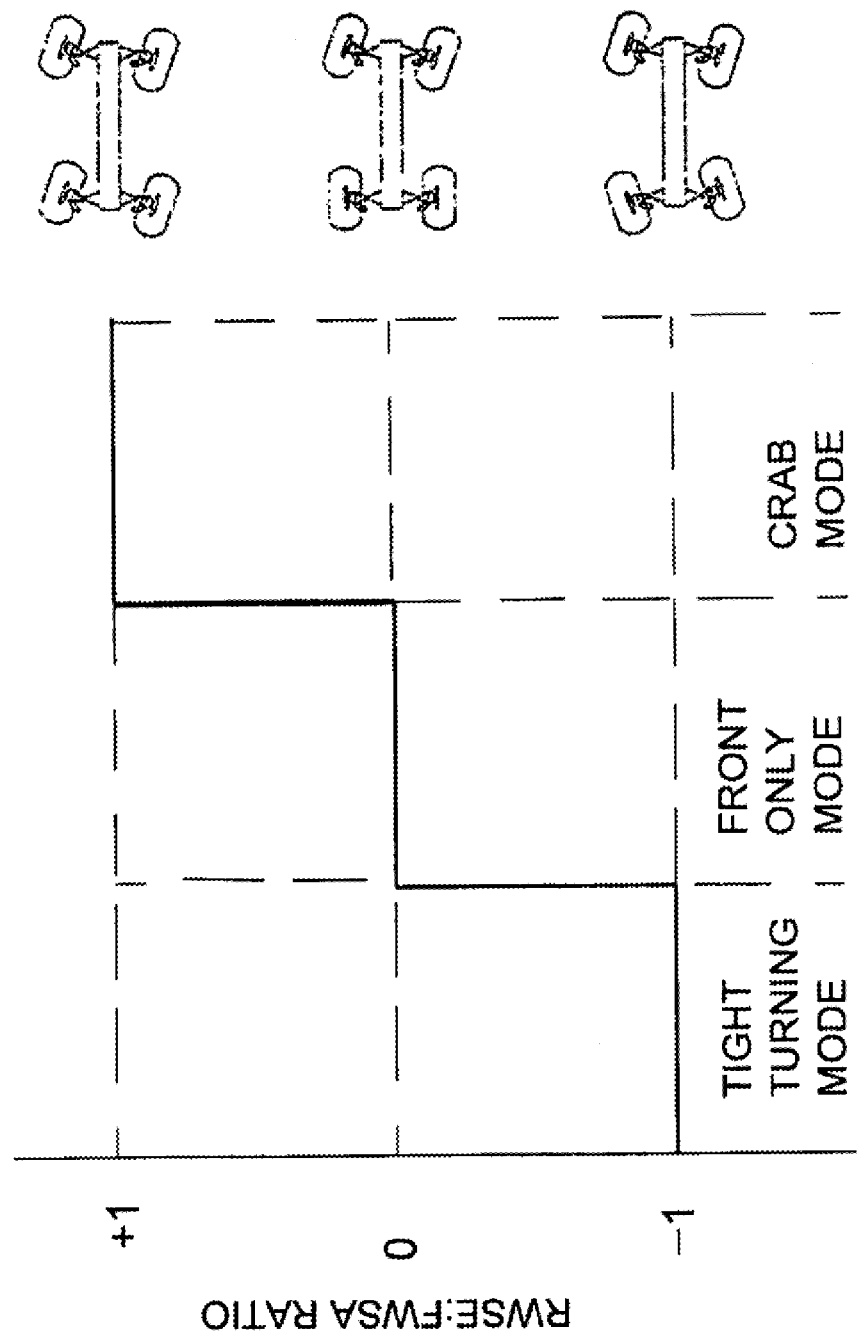
Figure 12:
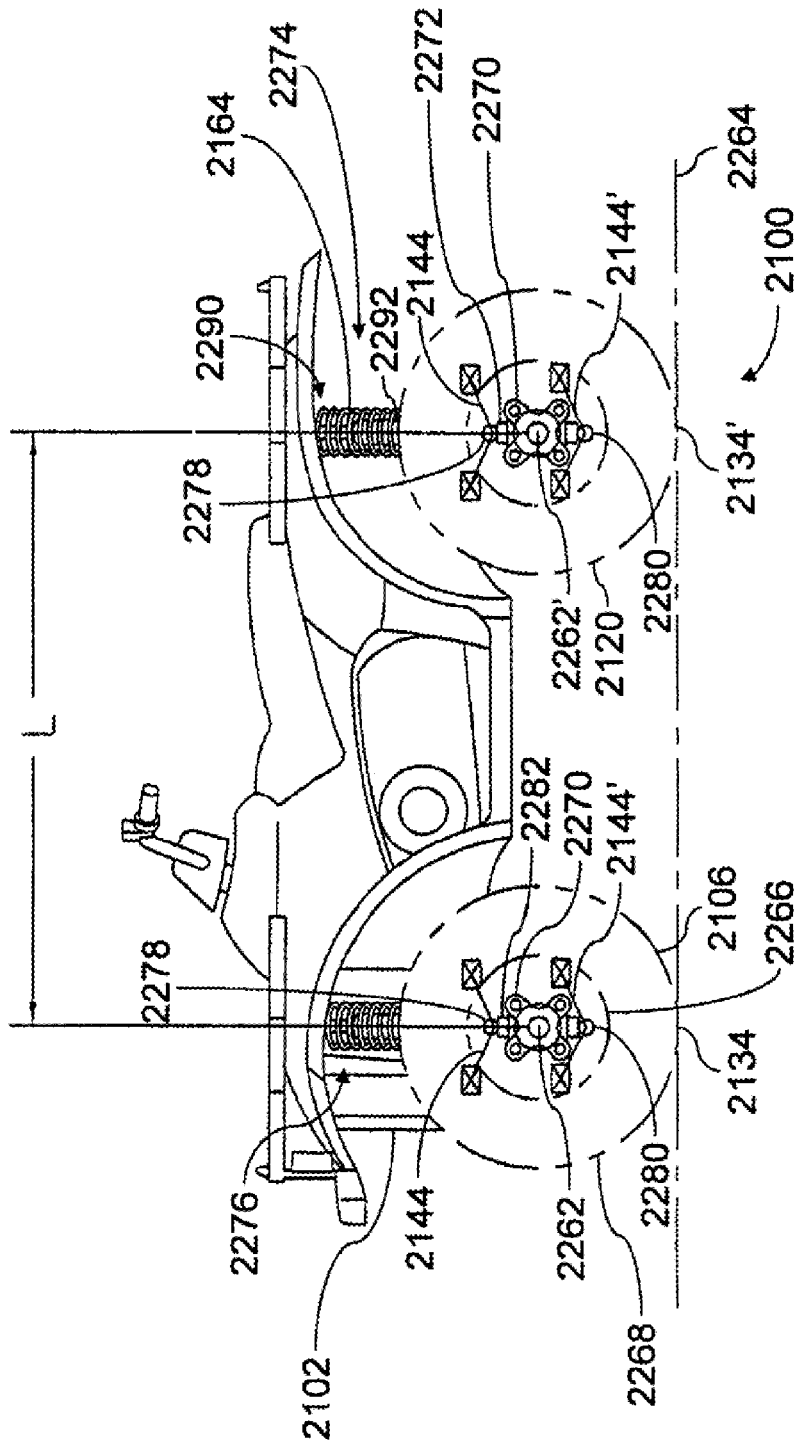
Figure 13:
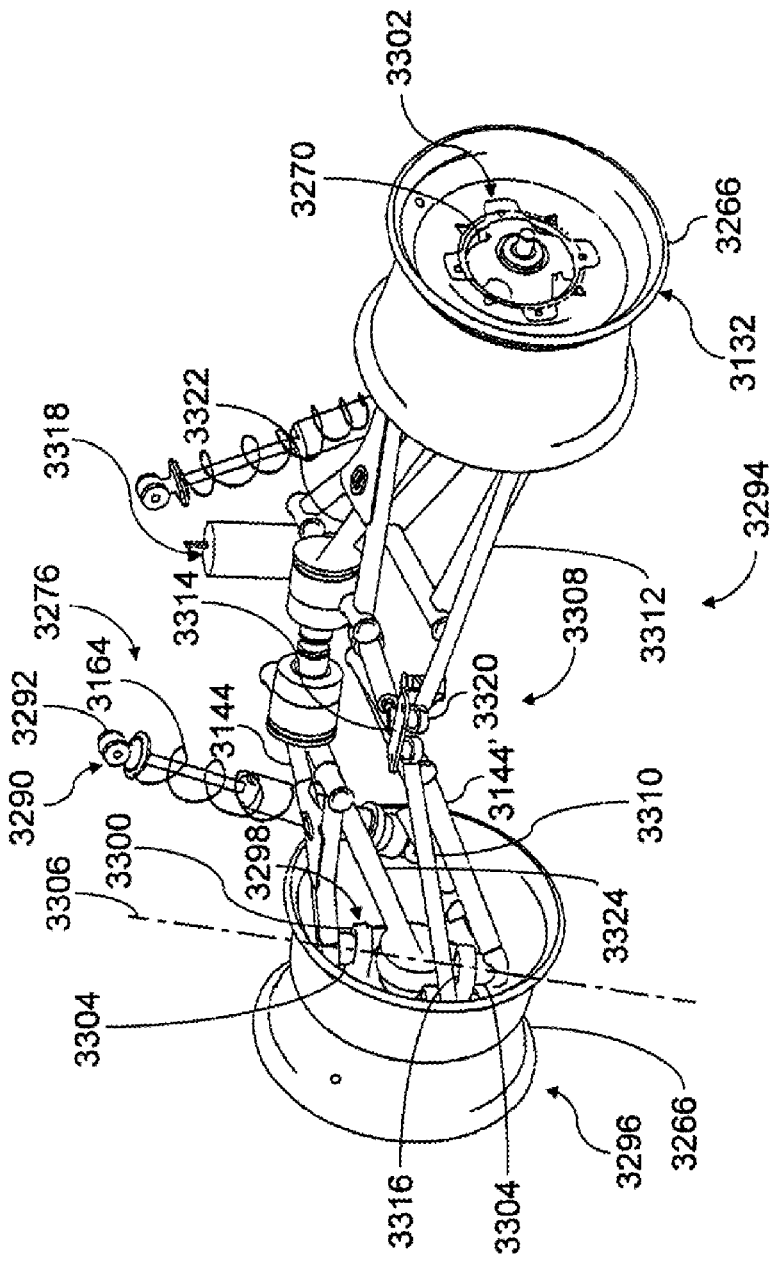

FIG. 1 is a perspective view of a vehicle 100 in accordance with an exemplary embodiment of the present invention. Vehicle 100 of FIG. 1 may be generally referred to as an ATV. Vehicle 100 comprises a chassis 102 carrying a straddle type seat 104. In the embodiment of FIG. 1, straddle type seat 104 is sufficiently narrow to be straddled by a vehicle rider. In the embodiment of FIG. 1, vehicle 100 has a left front wheel 106, a right front wheel 108, a left rear wheel 120 and right rear wheel (not visible in FIG. 1). Vehicle 100 also includes an engine 122 that is carried by chassis 102. Engine 122 is preferably coupled to at least some wheels of vehicle 100 via a drive train for propelling vehicle 100. Engine 122 may be used to power each rear wheel, and in some cases also each front wheel.

In FIG. 1, a yaw axis 124, a pitch axis 126, and a roll axis 128 are all shown intersecting a centroid 130 of vehicle 100. As shown in FIG. 1, each left front wheel 106 and right front wheel 132 each have a momentary contact point 134. Likewise, left rear wheel 120 has a momentary contact point 134. The momentary contact points of the wheels define a wheel contact plane 136. In the embodiment of FIG. 1, left front wheel 106 and right front wheel 108 are each coupled to chassis 102 by a front suspension and left rear wheel 120 is coupled to chassis 102 by a rear suspension.

Vehicle 100 also includes a first footrest 138 that can be seen extending from one side of chassis 102 in FIG. 1. Vehicle 100 may also include a second footrest (not shown in FIG. 1) that extends from the other side of the chassis. Vehicle 100 also includes a steering member 140 that may be used for steering vehicle 100. In the embodiment of FIG. 1, steering member 140 comprises a handlebar. Vehicle 100 of FIG. 1 may advantageously operate in more than one steering mode. An input device 142 of vehicle 100 may be used to provide a signal indicative of a desired steering mode. In the embodiment of FIG. 1, input device 142 comprises a switch disposed on an arm 144 of the handlebar.

Figure 2:
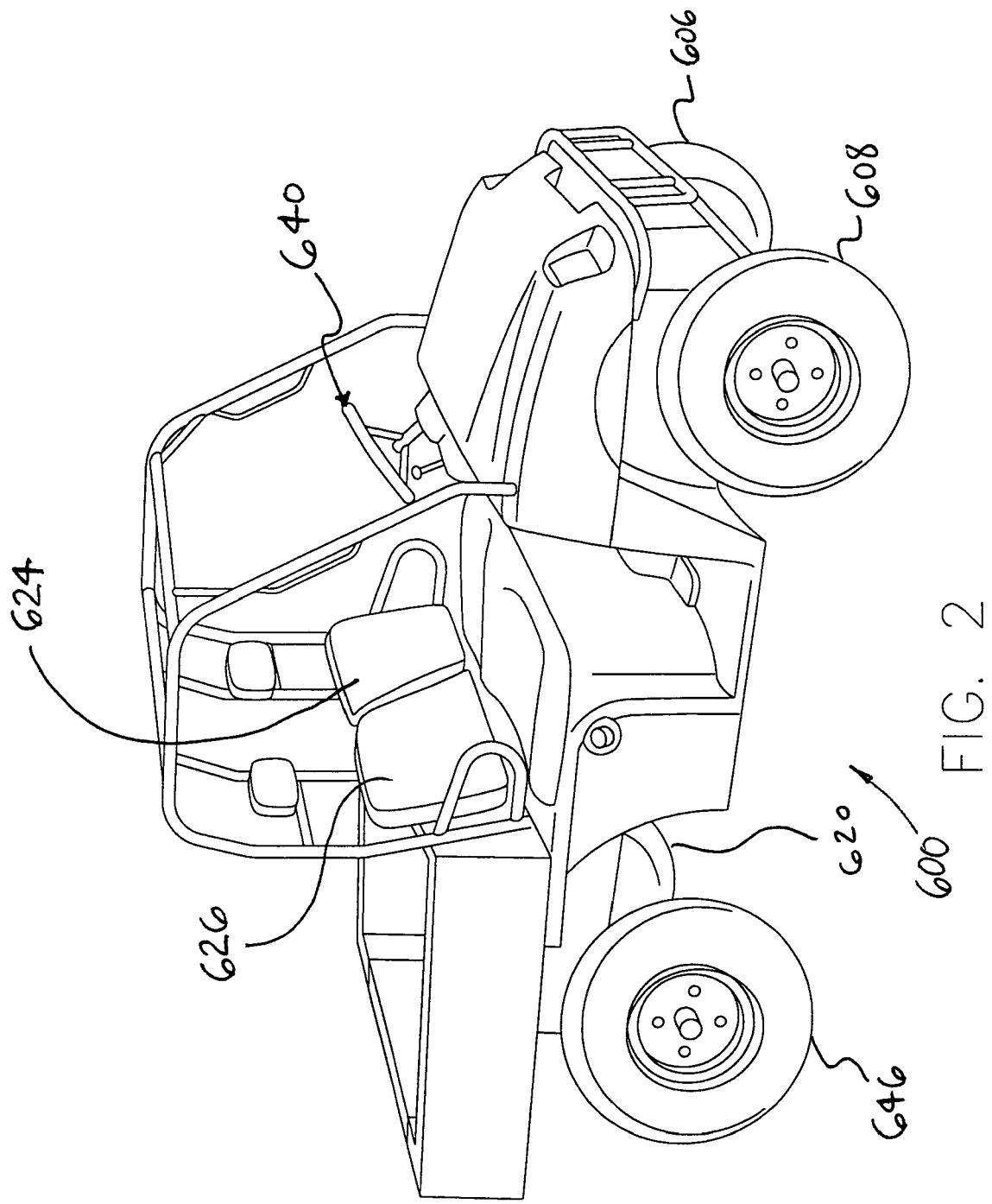
FIG. 2 is a perspective view of a vehicle in accordance with an additional exemplary embodiment of the present invention.

FIG. 2 is an isometric view of a vehicle 600 in accordance with an additional exemplary embodiment of the present invention. Vehicle 600 of FIG. 2 comprises a first seat 624 and a second seat 626. In the embodiment of FIG. 2, first seat 624 and second seat 626 are positioned and dimensioned so as to accommodate two persons sitting side-by-side. Vehicle 600 also includes a steering member 640 that may be used for steering vehicle 600. In the embodiment of FIG. 2, steering member 640 comprises a steering wheel. Vehicle 600 of FIG. 2 includes a left front wheel 606, right front wheel 608, left rear wheel 620, and a right rear wheel 646. In some exemplary embodiments of the present invention, the wheels of vehicle 600 may turned in accordance more than one steering mode. An input device of vehicle 600 may be used to provide a signal indicating a steering mode desired by the vehicle operator.

Figure 3:
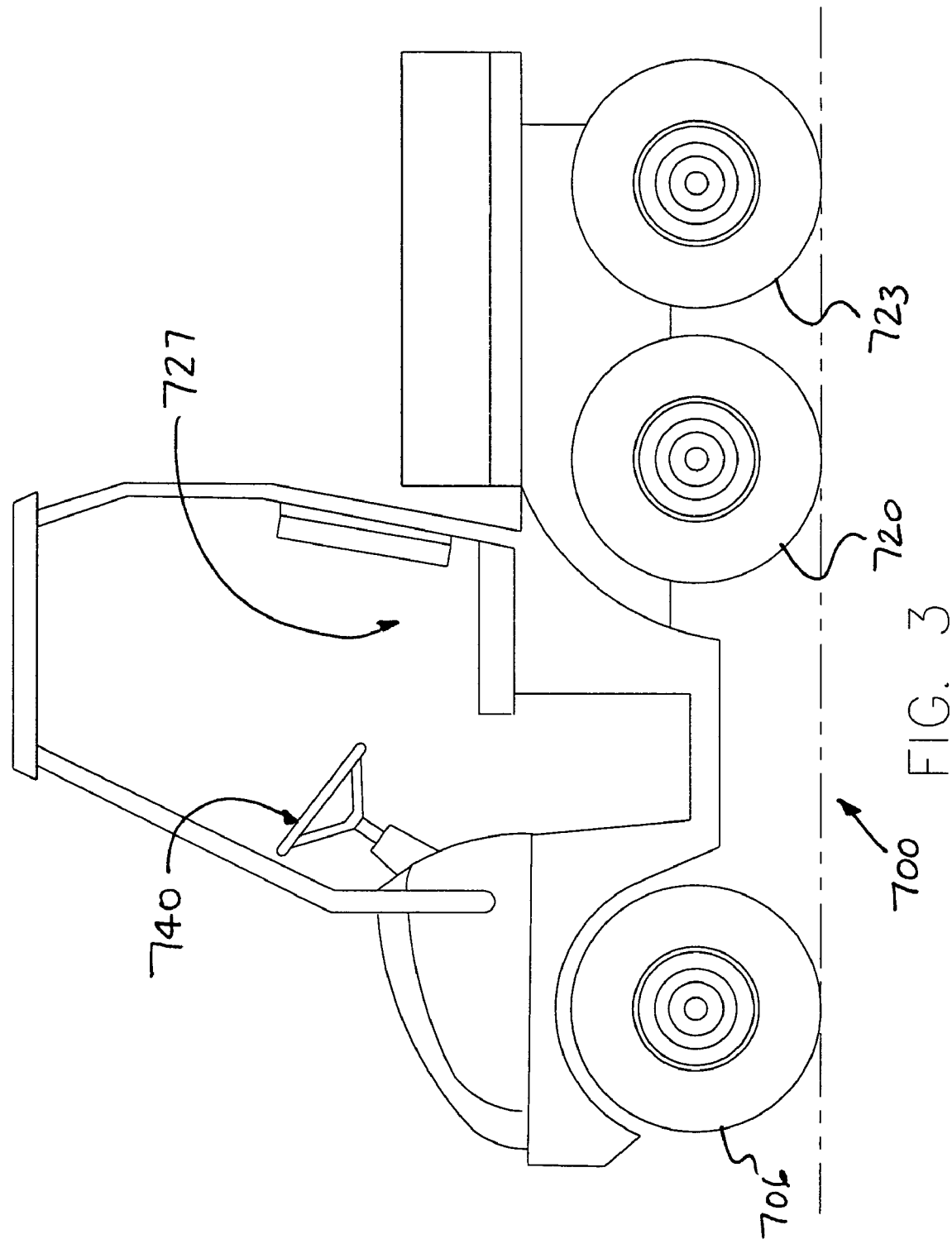
FIG. 3 is a side view of a vehicle in accordance with another exemplary embodiment of the present invention.

FIG. 3 is a side view of a vehicle 700 in accordance with another exemplary embodiment of the present invention. Vehicle 700 of FIG. 3 comprises a seat 727 that is positioned and dimensioned to accommodate a sitting person. Vehicle 700 also includes a steering member 740 that may be used for steering vehicle 700. In the embodiment of FIG. 3, steering member 740 comprises a steering wheel. A left front wheel 706, a first left rear wheel 720 and a second left rear wheel 723 are shown in FIG. 3. In the exemplary embodiment of FIG. 3, vehicle 700 includes one additional front wheel and two additional rear wheels that are not visible in FIG. 3. In some exemplary embodiments of the present invention, these wheels may all be turned in accordance one or more steering modes.

Figure 4:
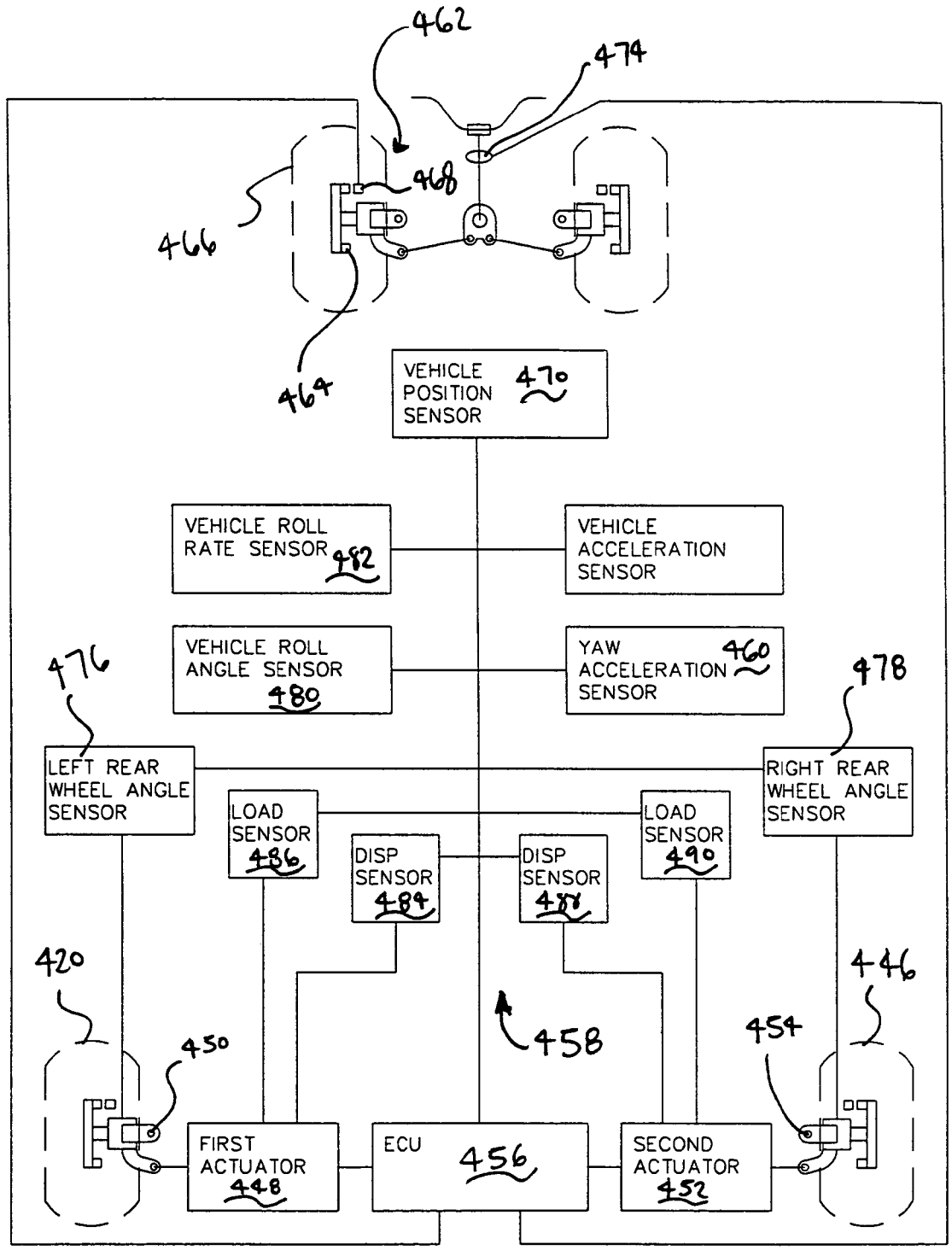
FIG. 4 is a block diagram showing a vehicle in accordance with the present invention.

FIG. 4 is a block diagram showing a vehicle 400 in accordance with the present invention. Vehicle 400 includes a left rear wheel 420 and a right rear wheel 446. In the embodiment of FIG. 4, a first actuator 448 and a second actuator 452 are coupled to left rear wheel 420 and right rear wheel 446 respectively. In the embodiment of FIG. 4, first actuator 448 is capable of selectively rotating left rear wheel 420 about a first steering axis 450. Similarly, second actuator 452 is capable of selectively rotating right rear wheel 446 about a second steering axis 454.

In the embodiment of FIG. 4, first actuator 448 and second actuator 452 are both connected to an electronic control unit (ECU) 456. With reference to FIG. 4, it may also be appreciated that a sensor array 458 is coupled to ECU 456. In some advantageous embodiments of the present invention, ECU 456 is capable of calculating a left rear wheel steering angle and a right rear wheel steering angle. In some cases, the value of the left rear wheel steering angle and a right rear wheel steering angle may be based upon signals received from sensor array 458. ECU 456 may also provide a control signal to first actuator 448, causing first actuator 448 to turn left rear wheel 420 about first steering axis 450 by the left rear wheel steering angle. Additionally, ECU 456 may provide a control signal to second actuator 452, causing second actuator 452 to turn right rear wheel 446 about second steering axis 454 by a right rear wheel steering angle.

It is to be appreciated that sensor array 458 may comprise various sensors without deviating from the spirit and scope of the present invention. For example, a sensor array in accordance with the present invention may include, but is not limited to a handlebar angle sensor, a left rear wheel angle sensor, a right rear wheel angle sensor, a vehicle roll angle sensor, a vehicle roll rate sensor, an actuator displacement sensor, an actuator load sensor, a yaw acceleration sensor, a vehicle acceleration sensor, and a vehicle position sensor.

In the embodiment of FIG. 4, sensor array 458 comprises a yaw acceleration sensor 460. Yaw acceleration sensor 460 may comprise, for example, two accelerometers that are arranged to measure acceleration of vehicle 400 in a lateral direction. These two accelerometers may be longitudinally spaced so that rotational acceleration about an axis disposed between the two accelerometers may be calculated using the output from the two accellerometers.

Sensor array 458 of FIG. 4 also comprises a wheel rotation sensor 462. Wheel rotation sensor 462 may comprise various components without deviating from the spirit and scope of the present invention. For example, wheel rotation sensor 462 may comprise a ring 464 coupled to an instrumented wheel 466 and a ring detector 468 coupled to the chassis of vehicle 400. Ring 464 may comprise, for example, a toothed ring comprising a ferrous material and/or a magnetic ring having alternating magnetic poles. Ring detector 468 may comprise, for example, one or more Hall effect sensors and/or one or more magnostrictive sensors.

A vehicle position sensor 470 of sensor array 458 is also shown in FIG. 4. Vehicle position sensor 470 may comprise various components without deviating from the spirit and scope of the present invention. For example, vehicle position sensor 470 may comprise a global positioning system (GPS). GPS chip sets are commercially available from Motorola of Phoenix, Ariz.; Phillips Semiconductor of Sunnyvale, Calif.; Rockwell Semiconductor of Newport Beach, Calif.; SGS-Thompson of Lincoln, Mass.; SiRF Technology of Sunnyvale Calif.; and GEC Plessey of Scotts Valley California.

By way of a second example, vehicle position sensor 470 may comprise an emitter for emitting a beam and a detector for detecting a reflected portion of the beam. In some embodiments the beam may comprise electromagnetic radiation (e.g., infrared light, visible light, ultraviolet light, and laser light). In other embodiments, the beam may comprise sound waves and/or ultrasonic waves. By way of yet another example, vehicle position sensor may comprise a radio location system (e.g., LORAN). Vehicle acceleration sensor 472 may comprise an accelerometer.

In the embodiment of FIG. 4, sensor array 458 also comprises a handlebar angle sensor 474, a left rear wheel angle sensor 476, a right rear wheel angle sensor 478, a vehicle roll angle sensor 480, a vehicle roll rate sensor 482, a first actuator displacement sensor 484, a first actuator load sensor 486, a second actuator displacement sensor 488, and a second actuator load sensor 490.

Figure 5:
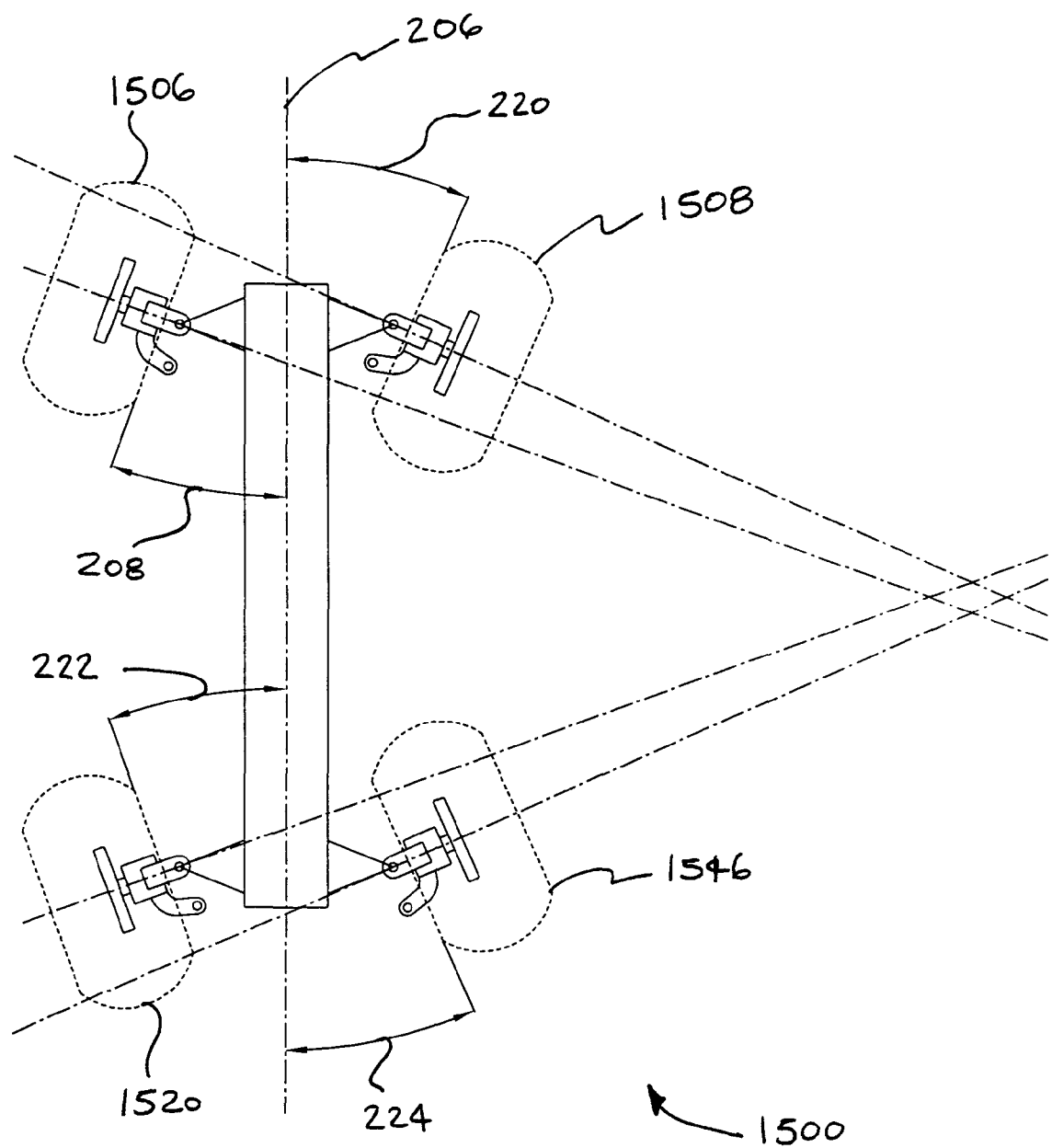
FIG. 5 is a top view of a vehicle operating in a tight turning radius steering mode.

FIG. 5 is a top view of a vehicle 1500 having a left front wheel 1506, a right front wheel 1508, a left rear wheel 1520 and a right rear wheel 1546. In the embodiment of FIG. 5, vehicle 1500 is operating in a tight turning radius steering mode. When vehicle 1500 is operating in the tight turning radius steering mode, the front wheels and the rear wheels rotate about their corresponding steering axes in an opposite phase relationship (i.e., each rear wheel is rotating about its steering axis in a clockwise direction when each front wheel is rotating about its steering axis in a counter clockwise direction).

With reference to FIG. 5, it may be appreciated that each wheel is turned relative to a longitudinal axis 206 of vehicle 1500 by a steering angle. More particularly, left front wheel 1506 is turned by a first steering angle 208, right front wheel 1508 is turned by a second steering angle 220, left rear wheel 1520 is turned by a third steering angle 222 and right rear wheel 1546 is turned by a fourth steering angle 224. The turning arrangement illustrated in FIG. 5 may allow vehicle 1500 to perform turns having a relatively small radius. This arrangement may allow vehicle 1500, for example, to pass between tightly spaced obstacles.

Figure 6:
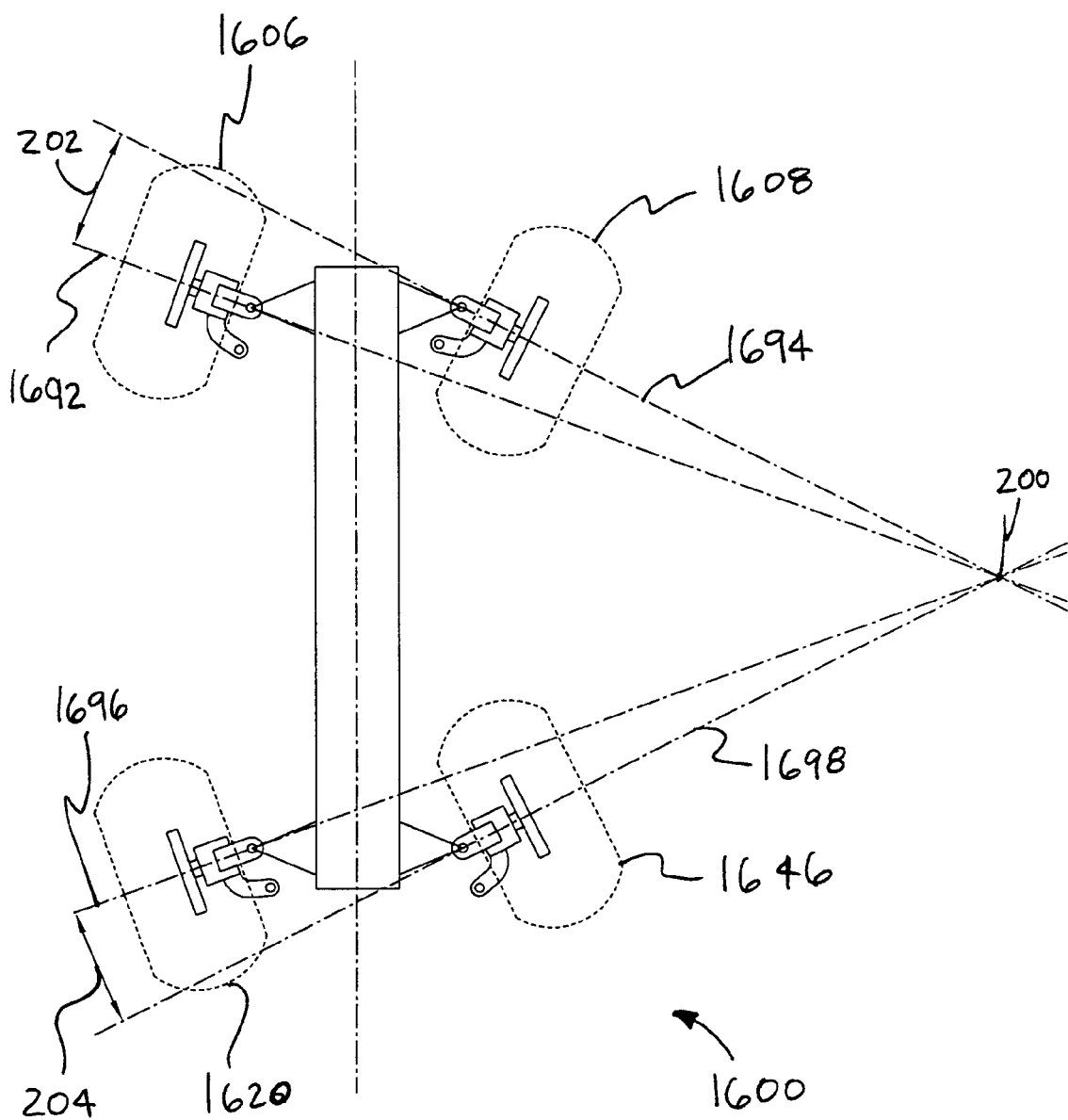
FIG. 6 is a top view of a vehicle operating in a tight turning radius steering mode.

FIG. 6 is a top view of a vehicle 1600 having a left front wheel 1606, a right front wheel 1608, a left rear wheel 1620 and a right rear wheel 1646. In the embodiment of FIG. 6, vehicle 1600 is operating in a tight turning radius steering mode. When vehicle 1600 is operating in the tight turning radius steering mode, the front wheels and the rear wheels rotate about their corresponding steering axes in an opposite phase relationship (i.e., each rear wheel is rotating about its steering axis in a clockwise direction when each front wheel is rotating about its steering axis in a counter clockwise direction).

In FIG. 6 a rotational axis of each wheel is illustrated using a dashed line. More particularly, left front wheel 1606 rotates about a first rotational axis 1692, right front wheel 1608 rotates about a second rotational axis 1694, left rear wheel 1620 rotates about a third rotational axis 1696 and right rear wheel 1646 rotates about a fourth rotational axis 1698. In FIG. 6, first rotational axis 1692, second rotational axis 1694, third rotational axis 1696 and fourth rotational axis 1698 are all shown intersecting at a turn center 200. In the embodiment of FIG. 6, first rotational axis 1692 and second rotational axis 1694 define a front Ackerman angle 202. Similarly, third rotational axis 1696 and fourth rotational axis 1698 are shown defining a rear Ackerman angle 204 in FIG. 6.

Figure 7:
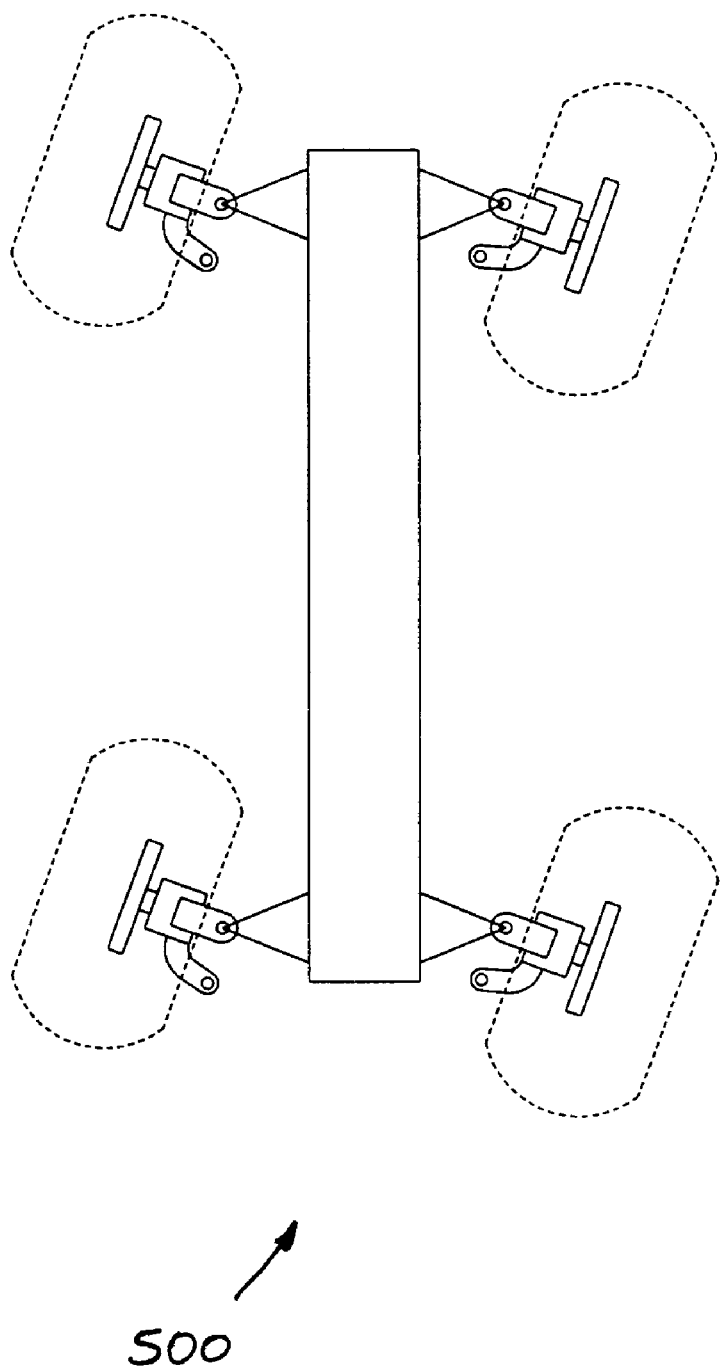
FIG. 7 is a top view of a vehicle operating in a crab steering mode.

FIG. 7 is a top view of a vehicle 500 that is operating in a crab steering mode. When the vehicle is operating in the crab steering mode, each rear wheel rotates about a steering axis in a same-phase relationship with a front wheel (i.e., each rear wheel is rotating about its steering axis in a clockwise direction when each front wheel is rotating about its steering axis in a clockwise direction. By rotating the handlebar clockwise and/or counter clockwise, the vehicle rider may seek to move the vehicle somewhat laterally (left or right) in search of better traction to aid in traversing the terrain. In some advantageous implementations, the rear wheels are capable of assuming a position so as to not track the front wheels. When this is the case, traction may be enhanced as the rear wheels encounter terrain that the front wheels have not yet passed over.

Figure 8:
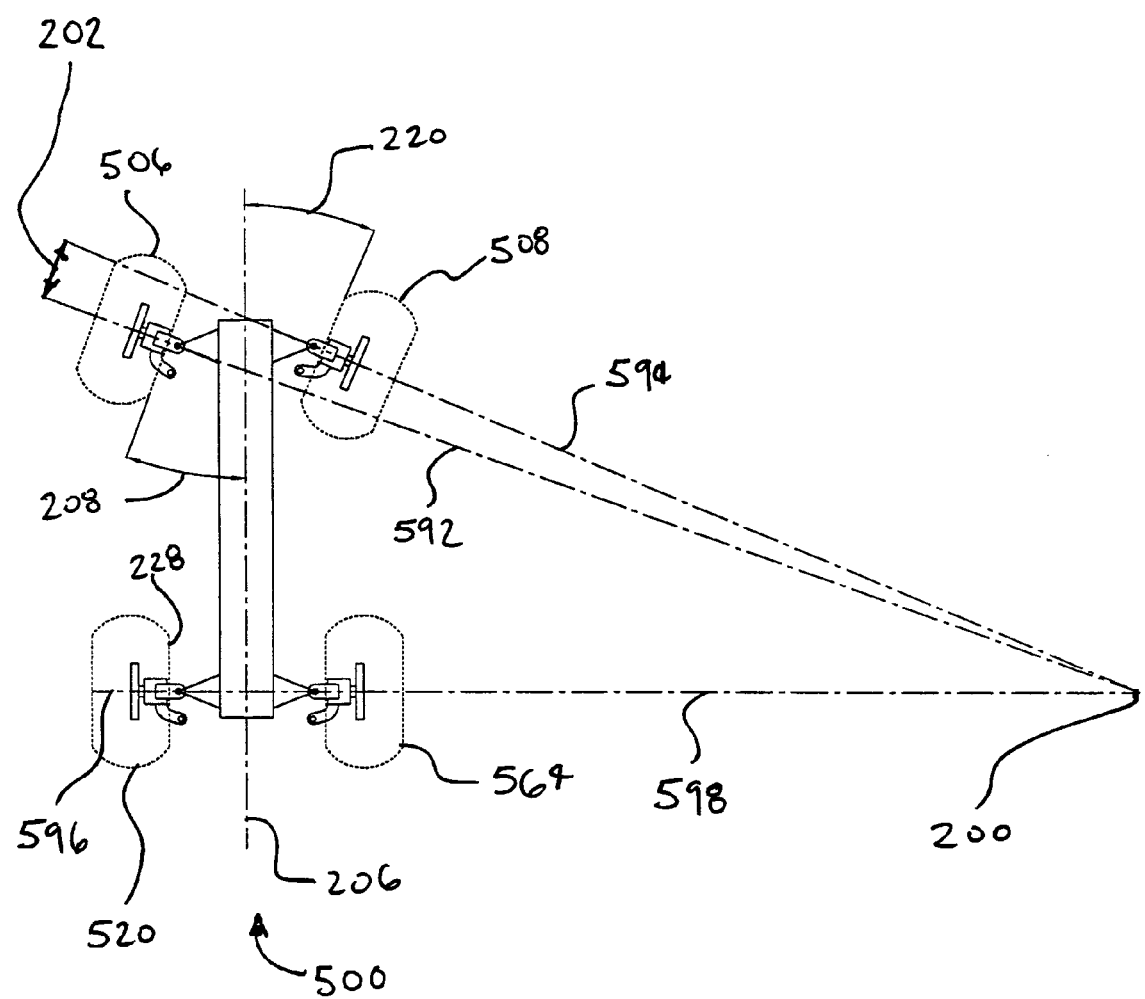
FIG. 8 is a top view of a vehicle operating in a front-only steering mode.

FIG. 8 is a top view of vehicle 500 operating in a front-only steering mode. With reference to FIG. 8, it may be appreciated that when vehicle 500 is operating in the front only steering mode, the steering angle of left rear wheel 520 and right rear wheel 546 remains substantially constant with the rear wheels locked in a straight forward running position. With reference to FIG. 8, it may be appreciated that a wheel plane 226 defined by an inside surface 228 of left rear wheel 520 is substantially parallel to a longitudinal axis 206 of vehicle 500.

In the embodiment of FIG. 8, each front wheel may be selectively rotated about a steering axis. With reference to FIG. 8, it may be appreciated that each front wheel is turned relative to longitudinal axis 206 of vehicle 500 by a steering angle. More particularly, left front wheel 506 is turned by a first steering angle 208 and right front wheel 508 is turned by a second steering angle 220.

In FIG. 8 a rotational axis of each wheel is illustrated using a dashed line. More particularly, left front wheel 506 rotates about a first rotational axis 592, right front wheel 508 rotates about a second rotational axis 594, left rear wheel 520 rotates about a third rotational axis 596 and right rear wheel 546 rotates about a fourth rotational axis 598. In FIG. 8, first rotational axis 592, second rotational axis 594, third rotational axis 596 and fourth rotational axis 598 are all shown intersecting at a turn center 200. In the embodiment of FIG. 8, first rotational axis 592 and second rotational axis 594 define a front Ackerman angle 202.

Figure 9:
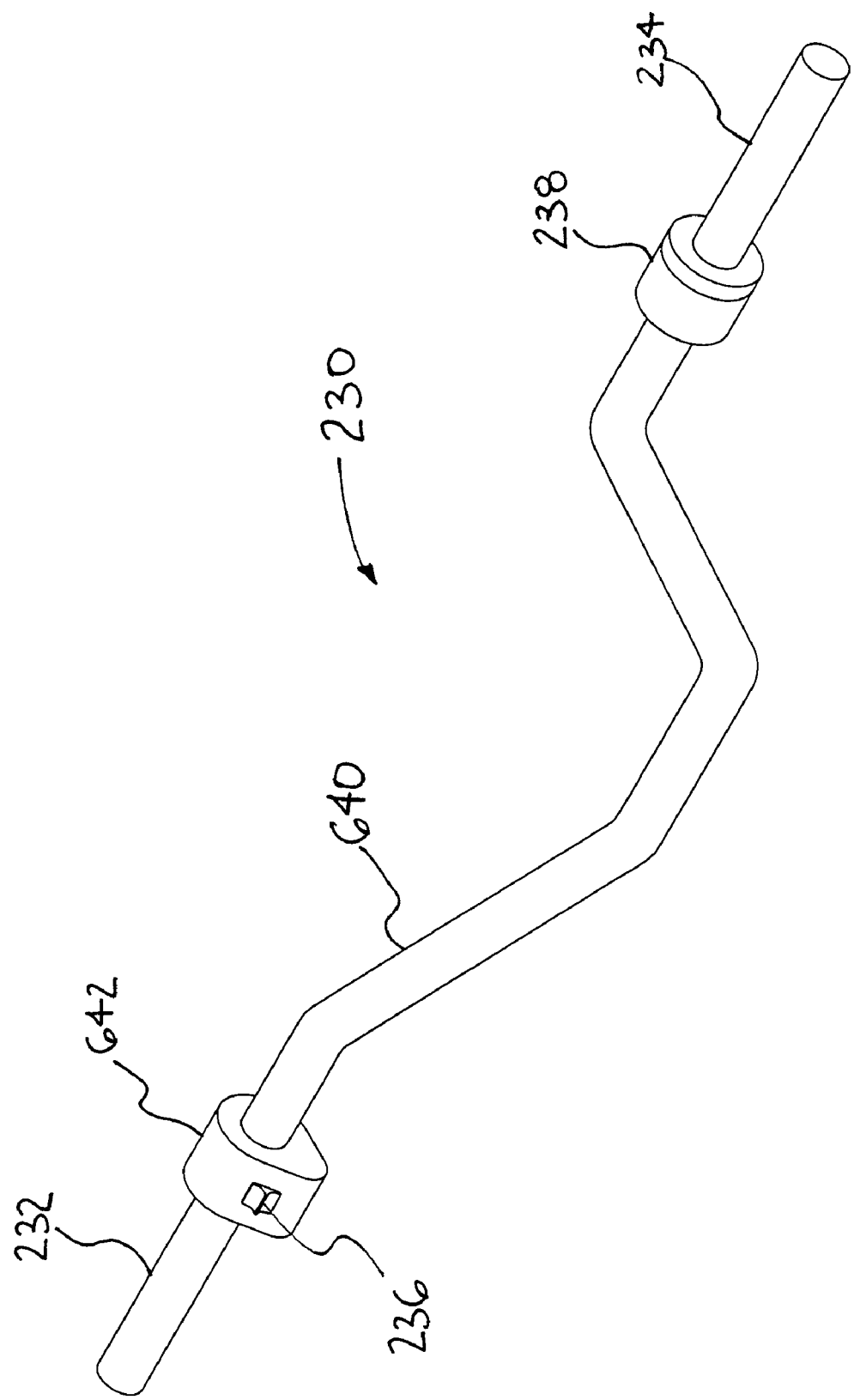
FIG. 9 is an isometric view of a handlebar assembly in accordance with an exemplary embodiment of the present invention.

FIG. 9 is an isometric view of a handlebar assembly 230 in accordance with an exemplary embodiment of the present invention. Handlebar assembly 230 includes a handlebar 640, a left grip 232 and a right grip 234. A user input device 642 is disposed proximate left grip 232. In the embodiment of FIG. 9, user input device 642 comprises a switch 236.

In certain advantageous embodiments of the present invention, input device 642 may be used to select a steering mode of a vehicle. In certain advantageous embodiments, switch 236 and left grip 232 are located and dimensioned so that the thumb a left hand can be used to actuate switch 236 while an index finger of the left hand remains in contact with left grip 232. Also in certain advantageous embodiments, switch 236 and left grip 232 are located and dimensioned so that a left hand of the rider can maintain a grip on left grip 232 while a thumb of the left hand is used to actuate switch 236. A throttle mechanism 238 is coupled to right grip 234. In a preferred embodiment of the present invention, throttle mechanism is configured so that rotation of right grip 234 acts to change the rotational speed of the crankshaft of an engine.

Figure 10:
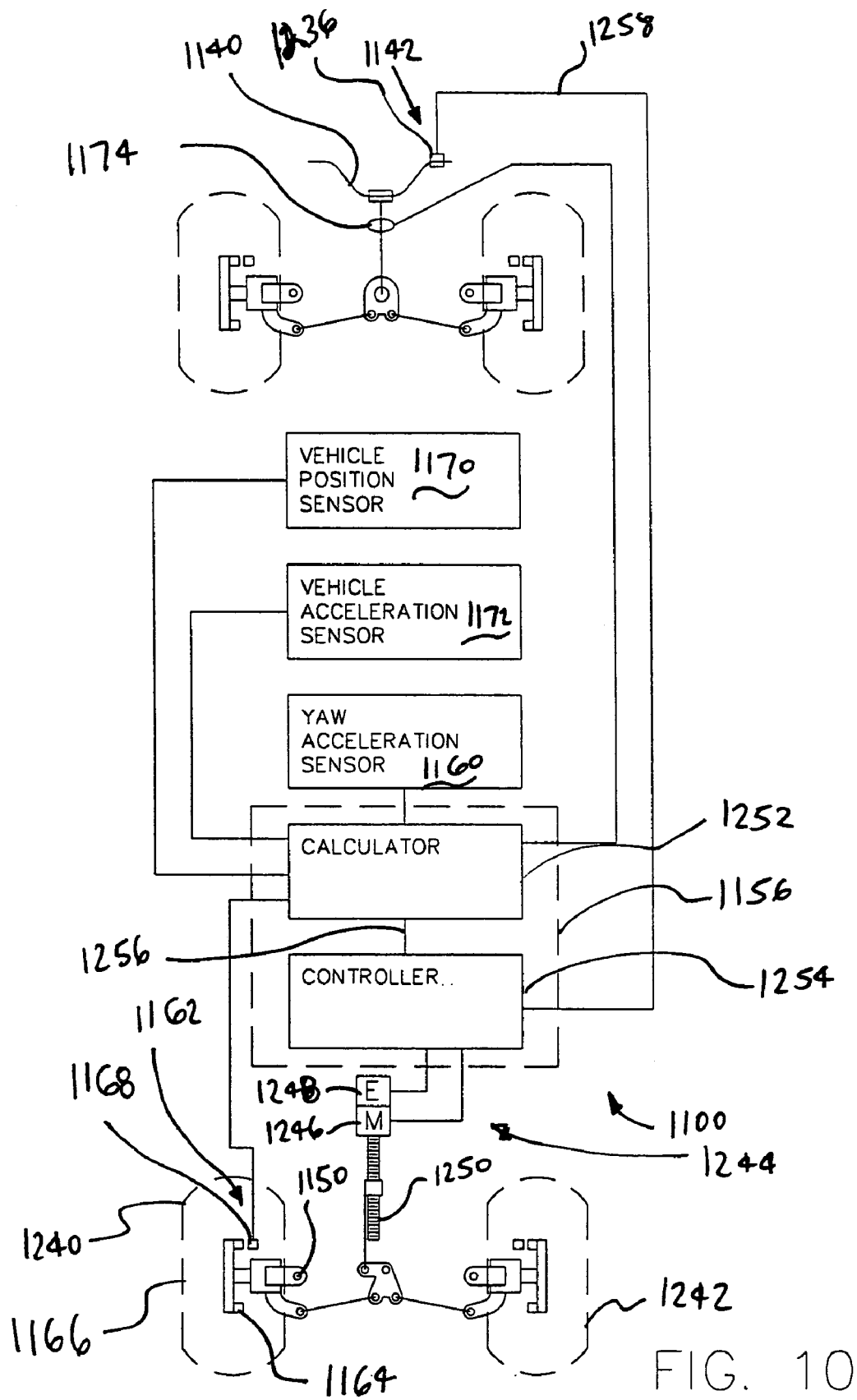
FIG. 10 is a block diagram showing a vehicle in accordance with the present invention.

FIG. 10 is a block diagram showing a vehicle 1100 in accordance with the present invention. Vehicle 1100 includes a first rear wheel 1240 and a second rear wheel 1242. In the embodiment of FIG. 10, a linear actuator 1244 is coupled to first rear wheel 1240 and second rear wheel 1242 such that linear actuator 1244 is capable of selectively rotating first rear wheel 1240 about a first steering axis 1150. In the embodiment of FIG. 10, linear actuator 1244 comprises a motor 1246, an encoder 1248, and a lead screw 1250.

With continuing reference to FIG. 10, it may be appreciated that motor 1246 and encoder 1248 are both connected to an electronic control unit (ECU) 1156. In the embodiment of FIG. 10, ECU 1156 comprises a calculator 1252, or comparator, and a controller 1254. In some advantageous embodiments, ECU 1156 is adapted to selectively provide a control signal to linear actuator 1244, causing linear actuator 1244 to turn first rear wheel 1240 and second rear wheel 1242 about their respective steering axes.

ECU 1156 is also connected to an input device 1142. In the embodiment of FIG. 10, input device 1142 comprises an electric switch 1236 mounted on a handlebar 1140 of vehicle 1100. Input device 1142 is preferably adapted for providing an input signal indicating that operation in a particular mode is desired. In the embodiment of FIG. 10, ECU 1156 includes a calculator 1252 that is capable of providing an enabling signal 1256 to controller 1254. In some embodiments of the present invention, controller 1254 will only provide a control signal to linear actuator 1244 if both an input signal 1258 and an enabling signal 1256 are present.

For example, in some embodiments, controller 1254 will only provide control signal 1260, if it is determined that vehicle 1100 is operating at a relatively slow ground speed. By way of second example, in some embodiments, controller 1254 will only provide control signal 1260, if the vehicle is stuck, for example when a high degree of slippage is present between the wheels of the vehicle and the ground.

The system of FIG. 10 also includes a yaw acceleration sensor 1160 that is connected to ECU 1156. Yaw acceleration sensor 1160 may comprise, for example, two accelerometers that are arranged to measure acceleration of vehicle 1100 in a lateral direction. These two accelerometers may be longitudinally spaced so that rotational acceleration about an axis disposed between the two accelerometers may be calculated using the output from the two accelerometers.

Vehicle 1100 of FIG. 10 also includes a handlebar 1140 that may be used for turning the front wheels of vehicle 1100. In the embodiment of FIG. 10, a handlebar angle sensor 1174 is coupled to handlebar 1140. With reference to FIG. 10, it will be appreciated that embodiments of the present invention are possible in which the turning of the front wheels of vehicle 1100 is independent of the turning of the rear wheels of vehicle 1100.

In FIG. 10 a wheel rotation sensor 1162 is shown connected to ECU 1156. Wheel rotation sensor 1162 may comprise various components without deviating from the spirit and scope of the present invention. For example, wheel rotation sensor 1162 may comprise a ring 1164 coupled to an instrumented wheel 1166 and a ring detector 1168 coupled to the chassis of vehicle 1100. Ring 1164 may comprise, for example, a toothed ring comprising a ferrous material and/or a magnetic ring having alternating magnetic poles. Ring detector 1168 may comprise, for example, one or more Hall effect sensors and/or one or more magnostrictive sensors.

In the embodiment of FIG. 10, a vehicle position sensor 1170 and a vehicle acceleration sensor 1172 are connected to ECU 1156. Vehicle position sensor 1170 may comprise various components without deviating from the spirit and scope of the present invention. For example, vehicle position sensor 1170 may comprise a global positioning system (GPS). GPS chip sets are commercially available from Motorola of Phoenix, Ariz.; Phillips Semiconductor of Sunnyvale, Calif.; Rockwell Semiconductor of Newport Beach, California; SGS-Thompson of Lincoln, Mass.; SiRF Technology of Sunnyvale Calif.; and GEC Plessey of Scotts Valley California.

By way of a second example, vehicle position sensor 1170 may comprise an emitter for emitting a beam and a detector for detecting a reflected portion of the beam. In some embodiments the beam may comprise electromagnetic radiation (e.g., infrared light, visible light, ultraviolet light, and laser light). In other embodiments, the beam may comprise sound waves and/or ultrasonic waves. By way of yet another example, vehicle position sensor may comprise a radio location system (e.g., LORAN). Vehicle acceleration sensor 1172 may comprise an accelerometer. Accelerometers that may be suitable in some applications are commercially available from Motorola.

Figure 11:
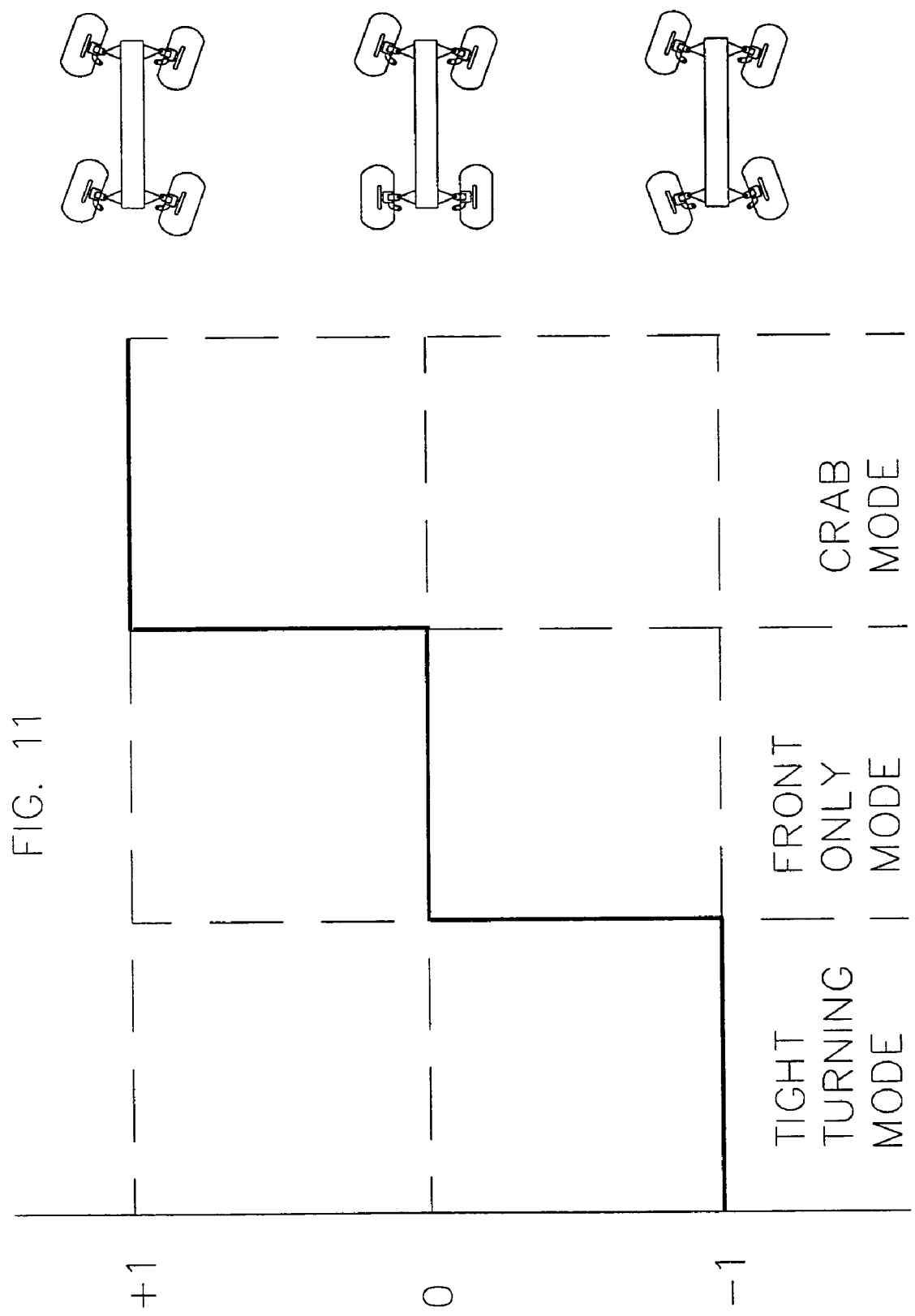
FIG. 11 is a diagram illustrating a plurality of steering modes.

FIG. 11 is a diagram illustrating a plurality of steering modes. A ratio of the rear wheel steering angle (RWSA) to the front wheel steering angle (FWSA) is shown for each of the steering modes. With reference to FIG. 11, it may be appreciated that when the vehicle is operating in the crab steering mode, the rear wheels rotate about a steering axis in a same-phase relationship with the front wheels (i.e., each rear wheel rotates about its steering axis in a clockwise direction when each front wheel is rotating about its steering axis in a clockwise direction).

Accordingly, the RWSA:FWSA ratio is equal to about one in the embodiment of FIG. 11 when the vehicle is operating in the crab steering mode. In FIG. 11, it may also be appreciated that when the vehicle is operating in the tight turning radius steering mode, the rear wheels and the front wheels rotate about their corresponding steering axes in an opposite phase relationship (i.e., each rear wheel rotates about its steering axis in a clockwise direction when each front wheel is rotating about its steering axis in a counter clockwise direction). When the vehicle is operating in the front only steering mode the RWSA:FWSA ratio is equal to about zero.

Figure 12:
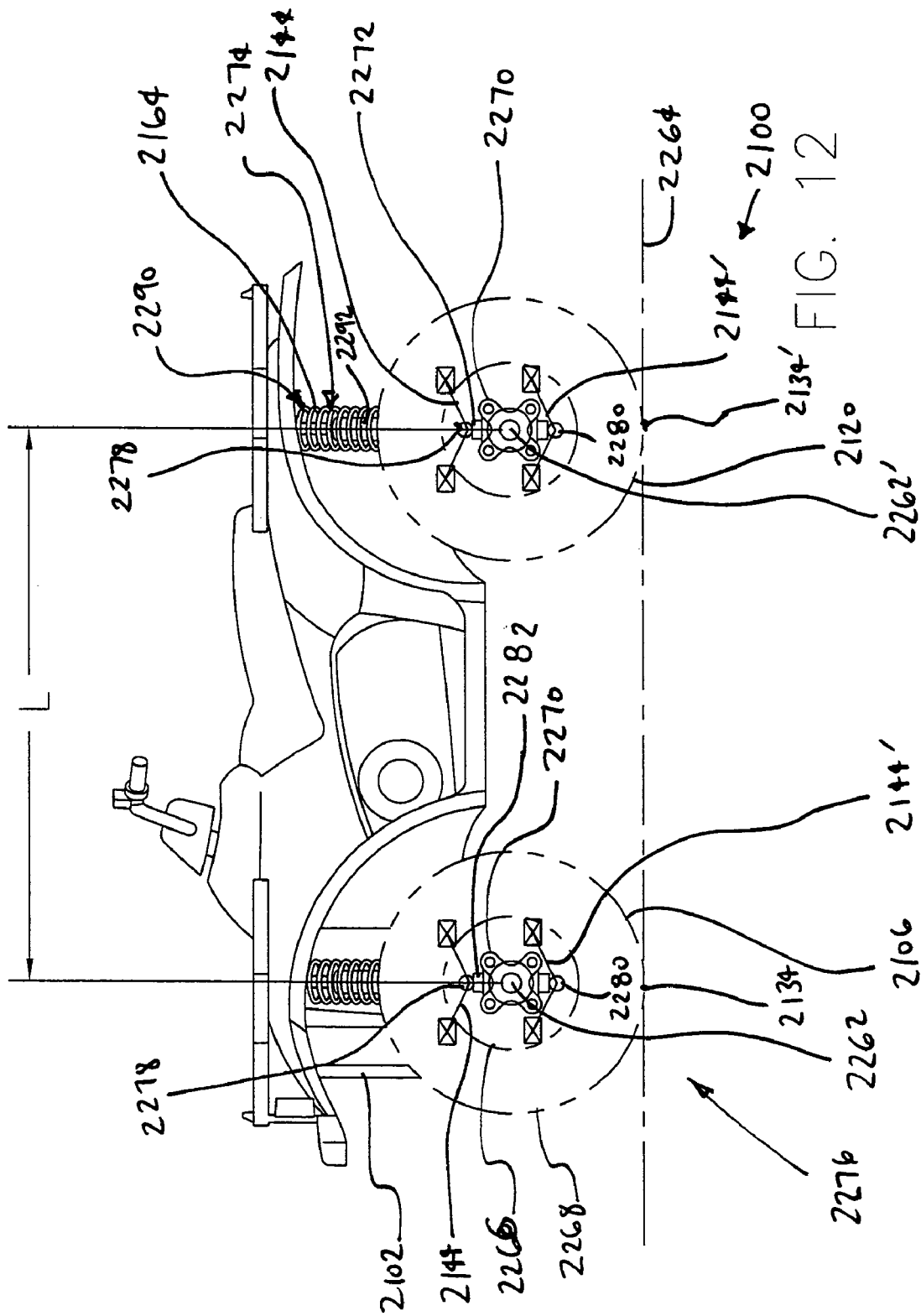
FIG. 12 is a side view of a vehicle in accordance with an exemplary embodiment of the present invention.

FIG. 12 is a side view of a vehicle 2100 in accordance with an exemplary embodiment of the present invention. Vehicle 2100 of FIG. 12 preferably includes two front wheels and two rear wheels. A left front wheel 2106 and a left rear wheel 2120 of vehicle 2100 are visible in FIG. 12. Left front wheel 2106 and left rear wheel 2120 have a pivoting axis 2262 and a pivoting axis 2262' respectively. In the embodiment of FIG. 12, pivoting axis 2262 of left front wheel 2106 is separated from the pivoting axis 2262' of left rear wheel 2120 by a wheel base distance L. The momentary contact points of the wheels define a wheel contract plane 2264. In FIG. 12, it may be appreciated that left front wheel 2106 and left rear wheel 2120 have a momentary contact point 2134 and a momentary contact point 2134' respectively.

In the embodiment of FIG. 12, each wheel comprises a rim 2266 and a tire 2268. Rim 2266 of each wheel is fixed to a hub 2270. Hub 2270 of left rear wheel 2120 is rotatably supported by a left rear knuckle 2272. In the embodiment of FIG. 12, left rear knuckle 2272 is coupled to a chassis 2102 of vehicle 2100 by a left rear suspension 2274.

Left rear suspension 2274 of FIG. 12 includes an upper arm 2144 and a lower arm 2144'. In the embodiment of FIG. 12, upper arm 2144 is rotatably coupled to chassis 2102 of vehicle 2100 so as to rotate about an upper a rotational axis. Also in the embodiment of FIG. 12, lower arm 2144' is coupled to chassis 2102 so as to rotate about a lower rotational axis. Left rear knuckle 2272 is coupled to upper arm 2144 of suspension 2276 at an upper connection 2278. In FIG. 12 it may also be appreciated that left rear knuckle 2272 is coupled to a lower arm 2144 of suspension 2276 at a lower connection 2280.

Vehicle 2100 of FIG. 12 also includes a left front suspension 2276 including an upper arm 2144 and a lower arm 2144'. In the embodiment of FIG. 12, upper arm 2144 is rotatably coupled to chassis 2102 of vehicle 2100 so as to rotate about an upper a rotational axis. Also in the embodiment of FIG. 12, lower arm 2144' is coupled to chassis 2102 so as to rotate about a lower rotational axis. An upper portion of left front knuckle 2282 is coupled to upper arm 2144 of left front suspension 2276 at an upper connection 2278. In FIG. 12 it may also be appreciated that a lower portion of left front knuckle 2282 is coupled to a lower arm 2144 of suspension 2276 at a lower connection 2280.

In a preferred embodiment, the front suspensions and the rear suspensions of vehicle 2100 are adapted to deflect so that each front wheel 2288 and each rear wheel 2286 can travel between a full compression position and a full extension position. In the embodiment of FIG. 12, front wheels 2288 and rear wheel 2286 are shown in an intermediate position lying between the full extension position and the full compression position. Various intermediate positions are possible without deviating from the spirit and scope of the present invention. For example, one intermediate position may be found when vehicle 2100 is at rest and the weight of vehicle 2100 is supported at least in part by the front suspensions and the rear suspensions. Another example of an intermediate position may be found when vehicle 2100 is at rest and the weight of both a rider and vehicle 2100 are supported at least in part by the front suspension and the rear suspension. In the embodiment of FIG. 12, each suspension includes a spring assembly 2290 including a spring 2164 that is disposed about a shock absorber 2292.

Figure 13:
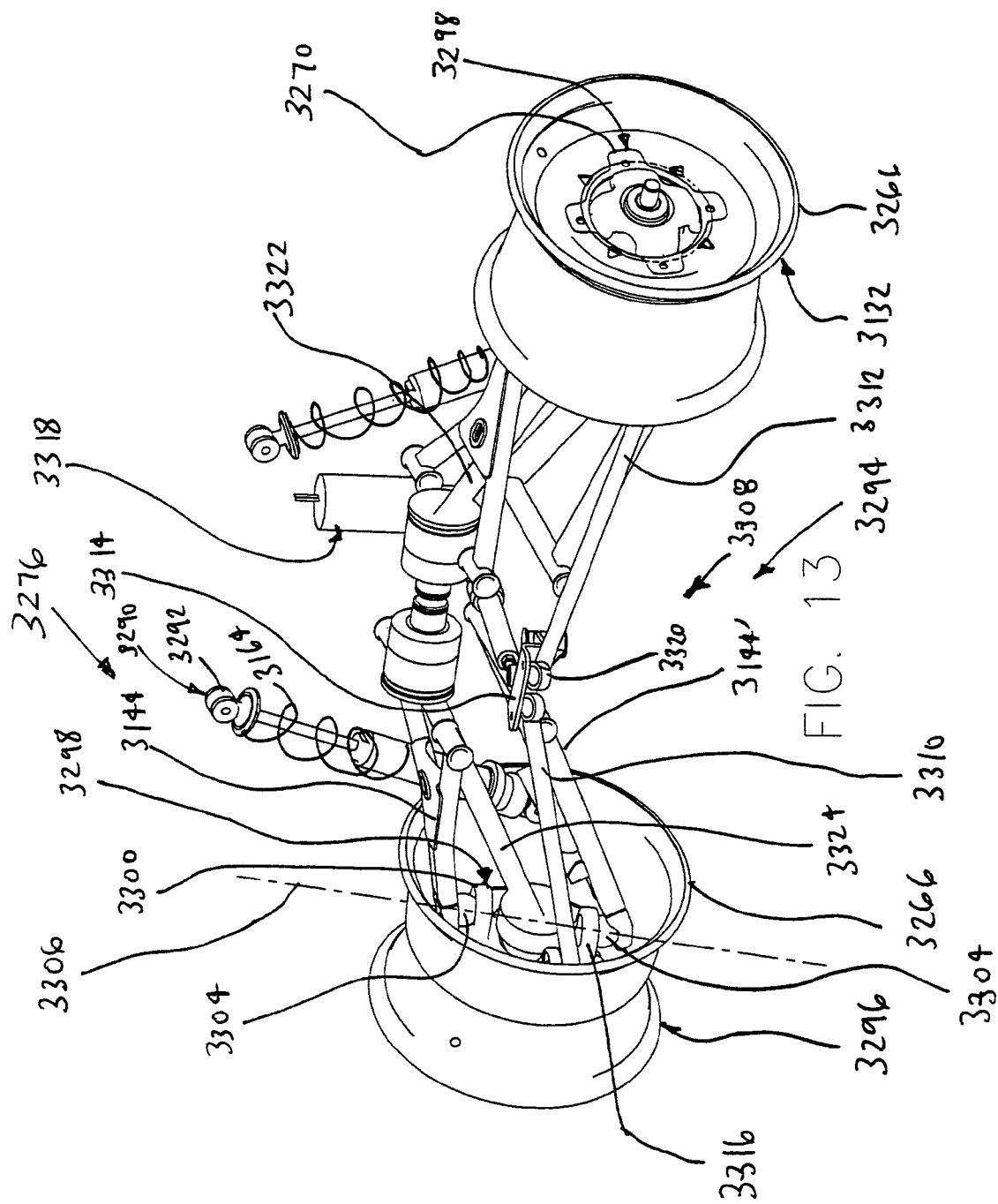
FIG. 13 is a perspective view of an assembly in accordance with an exemplary embodiment of the present invention.

FIG. 13 is a perspective view of an assembly 3294 in accordance with an exemplary embodiment of the present invention. Assembly 3294 includes a right wheel 3132 and a left wheel 3296. In the embodiment of FIG. 13, each wheel comprises a rim 3266. It will be appreciated that each wheel may also include a tire that is not shown in FIG. 13.

Right wheel 3132 of assembly 3294 is supported by a right wheel carrier 3302 comprising a hub 3270. Also in the embodiment of the FIG. 13, left wheel 3296 is supported by a left wheel carrier 3298 comprising a left knuckle 3300. In a preferred embodiment, each wheel carrier comprises a hub that is rotatably supported by a knuckle. For example, a bearing may be disposed within a bore defined by the knuckle and a cylindrical portion of the hub may be received by an inner bore of the bearing.

Left knuckle 3300 may be coupled to a frame of a vehicle by a left suspension 3276 including a left upper arm 3144 and a left lower arm 3144'. In the exemplary embodiment of FIG. 13, a distal end of left upper arm 3144 is coupled to an upper portion of left knuckle 3300 at a ball joint 3304. Also in the exemplary embodiment of FIG. 13, a distal end of lower arm 3144' is coupled to a lower portion of left knuckle 3300 at a ball joint 3304.

Ball joints 3304 preferably provide three rotational degrees of freedom. The rotational degrees of freedom provided by ball joints 3304 allow left suspension 3276 to move between a full compression position and a full extension position and at the same time allow left knuckle 3300 to rotate about a steering axis 3306. In the embodiment of FIG. 13, suspension 3276 is shown in an intermediate position lying between the full extension position and the full compression position. In the exemplary embodiment of FIG. 13, steering axis 3306 is shown intersecting the center of left upper ball joint 3304 and the center of left lower ball joint 3304.

Assembly 3294 also comprises a steering system 3308 that is preferably configured to selectively urge rotation of left knuckle 3300 about steering axis 3306. Steering system 3308 includes a left tie rod 3310, a right tie rod 3312, and a idler 3314. An inner end of left tie rod 3310 is pivotally coupled to idler 3314 in the exemplary embodiment of FIG. 13. An outer end of left tie rod 3310 is pivotally coupled to a protrusion 3316 of left knuckle 3300. In the embodiment of FIG. 13, an actuator 3318 is connected to idler 3314.

Left suspension 3276 also includes a left spring assembly 3290 having a first end rotatably coupled to left lower arm 3144'. A second end of left spring assembly 3290 may be rotatably coupled to a vehicle frame. In the embodiment of FIG. 13, each spring assembly includes a shock absorber 3292 and a spring 3164 that is disposed about shock absorber 3292.

Right tie rod 3312 of steering system 3308 includes an inner joint 3320 and an outer joint (not visible in FIG. 13). Right tie rod 3312 may be pivotally coupled to right wheel carrier 3302 so as to rotate right wheel about a steering axis. In FIG. 13 it may also be appreciated that right tie rod 3312 is pivotally coupled to idler 3314 at inner joint 3320.

In FIG. 13, a distal portion of a right drive axle 3322 can be seen extending beyond right hub 3270. In the embodiment of FIG. 13, right drive axle 3322 is preferably connected to right hub 3270 so as to drive right wheel 3132. A left drive axle 3324 is also shown in FIG. 13. Proximal ends of left drive axle 3324 and right drive axle 3322 may be connected to a drive train of a vehicle.

Figure 14:
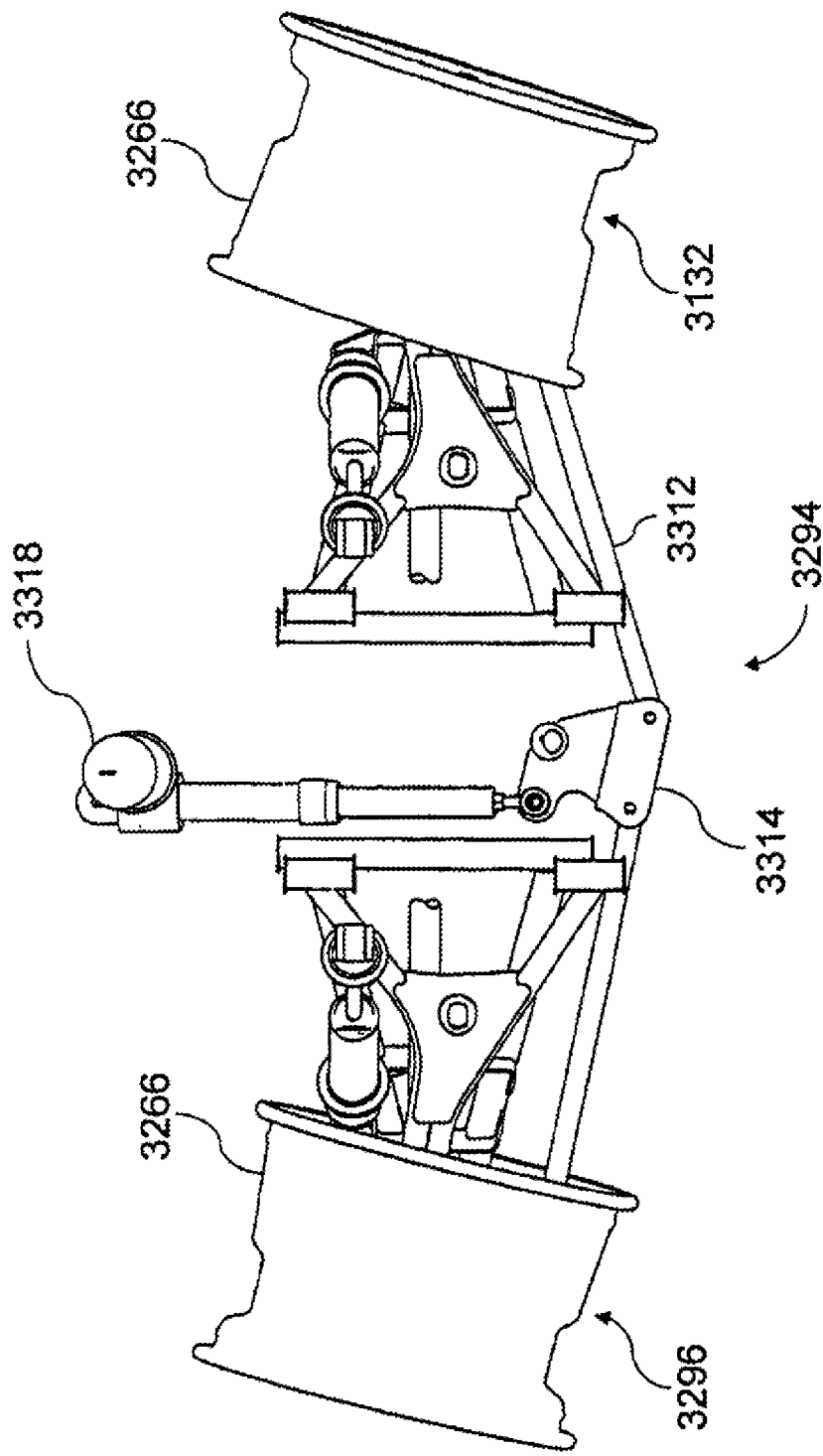
FIG. 14 is a plan view of assembly shown in the previous figure.
Figure 15:
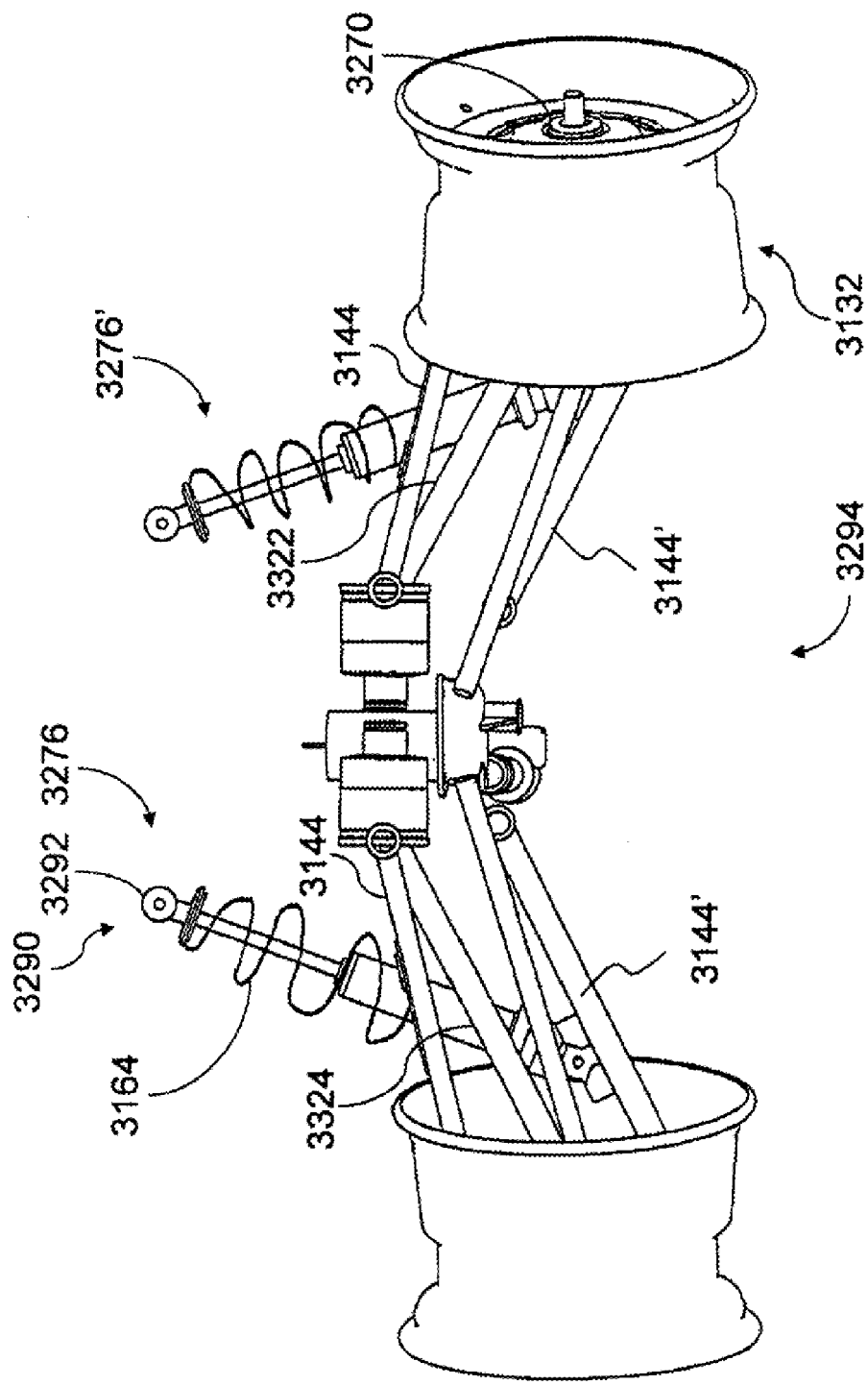
Figure 16:
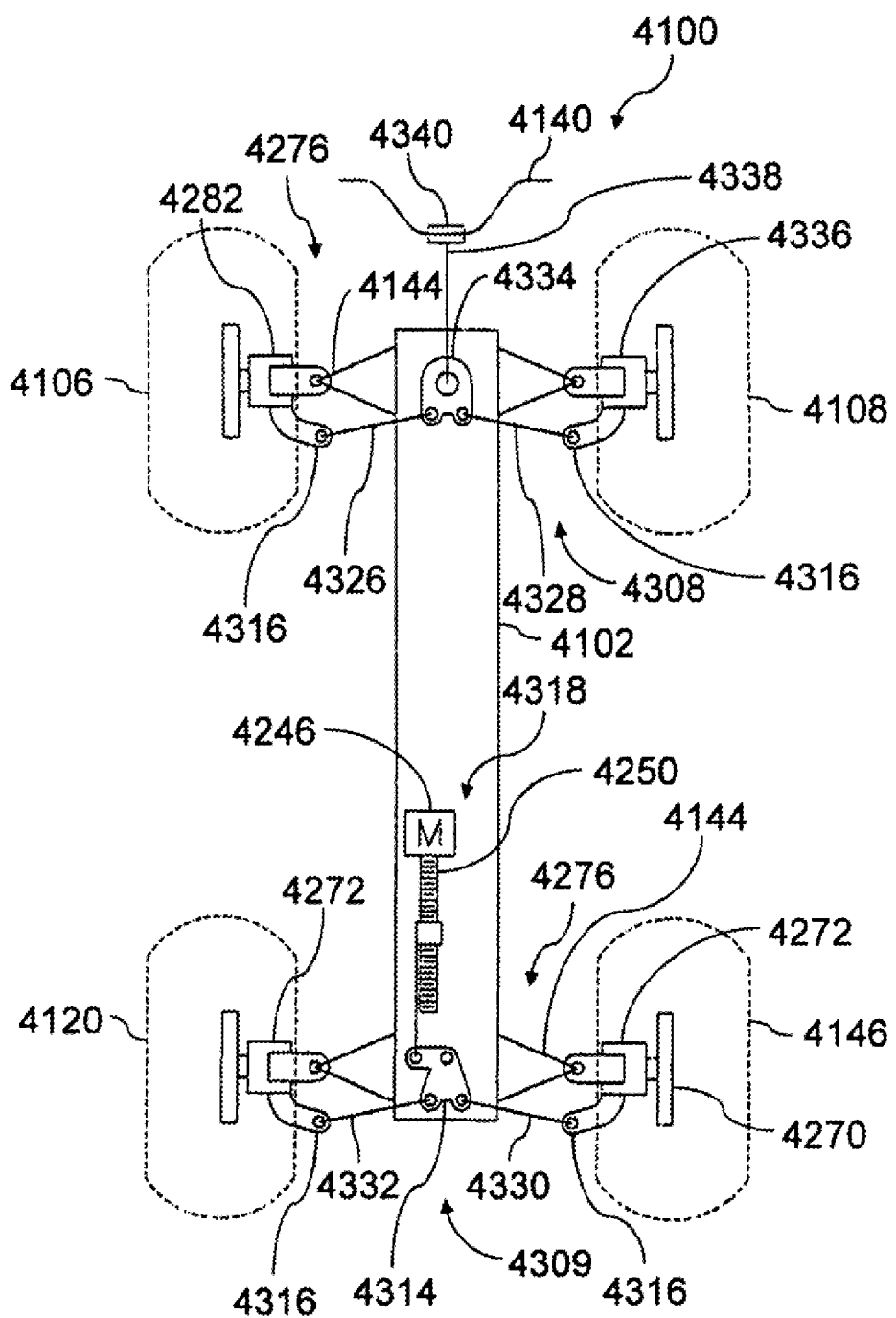
Figure 17:
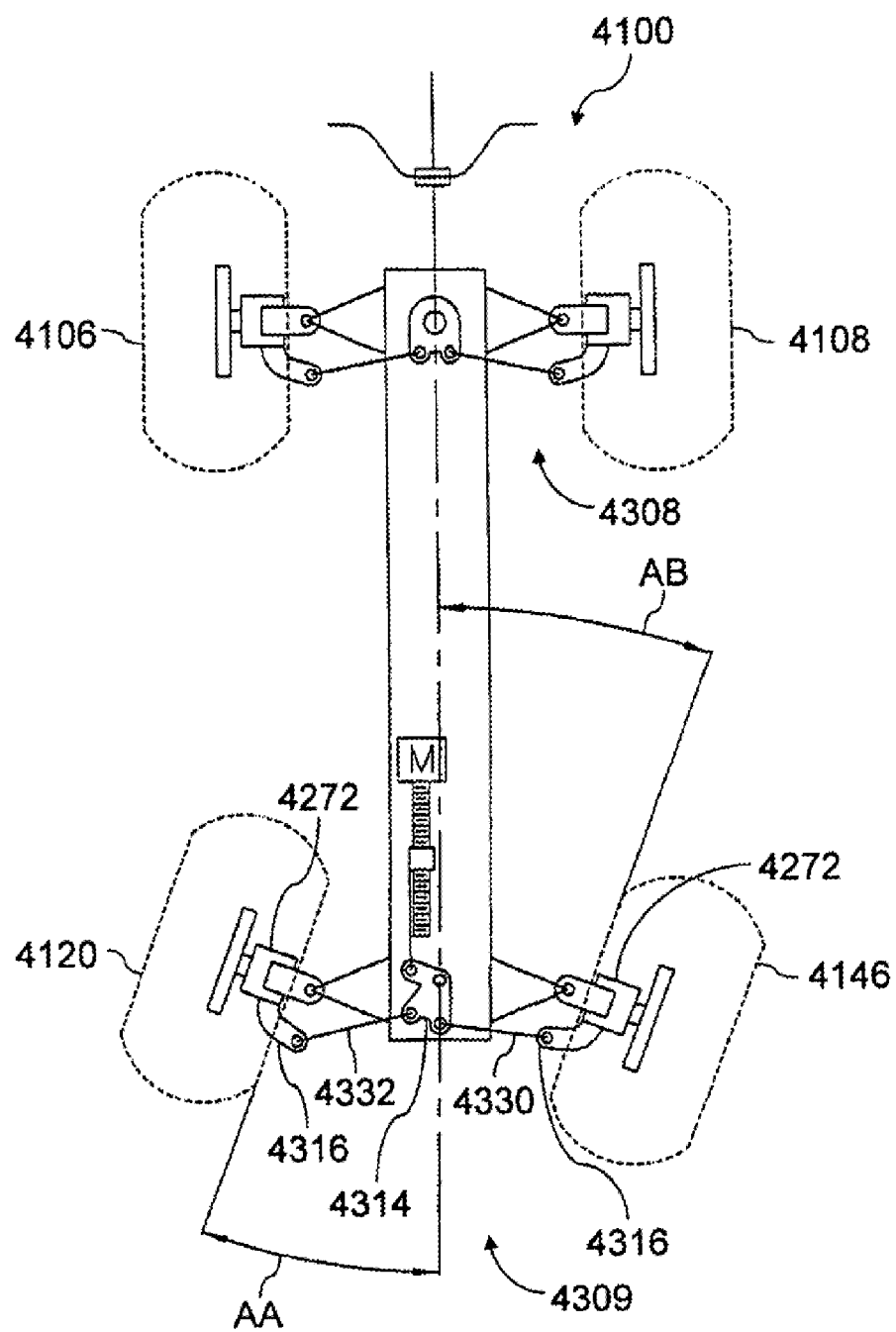
Figure 18:
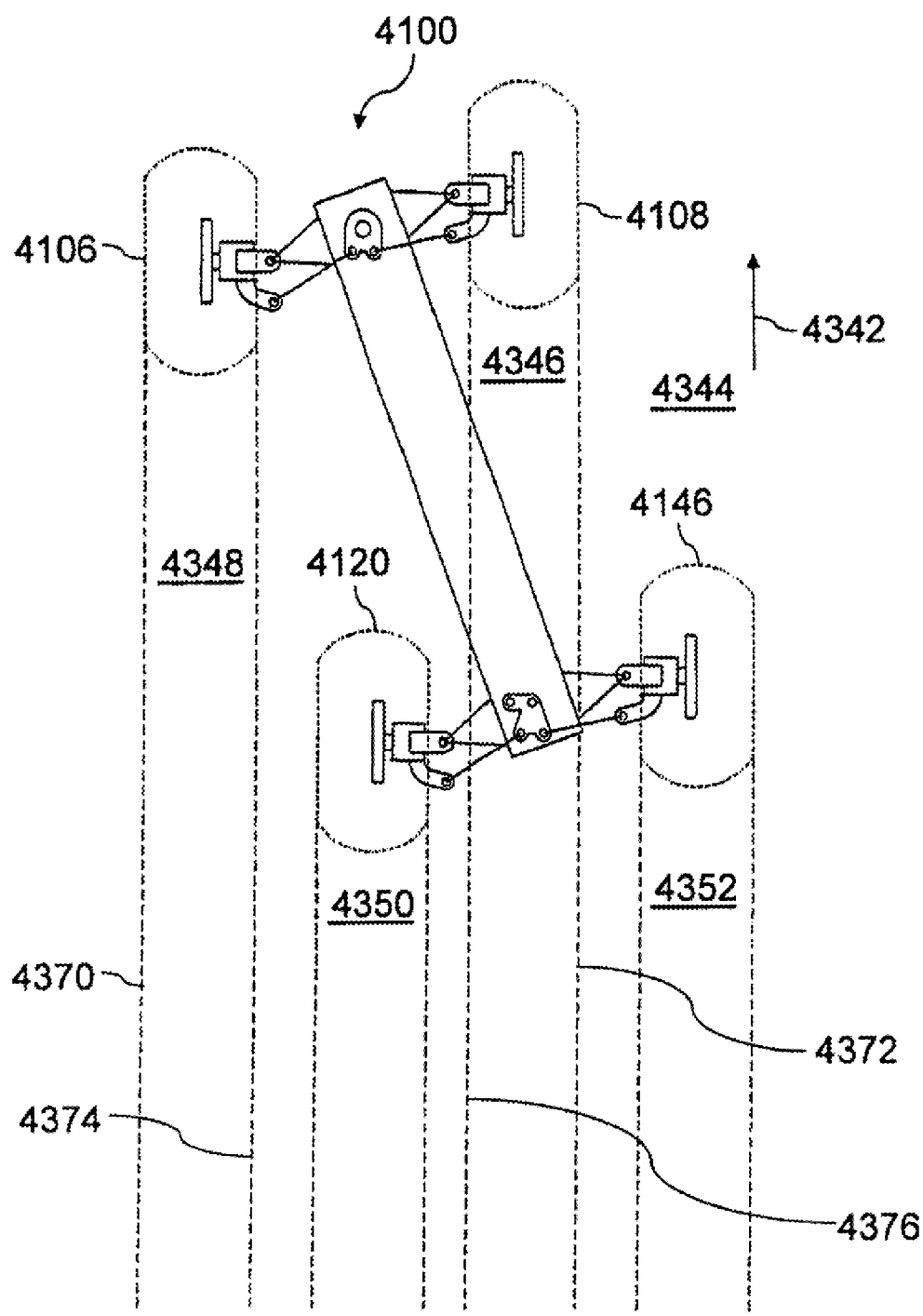
Figure 19:
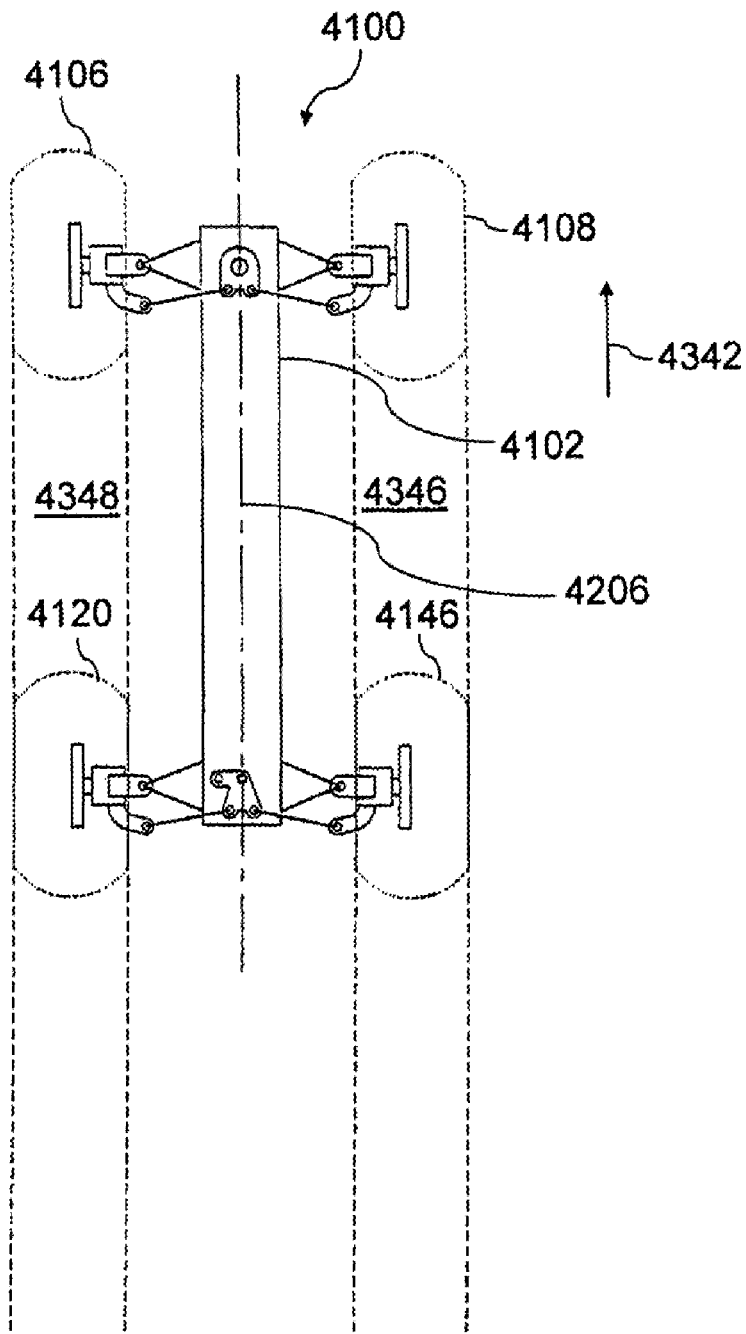
Figure 20:
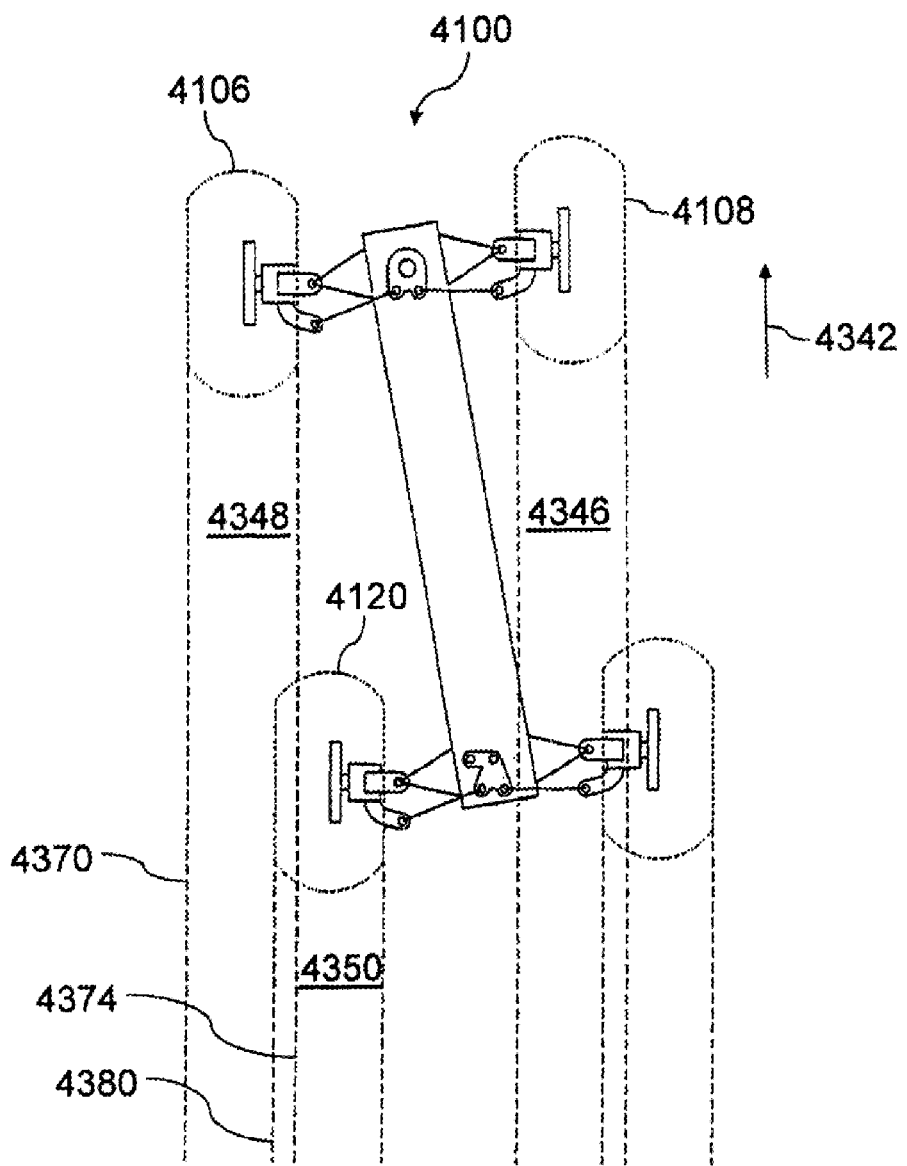
Figure 21:
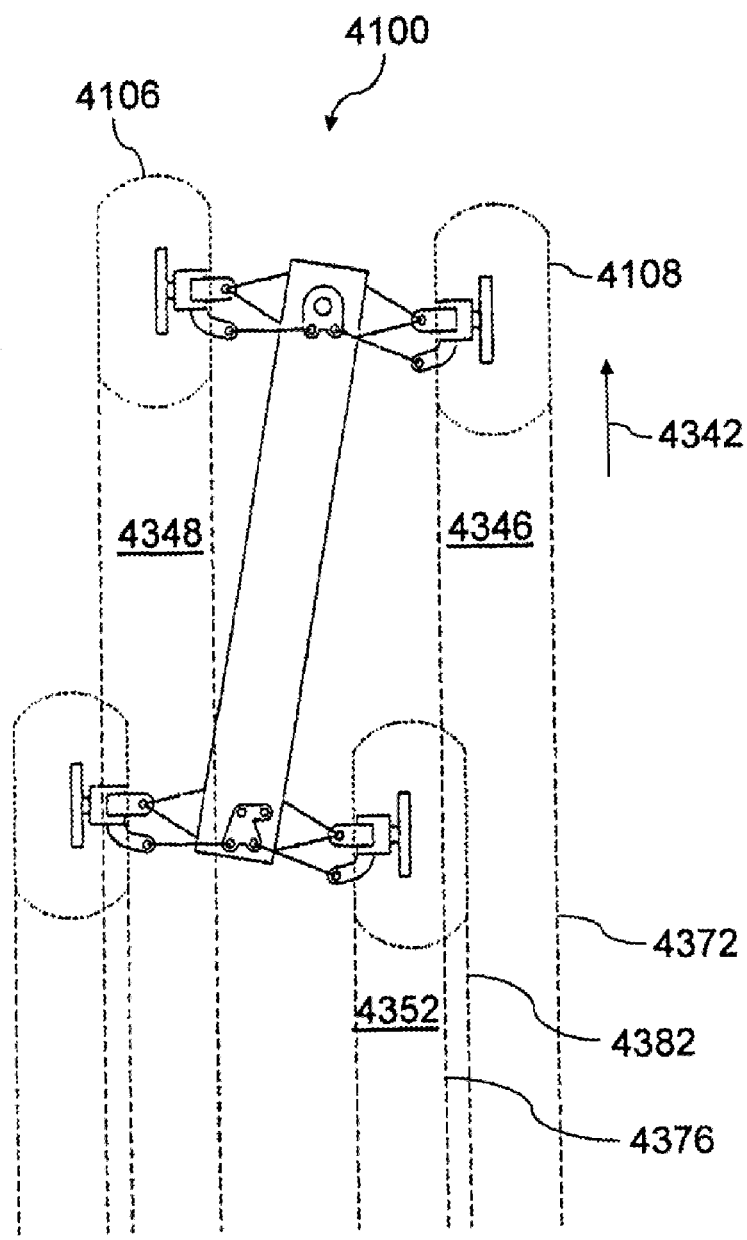
Figure 22:
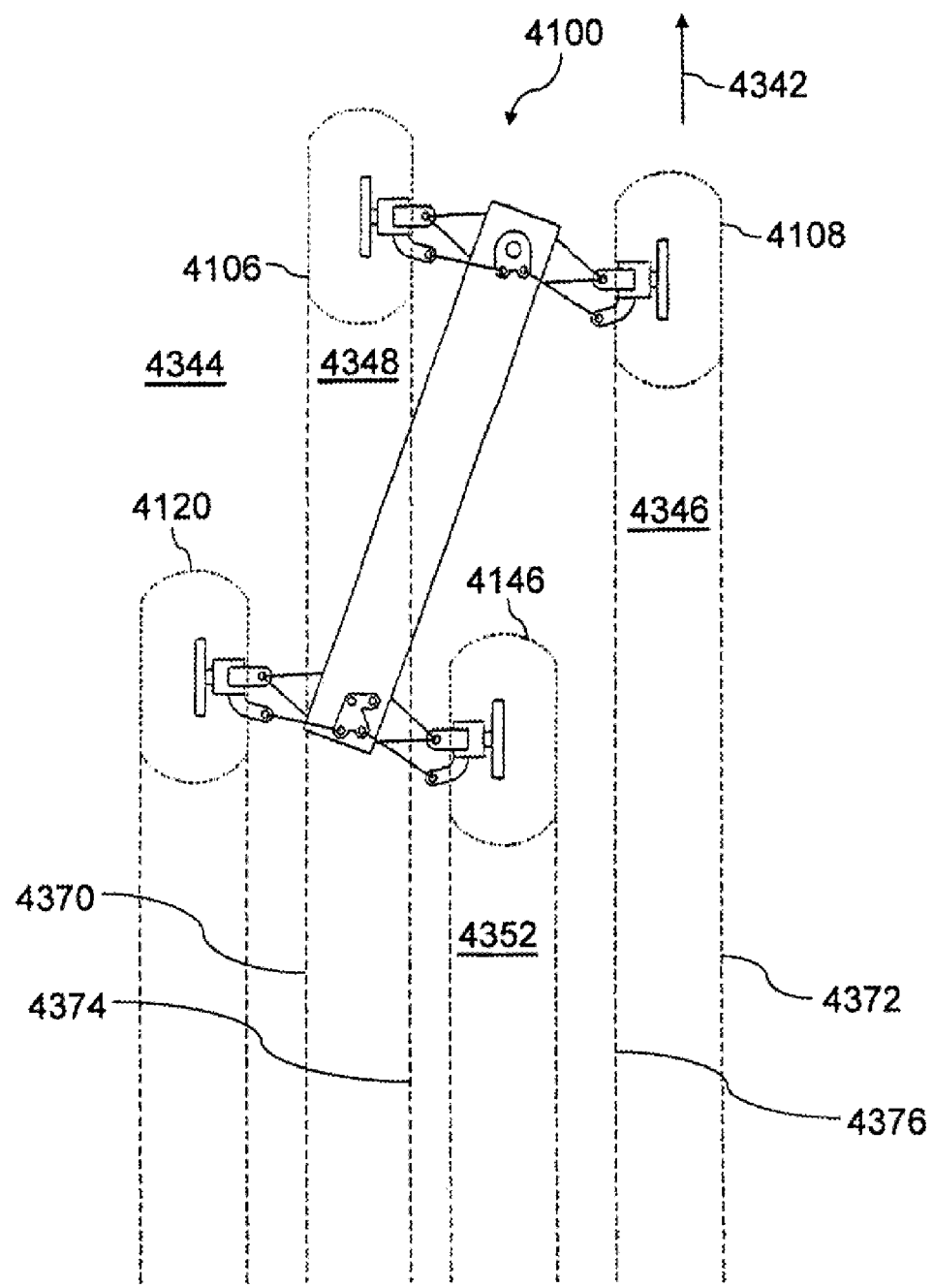
Figure 23:
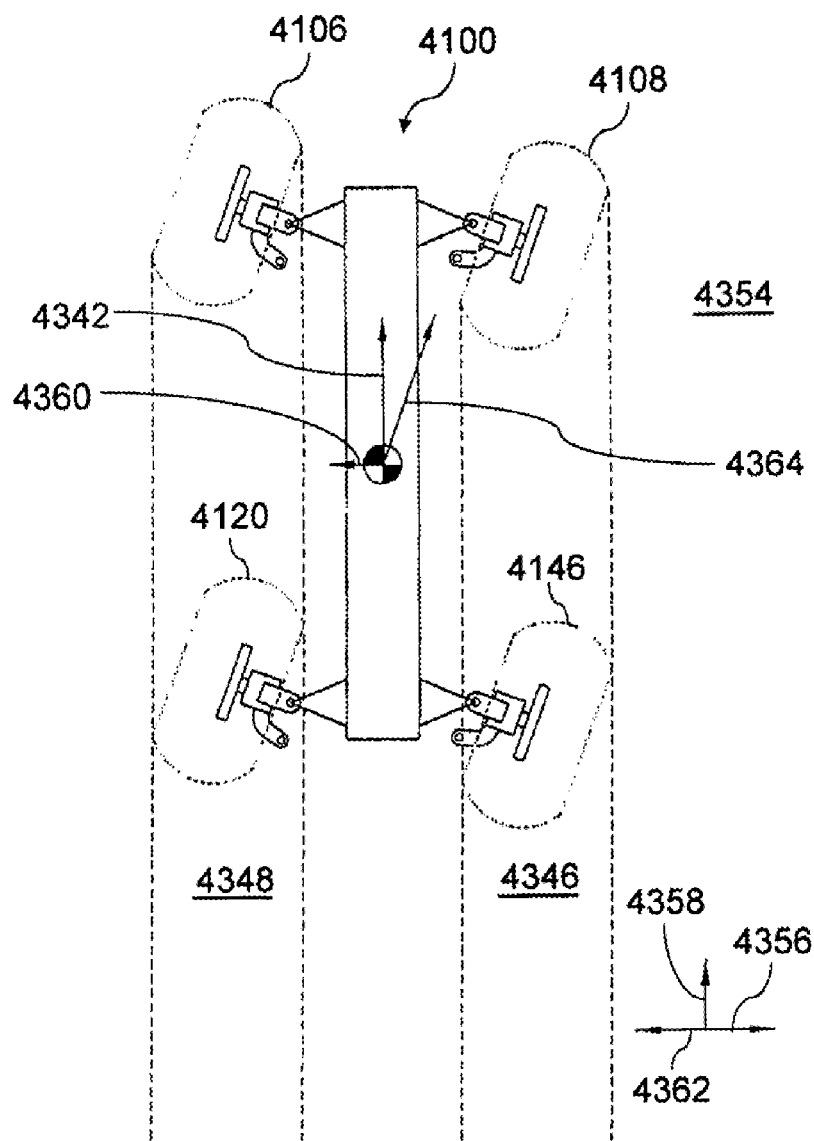

FIG. 14 is a plan view of assembly 3294 shown in the previous figure. In FIG. 14, actuator 3318 can be seen connecting to idler 3314. In the embodiment of FIG. 14, actuator 3318 is adapted to rotate idler 3314 about an idler pivot axis. It is to be appreciated that actuator 3318 may comprise various elements without deviating from the spirit and scope of the present invention. Examples of elements that may be suitable in some applications include hydraulic actuators, balls screws, electric motors, gears, linkages, levers, and the like.

A right tie rod 3312 and a left tie rod 3310 may also be seen connecting with idler 3314 in FIG. 14. A distal end of right tie rod 3312 is preferably pivotally coupled to a wheel carrier supporting a right wheel 3132. A left wheel 3296 is also visible in FIG. 14. In the embodiment of FIG. 14, each wheel comprises a rim 3266. It will be appreciated that each wheel may also include a tire that is not shown in FIG. 14.

Figure 15:
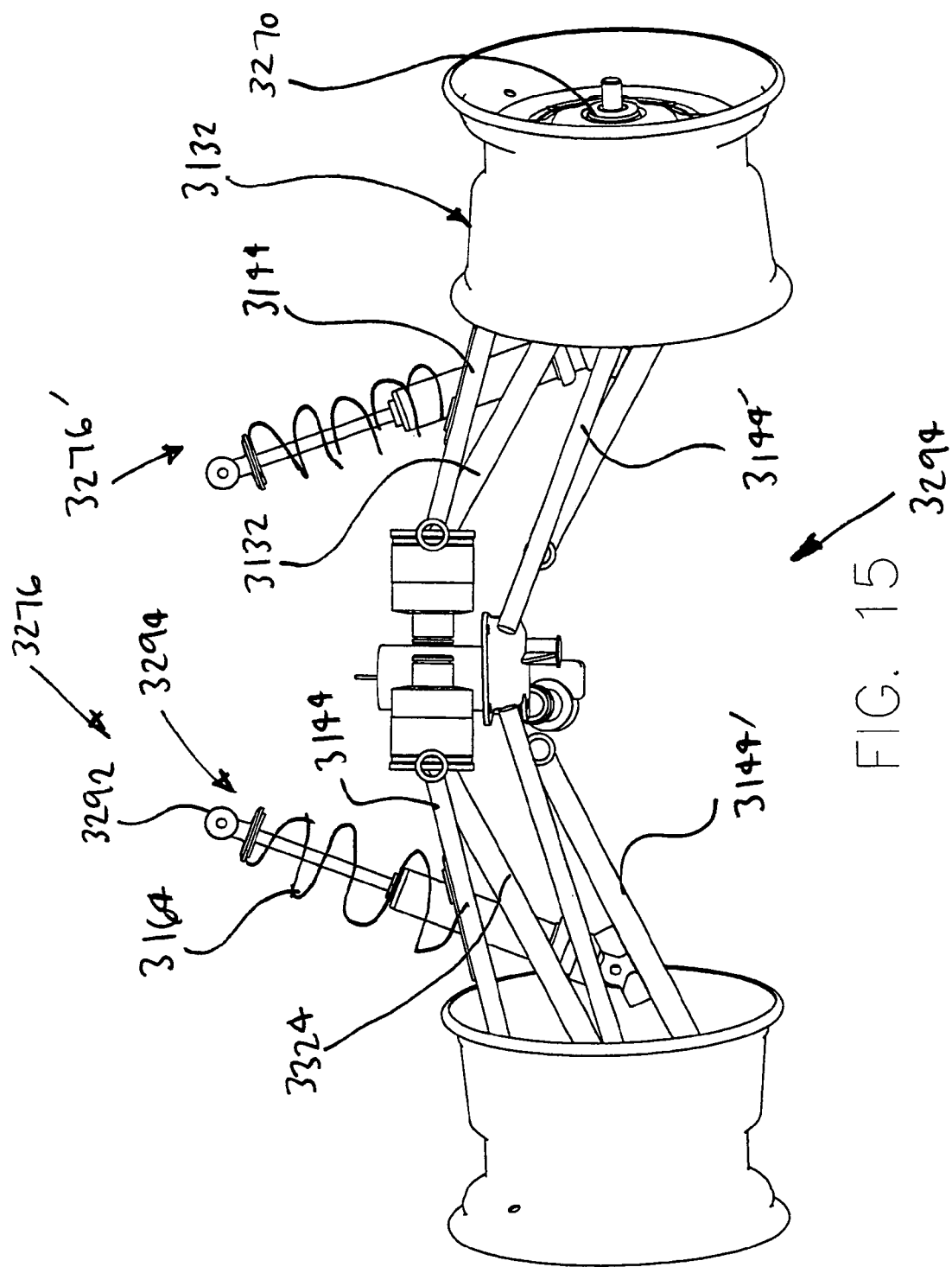
FIG. 15 is an additional plan view of assembly shown in the previous figure.

FIG. 15 is an elevation view of assembly 3294 shown in the previous figure. In FIG. 15, a first end of left spring assembly 3290 is shown rotatably coupled to a left lower arm 3144' of left suspension 3276. A second end of left spring assembly 3290 may be rotatably coupled to a vehicle frame. In the embodiment of FIG. 15, each spring assembly includes a shock absorber 3292 and a spring 3164 that is disposed about shock absorber 3292.

Right suspension 3276' and left suspension 3276 each include an upper arm 3144 and a lower arm 3144'. In FIG. 15, a distal portion of a right drive axle 3322 can be seen extending beyond a right hub 3270. In the embodiment of FIG. 15, right drive axle 3322 is preferably connected to right hub 3270 so as to drive right wheel 3132. A left drive axle 3324 is also shown in FIG. 15. Proximal ends of left drive axle 3324 and right drive axle 3322 may be connected to a drive train of a vehicle.

Figure 16:
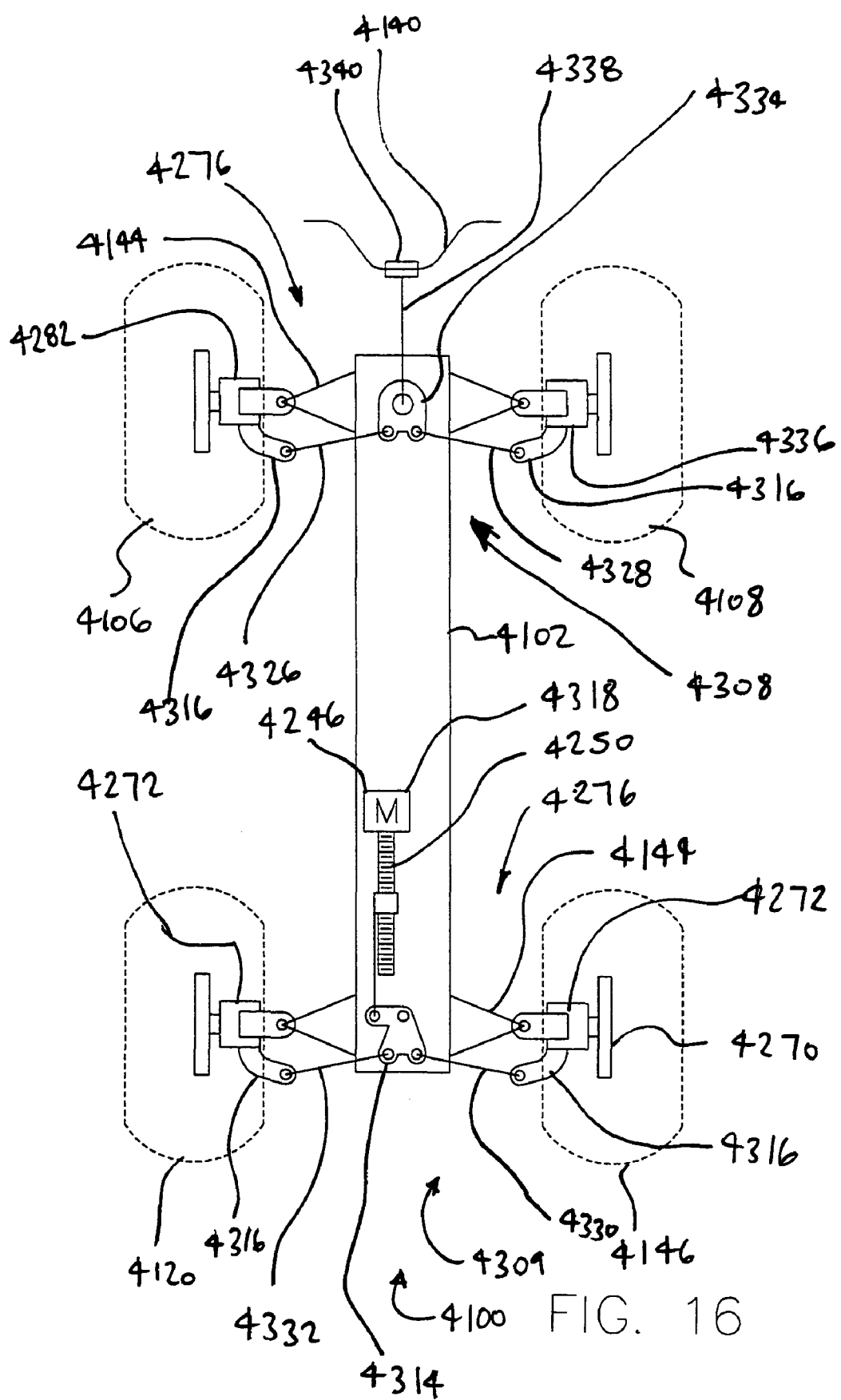
FIG. 16 is a diagrammatic plan view of a vehicle in accordance with an exemplary embodiment of the present invention.

FIG. 16 is a diagrammatic plan view of a vehicle 4100 in accordance with an exemplary embodiment of the present invention. Vehicle 4100 of FIG. 16 includes a left front wheel 4106, a right front wheel 4108, a left rear wheel 4120, and a right rear wheel 4146. In FIG. 16, each wheel is fixed to a hub 4270 that is rotatably supported by a knuckle. In FIG. 16 it may also be appreciated that each knuckle is coupled to a chassis 4102 of vehicle 4100 by a suspension 4276. Also in the embodiment of FIG. 16, each suspension 4276 comprises an arm 4144 that is rotatably coupled to chassis 4102.

Vehicle 4100 also includes a front steering system 4308 and a rear steering system 4309. Front steering system 4308 includes a left front tie rod 4326 and a right front tie rod 4328. In FIG. 16 it may be appreciated that left front tie rod 4326 is connected to a protrusion 4316 of a left front knuckle 4282 at an outer joint. In the embodiment of FIG. 16 left front tie rod 4326 is also connected to a bell crank 4334 at an inner joint.

In FIG. 16 it may be appreciated that right front tie rod 4328 has a proximal end and a distal end. The distal end of right front tie rod 4328 is connected to a protrusion 4316 of a right front knuckle 4336 and the proximal end of right front tie rod 4328 is connected to bell crank 4334.

Bell crank 4334 of front steering system 4308 is fixed to a proximal portion of a steering shaft 4338. A handlebar 4140 is fixed to a distal end of steering shaft 4338 using mounting blocks 4340. In the embodiment of FIG. 16, left front wheel 4106 and right front wheel 4108 can be turned by rotating handlebar 4140.

Rear steering system 4309 of vehicle 4100 includes a left rear tie rod 4332, a right rear tie rod 4330, and an idler 4314. In FIG. 16 it may be appreciated that left rear tie rod 4332 is connected to a protrusion 4316 of left rear knuckle 4272 at an outer joint. In the embodiment of FIG. 16 left rear tie rod 4332 is connected to idler 4314 at an inner joint. In FIG. 16 it may be appreciated that right rear tie rod 4330 has a proximal end and a distal end. The distal end of right rear tie rod 4330 is connected to a protrusion 4316 of a right rear knuckle 4272 and the proximal end of right rear tie rod 4330 is connected to idler 4314.

An actuator 4318 is coupled to idler 4314 in the embodiment of FIG. 16. It is to be appreciated that actuator 4318 may comprise various elements without deviating from the spirit and scope of the present invention. In the embodiment of FIG. 16, actuator 4318 comprises a lead screw 4250 and an electric motor 4246. In this exemplary embodiment, the orientation of the rear wheels relative to chassis 4102 of vehicle 4100 can be changed by activating motor 4246. In some advantageous embodiments of the present invention, the orientation of the rear wheels relative to chassis 4102 of vehicle 4100 remains fixed when motor 4246 is de-activated.

Figure 17:
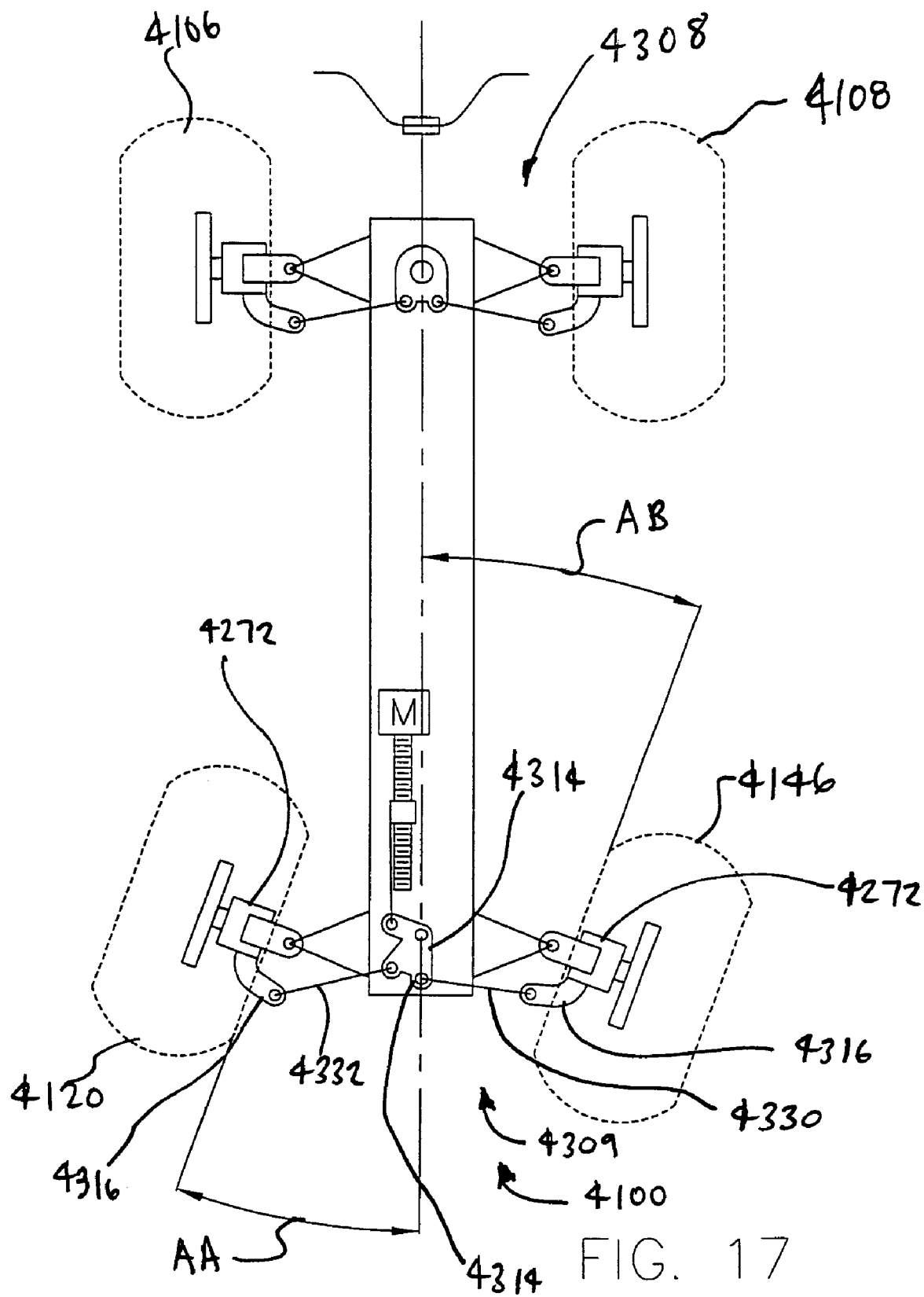
FIG. 17 is an additional diagrammatic plan view of the vehicle shown in the previous figure.

FIG. 17 is an additional diagrammatic plan view of vehicle 4100 shown in the previous figure. In the embodiment of FIG. 17, idler 4314 of rear steering system 4309 has been rotated so that left rear wheel 4120 and right rear wheel 4146 have both assumed a generally angled orientation. More particularly, left rear wheel 4120 is positioned such that a plane defined by an inner surface of left rear wheel 4120 defines an angle AA with a longitudinal axis 4206 of chassis 4102 of vehicle 4100 in the embodiment of FIG. 17. In FIG. 17 it may also be appreciated that longitudinal axis 4206 and a plane defined by an inner surface of right rear wheel 4146 defines an angle AB.

In some embodiments of the present invention, rear steering system 4309 is adapted so that left rear wheel 4120 and right rear wheel 4146 can be selectively locked in various angled positions. In these exemplary embodiments, front steering system 4308 may be utilized to rotate left front wheel 4106 and right front wheel 4108 about their respective steering axes so that vehicle 4100 travels in a desired direction.

Rear steering system 4309 of vehicle 4100 includes a left rear tie rod 4332, a right rear tie rod 4330, and an idler 4314. In FIG. 17 it may be appreciated that left rear tie rod 4332 is connected to a protrusion 4316 of left rear knuckle 4272 at an outer joint. In the embodiment of FIG. 17 left rear tie rod 4332 is connected to idler 4314 at an inner joint. In FIG. 17 it may be appreciated that right rear tie rod 4330 has a proximal end and a distal end. The distal end of right rear tie rod 4330 is connected to a protrusion 4316 of a right rear knuckle 4272 and the proximal end of right rear tie rod 4330 is connected to idler 4314.

Figure 18:
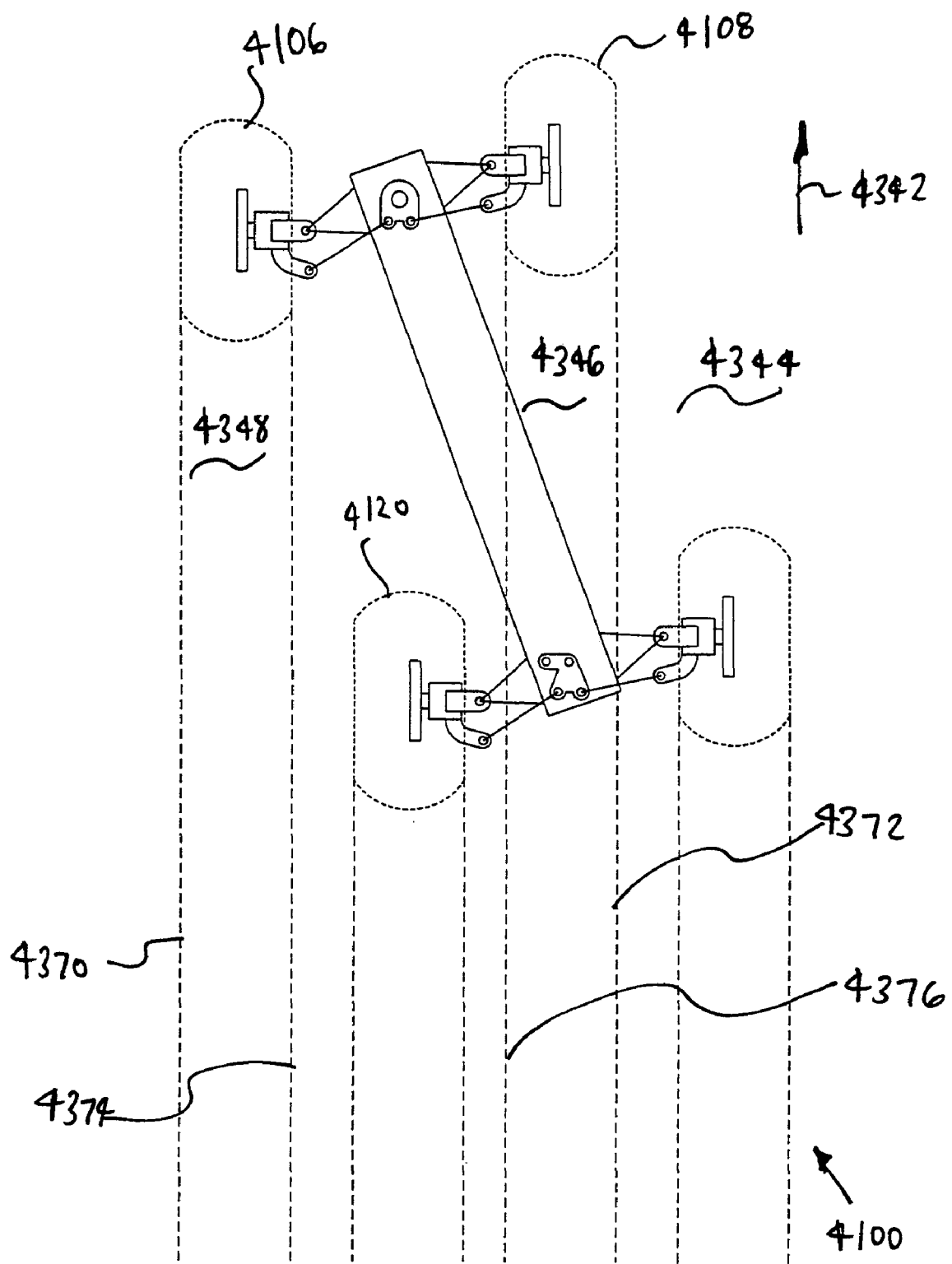
FIG. 18 is an additional diagrammatic view of the vehicle shown in the previous figure.

FIG. 18 is an additional diagrammatic view of vehicle 4100 shown in the previous figure. In the embodiment of FIG. 18, left front wheel 4106 and right front wheel 4108 have been rotated about their respective steering axes and vehicle 4100 is shown traveling in forward direction 4342 across a surface 4344. In FIG. 18, right front wheel 4108 and left front wheel 4106 are shown traveling along a right front wheel path 4346 and a left front wheel path 4348 respectively. In FIG. 18, it may be appreciated that left rear wheel path 4350 of left rear wheel 4120 is disposed between an outer edge 4370 of left front wheel path 4348 of left front wheel 4106 and an outer edge 4372 of right front wheel path 4346 of right front wheel 4108. In FIG. 18, it may be appreciated that left rear wheel path 4350 of left rear wheel 4120 is disposed between an inner edge 4374 of left front wheel path 4348 of left front wheel 4106 and an inner edge 4376 of right front wheel path 4346 of right front wheel 4108.

Figure 19:
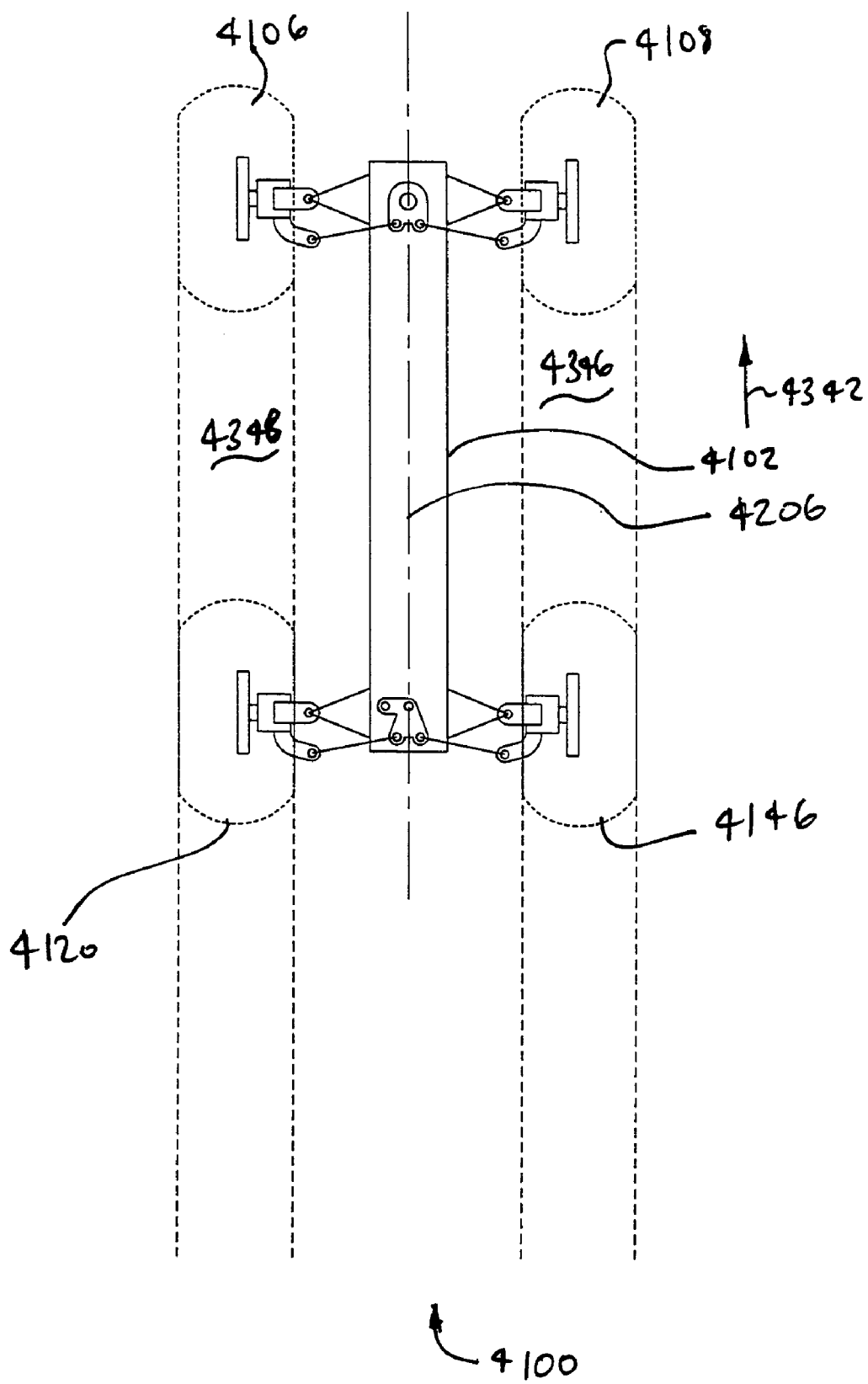
FIG. 19 is an additional diagrammatic view of the vehicle shown in the previous figure.

FIG. 19 is an additional diagrammatic view of vehicle 4100 shown in the previous figure. In the embodiment of FIG. 19 vehicle 4100 is traveling in a forward direction 4342. Also in the embodiment of FIG. 19, a plane defined by an inner surface of left front wheel 4106 and a plane defined by an inner surface of right front wheel 4108 are both generally parallel to a longitudinal axis 4206 of chassis 4102. Additionally, a plane defined by an inner surface of left rear wheel 4120 and a plane defined by an inner surface of right rear wheel 4146 are both generally parallel to a longitudinal axis 4206 of chassis 4102 in the embodiment of FIG. 19.

In FIG. 19, it may be appreciated that right front wheel 4108 travels along a right front wheel path 4346 when vehicle 4100 is traveling in forward direction 4342. In FIG. 19, right rear wheel 4146 is shown following the path of right front wheel 4108. In FIG. 19, it may also be appreciated that left front wheel 4106 travels along a left front wheel path 4348 when vehicle 4100 is traveling in a forward direction 4342 and left rear wheel 4120 is shown following the path of left front wheel 4106.

Figure 20:
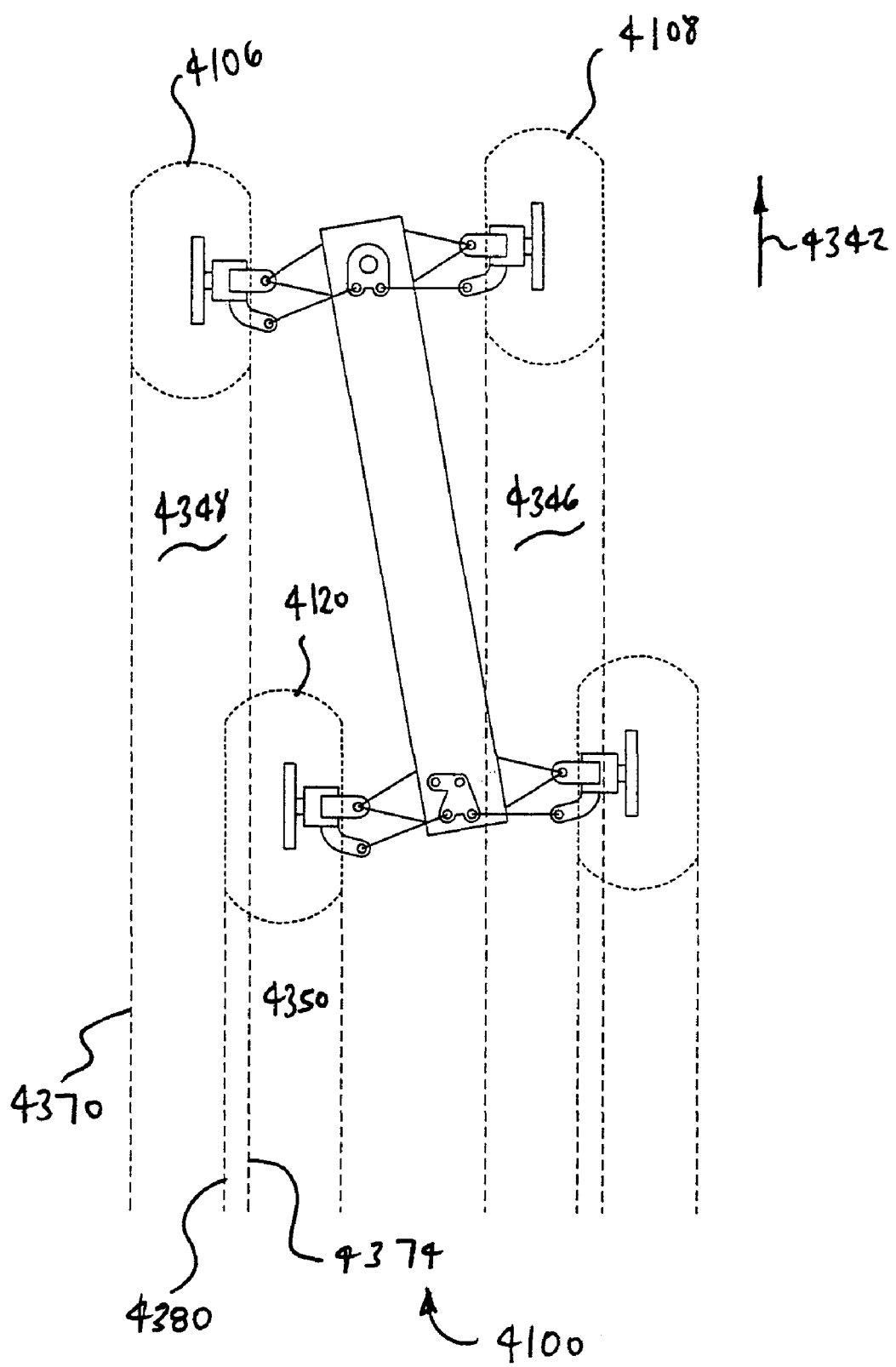
FIG. 20 is an additional diagrammatic view of the vehicle shown in the previous figure.

FIG. 20 is an additional diagrammatic view of vehicle 4100 shown in the previous figure. In the embodiment of FIG. 20, vehicle 4100 is traveling in a forward direction 4342 with left front wheel 4106 traveling along a left front wheel path 4348 and right front wheel 4108 traveling along a right front wheel path 4346. In the embodiment of FIG. 20 an outer edge 4380 of left rear wheel path 4350 of left rear wheel 4120 is disposed between an outer edge 4370 of left front wheel path 4348 of left front wheel 4106 and an inner edge 4374 of a left front wheel path 4348 of left front wheel 4106.

Figure 21:
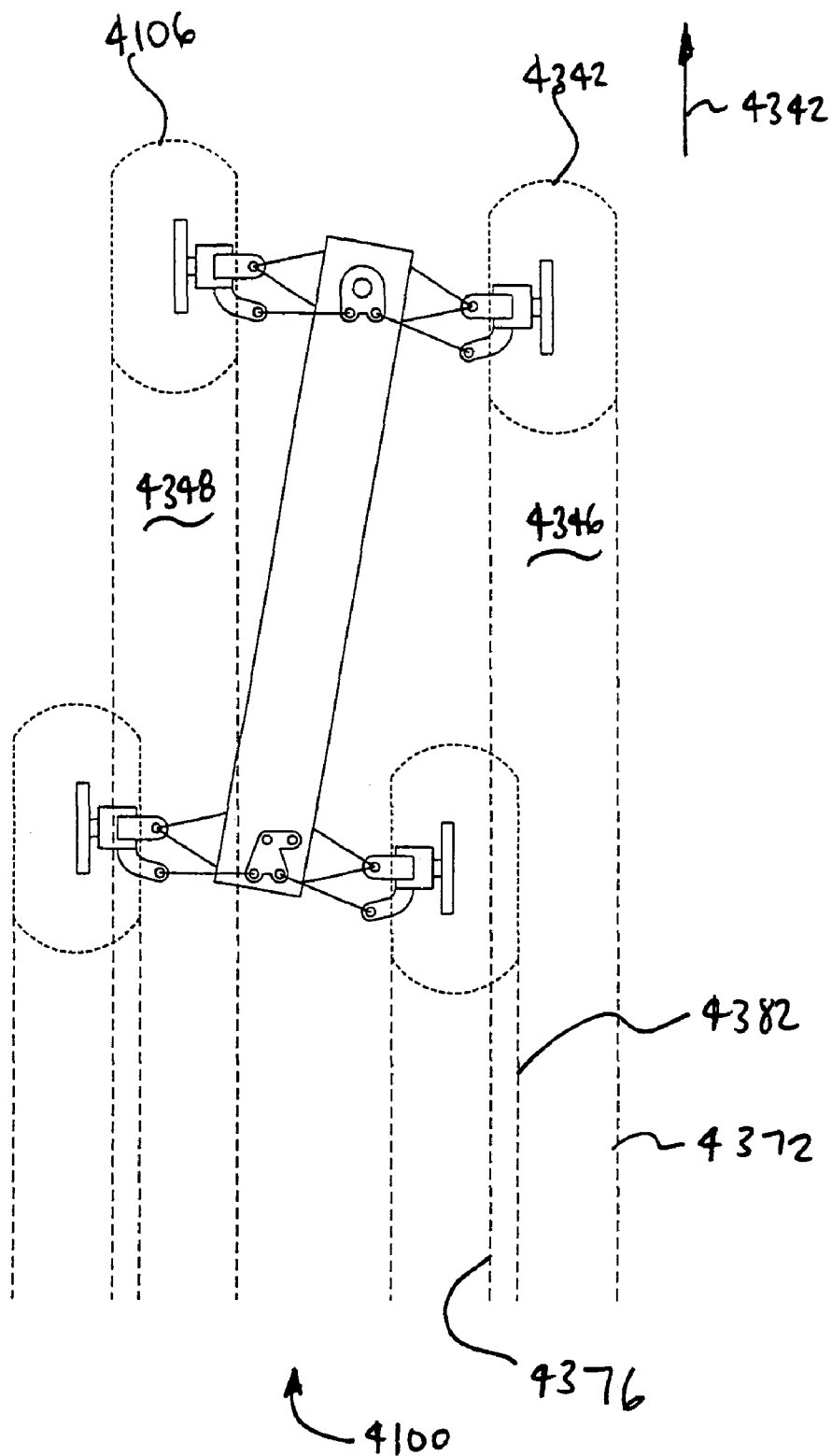
FIG. 21 is an additional diagrammatic view of the vehicle shown in the previous figure.

FIG. 21 is an additional diagrammatic view of vehicle 4100 shown in the previous figure. In the embodiment of FIG. 21, vehicle 4100 is traveling in a forward direction 4342 with left front wheel 4106 traveling along a left front wheel path 4348 and right front wheel 4108 traveling along a right front wheel path 4346. In the embodiment of FIG. 21, an outer edge 4382 of right rear wheel path 4352 of right rear wheel 4146 is disposed between an outer edge 4372 of right front wheel path 4346 of right front wheel 4108 and an inner edge 4376 of right front wheel path 4346 of right front wheel 4108.

Figure 22:
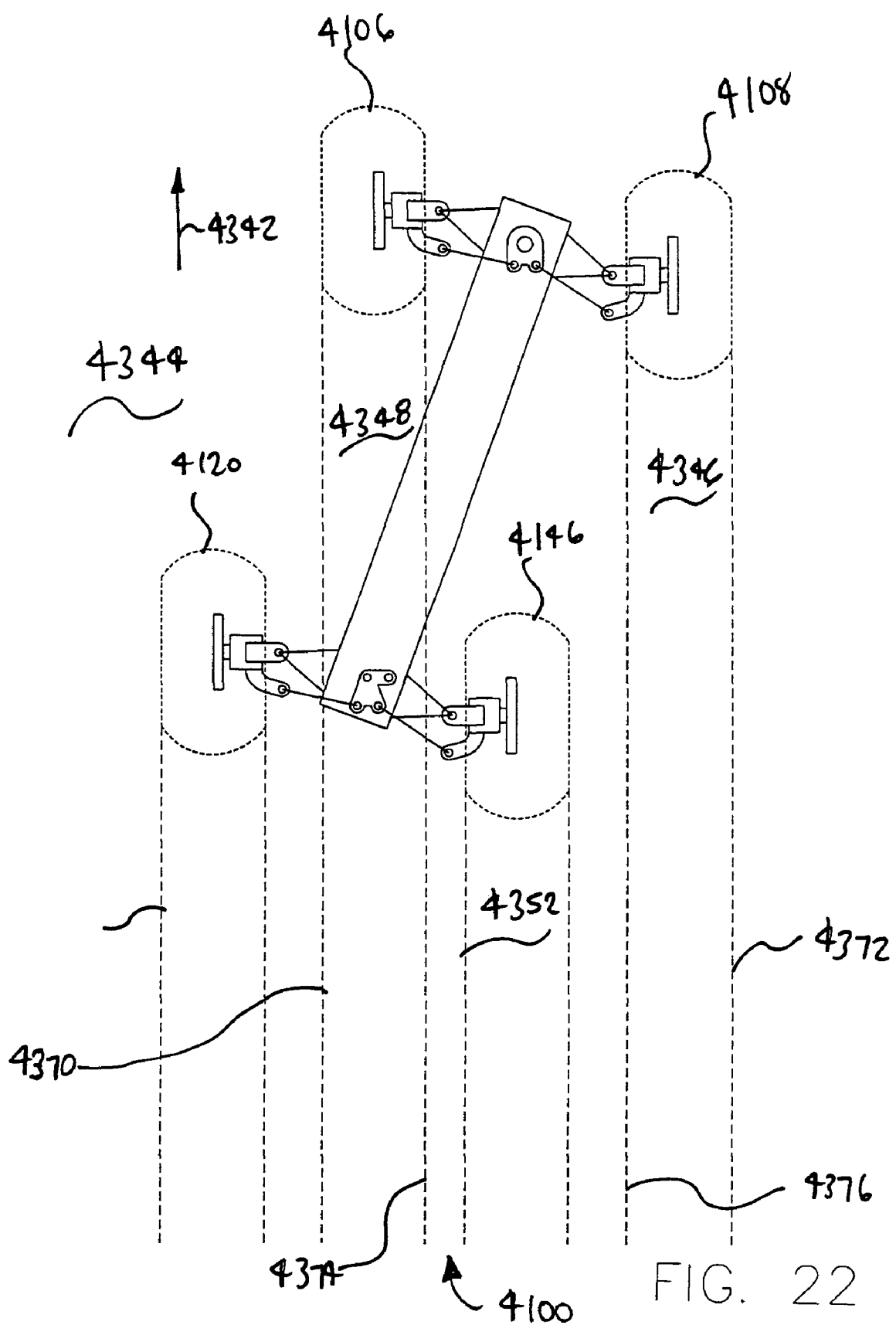
FIG. 22 is an additional diagrammatic view of the vehicle shown in the previous figure.

FIG. 22 is an additional diagrammatic view of vehicle 4100 shown in the previous figure. In the embodiment of FIG. 22, left front wheel 4106 and right front wheel 4108 have been rotated about their respective steering axes and vehicle 4100 is shown traveling in forward direction 4342 across a surface 4344. In FIG. 22, right front wheel 4108 and left front wheel 4106 are shown traveling along a right front wheel path 4346 and a left front wheel path 4348 respectively. In FIG. 22, it may be appreciated that a right rear wheel path 4352 of right rear wheel 4146 is disposed between an outer edge 4370 of left front wheel path 4348 of left front wheel 4106 and an outer edge 4372 of right front wheel path 4346 of right front wheel 4108. In FIG. 22, it may be appreciated that right front wheel path 4346 of right rear wheel 4146 is disposed between an inner edge 4374 of left front wheel path 4348 of left front wheel 4106 and an inner edge 4376 of left front wheel path 4348 of right front wheel 4108.

Figure 23:
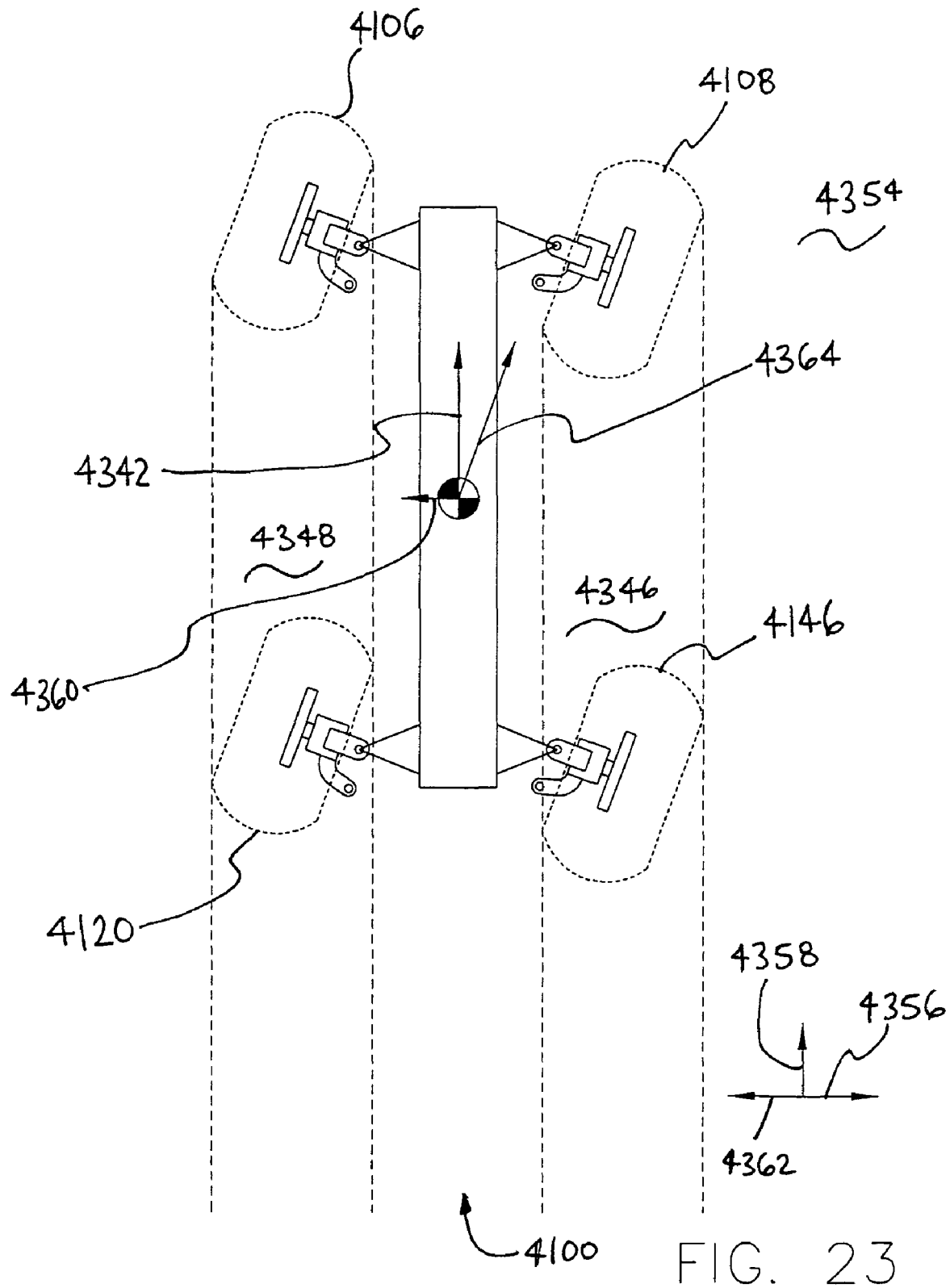
FIG. 23 is an additional diagrammatic view of the vehicle shown in the previous figure.

FIG. 23 is an additional diagrammatic view of vehicle 4100 shown in the previous figure. In the embodiment of FIG. 23, vehicle 4100 is traveling in a forward direction 4342 with left front wheel 4106 traveling along a left front wheel path 4348 and right front wheel 4108 traveling along a right front wheel path 4346. In the embodiment of FIG. 23, a vehicle 4100 is shown resting on a hill 4354 having an uphill direction 4356. A side hilling direction 4358 is also illustrated in FIG. 23. In the embodiment of FIG. 23, side hilling direction 4358 is substantially perpendicular to uphill direction 4356. In FIG. 23 a gravity force 4360 is shown acting on vehicle 4100. Gravity force 4360 tends to urge vehicle 4100 is a down hill direction 4362.

In the embodiment of FIG. 23, left front wheel 4106, right front wheel 4108, left rear wheel 4120 and right rear wheel 4146 are all oriented in a somewhat uphill direction. The rotation of the wheels creates a drive force 4364 that is illustrated with an arrow in FIG. 23. In FIG. 23 it may be appreciated that drive force 4364 is oriented in a somewhat uphill direction. In the exemplary embodiment of FIG. 23, vehicle 4100 is shown traveling in a forward direction 4342 due to the application of drive force 4364 and gravity force 4360 on vehicle 4100. In the embodiment of FIG. 23, forward direction 4342 is generally parallel to side hilling direction 4358.

It is to be appreciated that methods and apparatus in accordance with the present invention may be used in conjunction with various types of suspension systems without deviating from the spirit and scope of the present invention. Examples of suspension systems that may be suitable in some applications include double A-arm suspensions, McPherson strut suspensions, trailing arm suspensions, and multi-link suspensions (e.g., four link suspensions).

Numerous characteristics and advantages of the invention covered by this document have been set forth in the foregoing description. It will be understood, however, that this disclosure is, in many respects, only illustrative. Changes may be made in details, particularly in matters of shape, size and ordering of steps without exceeding the scope of the invention. The invention's scope is, of course, defined in the language in which the appended claims are expressed.

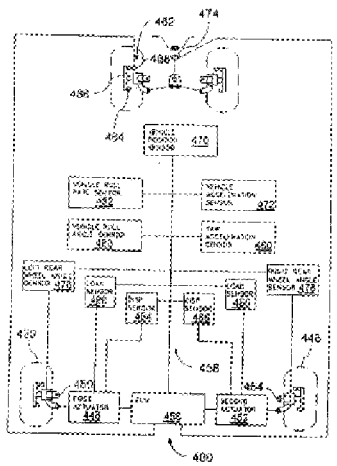

What is claimed is:

1. A vehicle for traveling along the ground, the vehicle comprising:
  at least one rear wheel;
  at least one front wheel;
  an actuator coupled to the at least one rear wheel for rotating the at least one rear wheel about a steering axis;

an input device operable to select one of a plurality of steering modes, the input device providing an input signal corresponding to the selected one of the plurality of steering modes;

a means for providing an enabling signal for enabling the selected one of the plurality of steering modes, the means for providing an enabling signal including at least one sensor and a comparator, the comparator operably coupled to the at least one sensor for detecting a degree of slippage between either one of the front and rear wheels and the ground, the comparator comparing the degree of slippage to a threshold and generating the enabling signal when the degree of slippage is greater than the threshold; and a controller responsive to the input signal and the enabling signal for controlling the actuator to rotate the at least one rear wheel in accordance with the selected one of the plurality of steering modes.

2. The vehicle of claim 1, wherein the plurality of steering modes includes a front only steering mode.

3. The vehicle of claim 1, wherein the plurality of steering modes includes a tight turning radius steering mode.

4. The vehicle of claim 3, wherein the at least one front wheel has a steering axis, the at least one front wheel and the at least one rear wheel rotate in an opposite-phase relationship about their relative steering axes when the tight turning radius steering mode is selected.

5. The vehicle of claim 3, wherein a ratio of a rear wheel steering angle of the vehicle to a front wheel steering angle of the vehicle is less than about zero when the tight turning steering mode is selected.

6. The vehicle of claim 5, wherein the ratio of the rear wheel steering angle of the vehicle to the front wheel steering angle of the vehicle is about negative one.

7. The vehicle of claim 1, wherein the plurality of steering modes includes a first steering mode and a second steering mode, the vehicle has a first turning radius when the first steering mode is selected and a second turning radius when the second steering mode is selected; and the second turning radius is smaller than the first turning radius.

8. The vehicle of claim 1, wherein the plurality of steering modes includes a crab steering mode.

9. The vehicle of claim 8, wherein a ratio of a rear wheel steering angle of the vehicle to a front wheel steering angle of the vehicle is greater than about zero when the crab steering mode is selected.

10. The vehicle of claim 9, wherein the ratio of the rear wheel steering angle of the vehicle to the front wheel steering angle of the vehicle is about one.

11. The vehicle of claim 8, wherein the at least one front wheel has a steering axis, the at least one front wheel and the at least one rear wheel rotate in a same-phase relationship about their relative steering axes when the crab steering mode is selected.

12. The vehicle of claim 1, wherein the input device comprises an electric switch.

13. The vehicle of claim 1, wherein the vehicle comprises more than one rear wheel.

14. The vehicle of claim 13, wherein the actuator steers all the rear wheels of the vehicle.

15. The vehicle of claim 1, wherein the at least one rear wheel does not rotate about the steering axis when the first steering mode is selected.

16. The vehicle of claim 1, wherein the at least one sensor comprises a steering input sensor producing a steering input signal indicative of a position of a steering input device of the vehicle.

17. The vehicle of claim 16, wherein the at least one sensor includes a yaw acceleration sensor measuring the acceleration of the vehicle in a lateral direction and generating a yaw acceleration signal, the comparator receives the yaw acceleration signal and the steering input signal and generates the enabling signal in response to a comparison of the yaw acceleration signal and the steering input signal.

18. The vehicle of claim 1, wherein the vehicle comprises:
a first rear wheel and a second rear wheel;
the first rear wheel rotatable about a first steering axis by a first steering angle and the second rear wheel rotatable about a second steering axis by a second steering angle.

19. The vehicle of claim 18, wherein the first steering angle is equal to the second steering angle.

20. The vehicle of claim 18, wherein the first steering angle is less than the second steering angle.

21. The vehicle of claim 18, wherein the first steering angle is greater than the second steering angle.

22. The vehicle of claim 1, wherein the input device comprises a switch disposed on an arm of a handlebar of the vehicle.

23. The vehicle of claim 22, wherein:
the switch is disposed proximate a grip; and
the switch and the grip are positioned and dimensioned such that the switch can be actuated by a thumb of a hand while another portion of the hand remains in contact with the grip.

24. The vehicle of claim 22, wherein:
the switch is disposed proximate a grip; and
the switch and the grip are positioned and dimensioned such that the switch can be actuated by a thumb of a hand while another portion of the hand grips the grip.

25. The vehicle of claim 22, further including a throttle mechanism disposed on a second arm of the handlebar.

26. The vehicle of claim 1, wherein the at least one sensor includes a vehicle acceleration sensor and a wheel rotation sensor, the vehicle acceleration sensor measuring the linear acceleration of the vehicle and generating a vehicle acceleration signal, the wheel rotation sensor measuring the acceleration of a ground contacting portion of one of the at least one rear and front wheels and generating a wheel rotation signal, the comparator receives the vehicle acceleration signal and the wheel rotation signal and detects inconsistency between the vehicle acceleration and the wheel rotation signals, the comparator comparing the inconsistency to a threshold.

27. A method comprising the steps of:
providing a vehicle having at least one rear wheel and an actuator coupled to the at least one rear wheel for rotating the wheel about a steering axis;
receiving an input signal from an input switch;
providing an enabling signal for enabling a second steering mode of the vehicle when a degree of slippage is greater than a threshold;
producing a control signal in response to the input signal and the enabling signal for actuating the actuator to rotate the at least one rear wheel about the steering axis thereof.

28. A vehicle comprising:
at least one rear wheel;

an actuator coupled to the at least one rear wheel for rotating the at least one rear wheel about a steering axis;

a sensor array including a plurality of sensors each generating a sensor signal, the plurality of sensors including a vehicle acceleration sensor and a wheel rotation sensor, the vehicle acceleration sensor including an accelerometer positioned on the vehicle and measuring the linear acceleration of the vehicle, the vehicle acceleration sensor generating a first sensor signal indicative of the vehicle acceleration; the wheel rotation sensor coupled to at least one of the wheels and measuring the acceleration of a ground contacting portion of the at least one of the wheels, the wheel rotation sensor generating a second sensor signal indicative of the acceleration of the ground contacting portion of the at least one rear wheel;

an ECU coupled to the actuator and the sensor array; and the ECU calculating a steering angle responsive to the first and the second sensor signals and providing a control signal to the actuator so that the at least one wheel is rotated about the steering axis by the steering angle.

29. A recreational vehicle having a first rear wheel, a second rear wheel, a pair of front wheels, and a steering member operably coupled to the pair of front wheels and adapted to be operated by the operator to steer the pair of front wheels about respective front steering axes, the vehicle comprising:

an input device switch positioned on the steering member and switchable by the operator between a plurality of steering mode selections, the input device switch generating an input signal corresponding to the selected steering mode;

at least one actuator operably coupled to the first and second rear wheels and adapted to selectively and independently rotate the first and second rear wheels about respective first and second rear steering axes;

a sensor array including a plurality of sensors each generating a sensor signal, the plurality of sensors including a vehicle movement sensor and a wheel rotation sensor, the vehicle movement sensor positioned on the vehicle and measuring the linear movement of the vehicle, the vehicle movement sensor generating a first sensor signal indicative of the vehicle movement; the wheel rotation sensor coupled to at least one of the wheels and measuring the movement of a ground contacting portion of the at least one of the wheels, the wheel rotation sensor generating a second sensor signal indicative of the movement of the ground contacting portion of the at least one wheel; and a control unit coupled to the sensor array, the input device and the actuator, the control unit receiving the input signal, the first signal and the second signal, the control unit storing at least one threshold parameter, the control unit including a comparator operable to detect inconsistency between the first sensor signal and the second sensor signal and compare the inconsistency to the at least one threshold parameter, the comparator operable to generate an enabling signal enabling the selected steering mode when the inconsistency is greater than the at least one threshold parameter, the control unit controlling the actuator to affect the selective and independent rotation of first and second rear wheels about respective first and second rear steering axes in accordance with the selected steering mode.

30. The recreational vehicle of claim 29 wherein the sensor array also includes a left and a right rear wheel angle sensor generating left and right rear wheel angle signals, the control unit receiving the left and right rear wheel angle signals.

31. The recreational vehicle of claim 29 wherein the at least one actuator includes a first actuator coupled to the first rear wheel and a second actuator coupled to the second rear wheel.

32. The recreational vehicle of claim 29 wherein the at least one actuator includes an electric motor.

33. The recreational vehicle of claim 29 wherein said sensor array includes a vehicle position sensor, the vehicle position sensor including a global positioning system, the vehicle position sensor transmitting a vehicle position signal to the control unit.

34. The recreational vehicle of claim 29 wherein the plurality of vehicle steering modes includes a tight turning radius steering mode, wherein the first and second rear wheels are rotated about respective first and second rear steering axes in an opposite phase relationship with respect to the rotation of the front wheels about the front steering axes.

35. The recreational vehicle of claim 29 wherein the plurality of vehicle steering modes includes a crab steering mode wherein said first and second rear wheels are rotated about respective first and second rear steering axes in a same-phase relationship with respect to the rotation of the front wheels about the front steering axes.

36. The recreational vehicle of claim 29 wherein the plurality of vehicle steering modes includes a front-only steering mode wherein the first and second rear wheels are positioned parallel to a longitudinal axis of the vehicle and only the pair of front wheels may be rotated by the steering member.

37. The recreational vehicle of claim 29 wherein the actuator may be deactivated with first and second wheels in a non-parallel position relative to a longitudinal axis of the vehicle, thereby locking first and second wheels in the non-parallel position.

38. The recreational vehicle of claim 29, wherein the vehicle movement sensor comprises a vehicle acceleration sensor measuring the linear acceleration of the vehicle, and the wheel rotation sensor measures the acceleration of the ground contacting portion.

39. A recreational vehicle having a vehicle frame, a pair of front wheels rotatably coupled to the vehicle frame and a steering member operably coupled to the pair of front wheels and adapted to be operated by the operator to steer the pair of front wheels about respective front wheel axes, the vehicle comprising:

a pair of rear wheel assemblies, each rear wheel assembly including a rear wheel, a knuckle rotatably coupled to said rear wheel and having an upper end and a lower end, upper and lower ball joints respectively disposed on the upper and lower ends of the knuckle, and upper and lower support arms pivotably coupled at one end to the upper and lower ball joints, respectively, and coupled at the opposite end to the vehicle frame, the knuckle defining a rear steering axis;

an input device switch positioned on the steering member and switchable by the operator between a plurality of steering mode selections, the input device generating an input signal corresponding to the selected steering mode;

at least one actuator operably coupled to the pair of rear wheel assemblies and adapted to selectively and independently rotate the rear wheels about the rear steering axes;

a sensor array including a plurality of sensors each generating a sensor signal; and a control unit coupled to the sensor array, the input device and the actuator, the control unit receiving the sensor signal of each of the plurality of sensors and the input signal, the control unit storing at least one threshold parameter, the control unit including a comparator, the comparator comparing the sensor signal to said at least one threshold parameter, the control unit generating an enabling signal enabling the selected steering mode, the enabling signal based on said comparator's comparisons, the control unit controlling said actuator to affect the selective and independent rotation of the rear wheels about respective said rear steering axes in accordance with the selected steering mode.

40. The recreational vehicle of claim 39 wherein the plurality of sensors includes a vehicle acceleration sensor, the vehicle acceleration sensor includes an accelerometer positioned on the vehicle and measuring the linear acceleration of the vehicle.

41. The recreational vehicle of claim 40 wherein the plurality of sensors includes a wheel rotation sensor, the wheel rotation sensor is coupled to at least one of the wheels and measures the acceleration of a ground contacting portion of the at least one of the wheels, the vehicle acceleration sensor generates a first sensor signal indicative of the linear acceleration of the vehicle, the wheel rotation sensor generates a second sensor signal indicative of the acceleration of the ground contacting portion of the at least one wheel, the comparator comparing said first signal to said second signal.

42. The recreational vehicle of claim 39 wherein the sensor array also includes left and right rear wheel angle sensors respectively generating left and right rear wheel angle signals, the control unit receiving said left and right rear wheel angle signals.

43. The recreational vehicle of claim 39 wherein the at least one actuator includes a first actuator coupled to the first rear wheel and a second actuator coupled to the second rear wheel.

44. The recreational vehicle of claim 39 wherein the at least one actuator includes an electric motor.

45. The recreational vehicle of claim 39 wherein the sensor array includes a vehicle position sensor, the vehicle position sensor including a global positioning system, the vehicle position sensor transmitting a vehicle position signal to the control unit.

46. The recreational vehicle of claim 39 wherein the plurality of vehicle steering modes includes a tight turning radius steering mode, wherein the first and second rear wheels are rotated about respective first and second rear steering axes in an opposite phase relationship with respect to the rotation of the front wheels about the front steering axes.

47. The recreational vehicle of claim 39 wherein the plurality of vehicle steering modes includes a crab steering mode wherein said first and second rear wheels are rotated about respective first and second rear steering axes in a same-phase relationship with respect to the rotation of the front wheels about the front steering axes.

48. The recreational vehicle of claim 39 wherein the plurality of vehicle steering modes includes a front-only steering mode wherein the first and second rear wheels are positioned parallel to a longitudinal axis of the vehicle and only the pair of front wheels may be rotated by the steering member.

* * * * *

UNITED STATES PATENT AND TRADEMARK OFFICE
CERTIFICATE OF CORRECTION

| | | |
|---|---|---|
| PATENT NO. | : 7,278,511 B1 | Page 1 of 25 |
| APPLICATION NO. | : 10/639401 | |
| DATED | : October 9, 2007 | |
| INVENTOR(S) | : Brett Gass et al. | |

It is certified that error appears in the above-identified patent and that said Letters Patent is hereby corrected as shown below:

Delete the Title Page showing an illustrated figure and substitute the attached Title page therefor.

Delete informal drawing Figures 1 - 23 (original sheets 1 - 23) subsitute the attached formal drawing Figures 1 - 23 (replacement sheets 1 - 23).

Signed and Sealed this

Twentieth Day of January, 2009

JON W. DUDAS
*Director of the United States Patent and Trademark Office*

(12) United States Patent
Gass et al.

(10) Patent No.: US 7,278,511 B1
(45) Date of Patent: Oct. 9, 2007

(54) CONTROLLER FOR STEERING A VEHICLE

(75) Inventors: Brett Gass, Forest Lake, MN (US); Jeff Bennett, Roseau, MN (US); Roger Hupka, Columbus, IN (US); Gary Gustafson, Salol, MN (US)

(73) Assignee: Polaris Industries Inc., Medina, MN (US)

( * ) Notice: Subject to any disclaimer, the term of this patent is extended or adjusted under 35 U.S.C. 154(b) by 413 days.

(21) Appl. No.: 10/639,401

(22) Filed: Aug. 12, 2003

Related U.S. Application Data

(60) Provisional application No. 60/483,685, filed on Jun. 30, 2003, provisional application No. 60/459,665, filed on Apr. 2, 2003, provisional application No. 60/442,697, filed on Jan. 27, 2003.

(51) Int. Cl.
*B62D 5/00* (2006.01)
*B62D 7/00* (2006.01)

(52) U.S. Cl. .................. 180/409; 180/411; 180/415

(58) Field of Classification Search .......... 180/411–416
See application file for complete search history.

(56) References Cited

U.S. PATENT DOCUMENTS

| | | |
|---|---|---|
| 2,824,749 A | 2/1958 | Yasuda |
| 3,282,366 A | 11/1966 | Sprague |
| 3,596,730 A | 8/1971 | Cecce |
| 3,888,328 A | 6/1975 | Leiber |
| 3,897,846 A | 8/1975 | Inoue |
| 3,912,031 A | 10/1975 | Goulet |
| 3,933,215 A | 1/1976 | Scheuerle |
| 4,024,968 A | 5/1977 | Shaffer et al. |
| 4,105,086 A | 8/1978 | Ishii et al. |
| 4,175,638 A | 11/1979 | Christensen |
| 4,263,979 A * | 4/1981 | Sturgill ............ 180/411 |
| 4,284,159 A | 8/1981 | Voelz |
| 4,315,555 A | 2/1982 | Schrill |
| 4,335,800 A | 6/1982 | Arato |
| 4,367,803 A | 1/1983 | Wittren |
| 4,373,603 A | 2/1983 | Nelson |
| 4,412,594 A | 11/1983 | Furukawa et al. |
| 4,418,780 A | 12/1983 | Ito et al. |
| 4,446,941 A | 5/1984 | Laurich-Trost |
| 4,586,722 A | 5/1986 | Watanabe et al. |
| 4,600,074 A | 7/1986 | Watanabe et al. |
| 4,655,313 A | 4/1987 | Matsuda et al. |
| 4,671,523 A | 6/1987 | Naumann |
| 4,679,809 A | 7/1987 | Ito et al. |

(Continued)

FOREIGN PATENT DOCUMENTS

EP 0 300 774 1/1989

*Primary Examiner*—Lesley D. Morris
*Assistant Examiner*—Marc A. Scharich
(74) *Attorney, Agent, or Firm*—Baker & Daniels LLP

(57) ABSTRACT

Methods and apparatus for steering a vehicle are disclosed. A vehicle in accordance with an exemplary embodiment of the present invention is capable of operating in a first steering mode and a second steering mode. The vehicle may comprise an input device capable of providing an input signal indicating that operation in the second steering mode is desired. The vehicle may comprise an electronic control unit (ECU) capable of providing an enabling signal when the ECU determines that operation in the second steering mode is appropriate for the present riding conditions.

48 Claims, 23 Drawing Sheets